(12) United States Patent
Takeo et al.

(10) Patent No.: US 12,703,962 B2
(45) Date of Patent: Aug. 11, 2026

(54) SHOVEL

(71) Applicant: SUMITOMO CONSTRUCTION MACHINERY CO., LTD., Tokyo (JP)

(72) Inventors: Jitsutaka Takeo, Chiba (JP); Kaoru Nakada, Chiba (JP)

(73) Assignee: SUMITOMO CONSTRUCTION MACHINERY CO., LTD., Tokyo (JP)

( * ) Notice: Subject to any disclaimer, the term of this patent is extended or adjusted under 35 U.S.C. 154(b) by 304 days.

(21) Appl. No.: 18/477,917

(22) Filed: Sep. 29, 2023

(65) Prior Publication Data

US 2024/0150999 A1 May 9, 2024

Related U.S. Application Data

(63) Continuation of application No. PCT/JP2022/014544, filed on Mar. 25, 2022.

(30) Foreign Application Priority Data

Mar. 31, 2021 (JP) ................................ 2021-062423
Mar. 31, 2021 (JP) ................................ 2021-062446

(51) Int. Cl.
*E02F 9/20* (2006.01)
*B60H 1/00* (2006.01)
(Continued)

(52) U.S. Cl.
CPC ......... *E02F 9/207* (2013.01); *B60H 1/00735* (2013.01); *B60L 1/00* (2013.01);
(Continued)

(58) Field of Classification Search
CPC ... E02F 9/207; E02F 3/32; E02F 3/435; E02F 9/2033; E02F 9/2091; E02F 9/2095;
(Continued)

(56) References Cited

U.S. PATENT DOCUMENTS 10,100,493 B2 * 10/2018 Takeo .................. E02F 9/2033
10,668,802 B2 * 6/2020 Nishikawa ........... E02F 9/2091
(Continued)

FOREIGN PATENT DOCUMENTS

DE 102018207461 A1 * 11/2019 .......... H02M 3/1582
DE 102019206375 A1 * 11/2019 ............. B60L 53/66
(Continued)

OTHER PUBLICATIONS

JP-2010022164-A English Translation (Year: 2010).*
(Continued)

*Primary Examiner* — Michael T. Walsh
(74) *Attorney, Agent, or Firm* — IPUSA, PLLC

(57) ABSTRACT

A shovel includes a lower traveling body, an upper turning body turnably mounted on the lower traveling body, a hydraulic actuator that drives driven parts including the lower traveling body and the upper turning body, a main pump that supplies hydraulic oil to the hydraulic actuators, a pump motor that drives the main pump, and a power storage device that supplies electric power to the pump motor. When the charging cable is connected to the charging port during the operation of the shovel, the shovel causes the hydraulic actuators to shift to the inoperable state. When the charging cable is connected to the charging port, the shovel does not start the pump motor even if an input for starting the pump motor is received from a user.

17 Claims, 26 Drawing Sheets

(51) Int. Cl.

| | |
|---|---|
| ***B60L 1/00*** | (2006.01) |
| ***B60L 58/10*** | (2019.01) |
| ***E02F 3/32*** | (2006.01) |
| ***E02F 3/43*** | (2006.01) |
| ***E02F 9/24*** | (2006.01) |
| ***E02F 9/26*** | (2006.01) |
| *E02F 9/16* | (2006.01) |
| *E02F 9/22* | (2006.01) |

(52) U.S. Cl.
CPC ................ *B60L 58/10* (2019.02); *E02F 3/32* (2013.01); *E02F 3/435* (2013.01); *E02F 9/2033* (2013.01); *E02F 9/2091* (2013.01); *E02F 9/2095* (2013.01); *E02F 9/24* (2013.01); *E02F 9/26* (2013.01); *B60L 2200/40* (2013.01); *E02F 9/16* (2013.01); *E02F 9/2203* (2013.01); *E02F 9/2285* (2013.01); *E02F 9/2292* (2013.01); *E02F 9/2296* (2013.01)

(58) Field of Classification Search
CPC ....... E02F 9/24; E02F 9/26; E02F 9/16; E02F 9/2203; E02F 9/2285; E02F 9/2292; E02F 9/2296; E02F 9/205; B60H 1/00735; B60L 1/00; B60L 58/10; B60L 2200/40; H02J 2310/40; H02J 7/0068; Y02T 10/70
See application file for complete search history.

(56) References Cited

U.S. PATENT DOCUMENTS

| | | | | |
|---|---|---|---|---|
| 11,084,384 | B2 * | 8/2021 | Sakakibara | B60L 1/00 |
| 2021/0086618 | A1 * | 3/2021 | Kaneda | E02F 9/2091 |
| 2022/0010527 | A1 * | 1/2022 | Takeo | E02F 9/2228 |
| 2022/0412054 | A1 * | 12/2022 | Takeo | E02F 9/205 |

FOREIGN PATENT DOCUMENTS

| | | | | |
|---|---|---|---|---|
| EP | 2889432 | | | 7/2015 |
| JP | H07-039012 | | | 2/1995 |
| JP | 2009-215855 | | | 9/2009 |
| JP | 2010-022164 | | | 1/2010 |
| JP | 2010022164 | A | * | 1/2010 |
| JP | 2011-103720 | | | 5/2011 |
| JP | 2018182905 | A | * | 11/2018 |
| JP | 2019-190105 | | | 10/2019 |
| WO | 2020/203291 | | | 10/2020 |

OTHER PUBLICATIONS

JP-2018182905-A English Translation (Year: 2018).*
DE-102018207461-A1 English Translation (Year: 2019).*
DE-102019206375-A1 English Translation (Year: 2019).*
International Search Report for PCT/JP2022/014544 mailed on Jun. 14, 2022.

* cited by examiner 100
1
2
3
10
7
4
8
5
AT
9
6
1C

100
CON-TROL VALVE
OPERATION DEVICE
MAIN PUMP
CON-TROL-LER
INVERTER
M
FAN
COM-PRESSOR
WATER PUMP
DC-DC CONVERTER
POWER STORAGE DEVICE
ON-BOARD CHARGER
BATTERY
26A～26C

100
WATER PUMP
COMPRESSOR
FAN
BATTERY
OPERATION DEVICE
26A~26C
MAIN PUMP
M
12s3
12s1
12s2
12s
INVERTER
DC-DC CONVERTER
DC-DC CONVERTER
POWER STORAGE DEVICE
ON-BOARD CHARGER
CONTROLLER
CONTROL VALVE
30E
30D
30B
30C
30A
72A
72B
44A
44B

FIG.5

V+
25R
30A
INPUT POWER SUPPLY
GND
25SW
25V1
T
25V2
15
25
31
HYDRAULIC CONTROL VALVE
17
CONTROL VALVE 60
66
66A
POWER STORAGE DEVICE
19
66B
66B1
INVERTER
18
66C1
66B2
DC-DC CONVERTER
44
66C2
66C
W/P
64
90
66F
RADIATOR
62
70
ON-BOARD CHARGER
12
PUMP MOTOR
66E
66D 80
82
82A
COMPRESSOR
82B
CONDENSER
90
82C
EXPANSION VALVE
82D
EVAPORATOR

RB1
BLT2
BLT1
RB2
FL
FH21
FH23
FH22
FH12
FH11
RB2
RC
19H1
19H2
19H1

SMALL CAPACITY
44A
DC-DC CONVERTER
LARGE CAPACITY
44B
DC-DC CONVERTER
CURRENT CONSUMPTION
0
I1
I2
Imax
OPERATION
STOP
STOP
OPERATION
OPERATION
OPERATION 1500
CONVERSION EFFICIENCY [%]
100
0
OUTPUT CURRENT
Imax
I1
I2
1501
1501A
1502
1502A
1503
1504
1504A VOLTAGE OF BATTERY
VOLTAGE RECOVERY (INCREASE IN INTERNAL RESISTANCE)
MILD VOLTAGE DROP
START OPERATION LIMITATION OF LOW-VOLTAGE DEVICE
RAPID VOLTAGE DROP
STOP CONTROLLER
STOP CONTROLLER
TIME
NO OPERATION LIMITATION OF LOW-VOLTAGE DEVICE
FORCIBLY STOP SHOVEL
OPERATION LIMITATION OF LOW-VOLTAGE DEVICE
FORCIBLY STOP SHOVEL

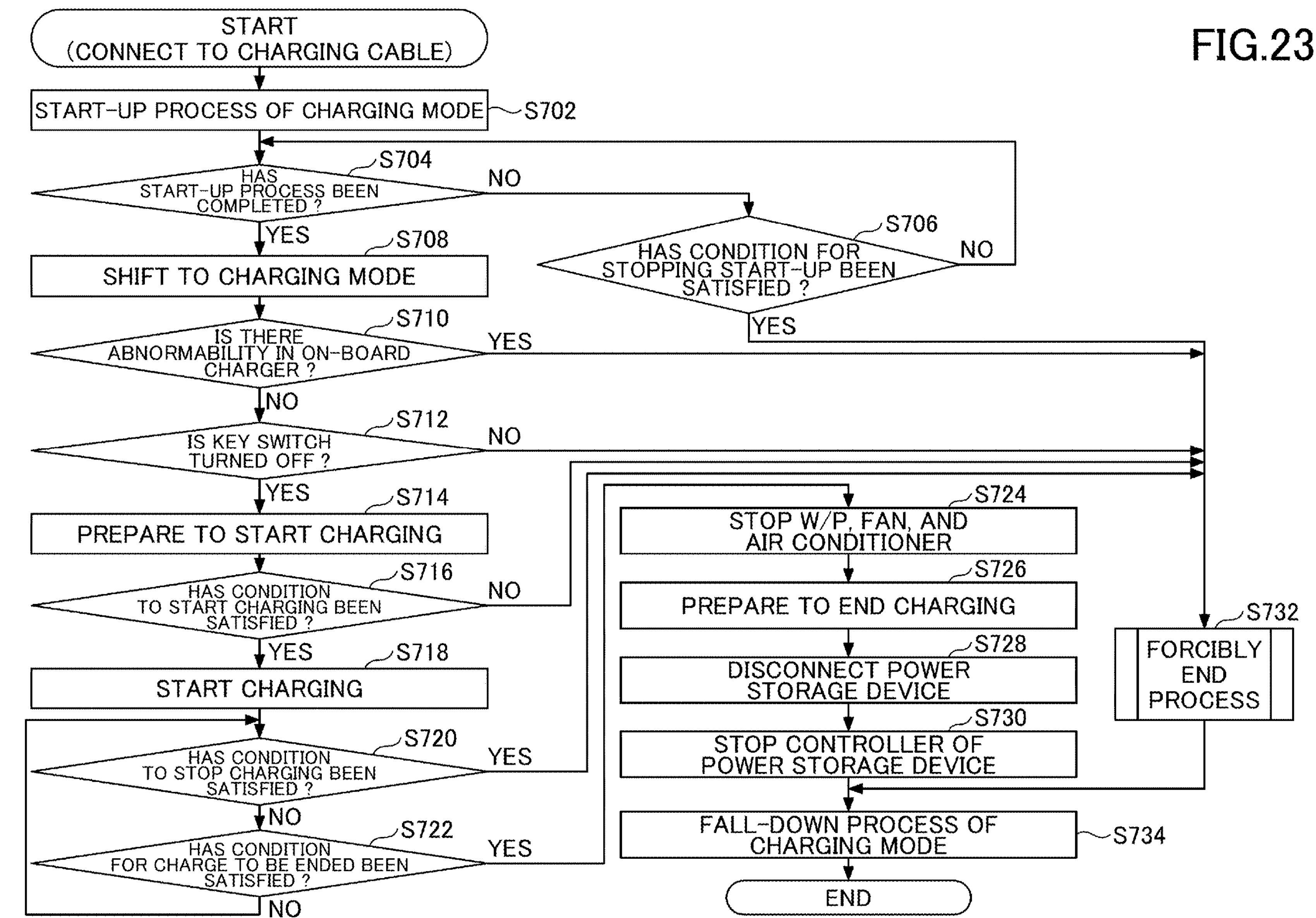
FIG.23
START (CONNECT TO CHARGING CABLE)
START-UP PROCESS OF CHARGING MODE
S702
HAS START-UP PROCESS BEEN COMPLETED ?
S704
YES
NO
HAS CONDITION FOR STOPPING START-UP BEEN SATISFIED ?
S706
YES
NO
SHIFT TO CHARGING MODE
S708
IS THERE ABNORMABILITY IN ON-BOARD CHARGER ?
S710
NO
YES
IS KEY SWITCH TURNED OFF ?
S712
YES
NO
PREPARE TO START CHARGING
S714
HAS CONDITION TO START CHARGING BEEN SATISFIED ?
S716
YES
NO
START CHARGING
S718
HAS CONDITION TO STOP CHARGING BEEN SATISFIED ?
S720
NO
YES
HAS CONDITION FOR CHARGE TO BE ENDED BEEN SATISFIED ?
S722
NO
YES
STOP W/P, FAN, AND AIR CONDITIONER
S724
PREPARE TO END CHARGING
S726
DISCONNECT POWER STORAGE DEVICE
S728
STOP CONTROLLER OF POWER STORAGE DEVICE
S730
FORCIBLY END PROCESS
S732
FALL-DOWN PROCESS OF CHARGING MODE
S734
END

SHOVEL

CROSS-REFERENCE TO RELATED APPLICATIONS

The present application is a continuation application filed under 35 U.S.C. 111 (a) claiming benefit under 35 U.S.C. 120 and 365 (c) of PCT International Application No. PCT/JP2022/014544 filed on Mar. 25, 2022 and designating the U.S., which claims priority to Japanese Patent Application Nos. 2021-062423 filed on Mar. 31, 2021, and 2021-062446 filed on Mar. 31, 2021. The entire contents of the foregoing applications are incorporated herein by reference.

BACKGROUND

The present disclosure relates to shovels.

For example, there is known an electric shovel that operates using a power storage device such as a battery that can be charged from an external power supply as an energy source.

Conventional technique discloses a technique in which when a charging cable from an external power supply is connected to a charging port during operation of a shovel, an electric motor cannot be driven by power supplied from the external power supply unless the electric motor driven by power of a power storage device is stopped. According to this technique, since power supply is not started even when the power supply cable is connected to the shovel in operation, for example, an action in which the operator gets off the cabin and intentionally connects the charging cable to the shovel in operation can be suppressed.

SUMMARY

In order to achieve the above object, one embodiment of the present disclosure provides a shovel that includes: a lower traveling body; an upper turning body turnably mounted on the lower traveling body; a hydraulic actuator configured to drive a driven part including the lower traveling body and the upper turning body; a first hydraulic pump configured to supply hydraulic oil to the hydraulic actuator; an electric motor configured to drive the first hydraulic pump; a power storage device configured to supply electric power to the electric motor; and a charging port configured to connect a predetermined cable and charge electric power from an external power supply, wherein the hydraulic actuator is shifted to an inoperable state when the predetermined cable is connected to the charging port while the shovel is in operation.

Another embodiment of the present disclosure provides a shovel that includes: a lower traveling body; an upper turning body turnably mounted on the lower traveling body; a hydraulic actuator configured to drive a driven part including the lower traveling body and the upper turning body; a hydraulic pump configured to supply hydraulic oil to the hydraulic actuator; an electric motor configured to drive the hydraulic pump; a power storage device configured to supply electric power to the electric motor; and a charging port configured to connect to a predetermined cable and charge electric power from an external power supply to the power storage device, wherein the electric motor is not activated even if an input to activate the electric motor is accepted from a user, in a state where the predetermined cable is connected to the charging port.

BRIEF DESCRIPTION OF THE DRAWINGS

FIG. 5 is a diagram illustrating another example of a configuration relating to operation limitation of a hydraulic control system;

FIG. 23 is a flowchart schematically illustrating an example of control processing relating to start-up and fall-down of a charging mode of the shovel;

DETAILED DESCRIPTION

However, in the conventional technique, although the operator can intentionally suppress the action of connecting the charging cable to the shovel in operation, for example, a third party not related to the current work cannot suppress the action of connecting the charging cable. Therefore, there is a possibility that the operator continues the work with the shovel without knowing that the third party has connected the charging cable to the shovel. Therefore, there is scope for improvement in terms of safety.

In view of the above problem, an object of the present invention is to provide a technique capable of further improving safety when a charging cable is connected to a charging port of an electric shovel.

According to the above-described embodiment, safety when the charging cable is connected to the charging port of the electric shovel is further improved.

Hereinafter, embodiments for carrying out the invention will be described with reference to the drawings.

[Overview of Shovel]

First, an overview of a shovel 100 as an example of a work machine will be described with reference to FIG. 1.

Figure 1:
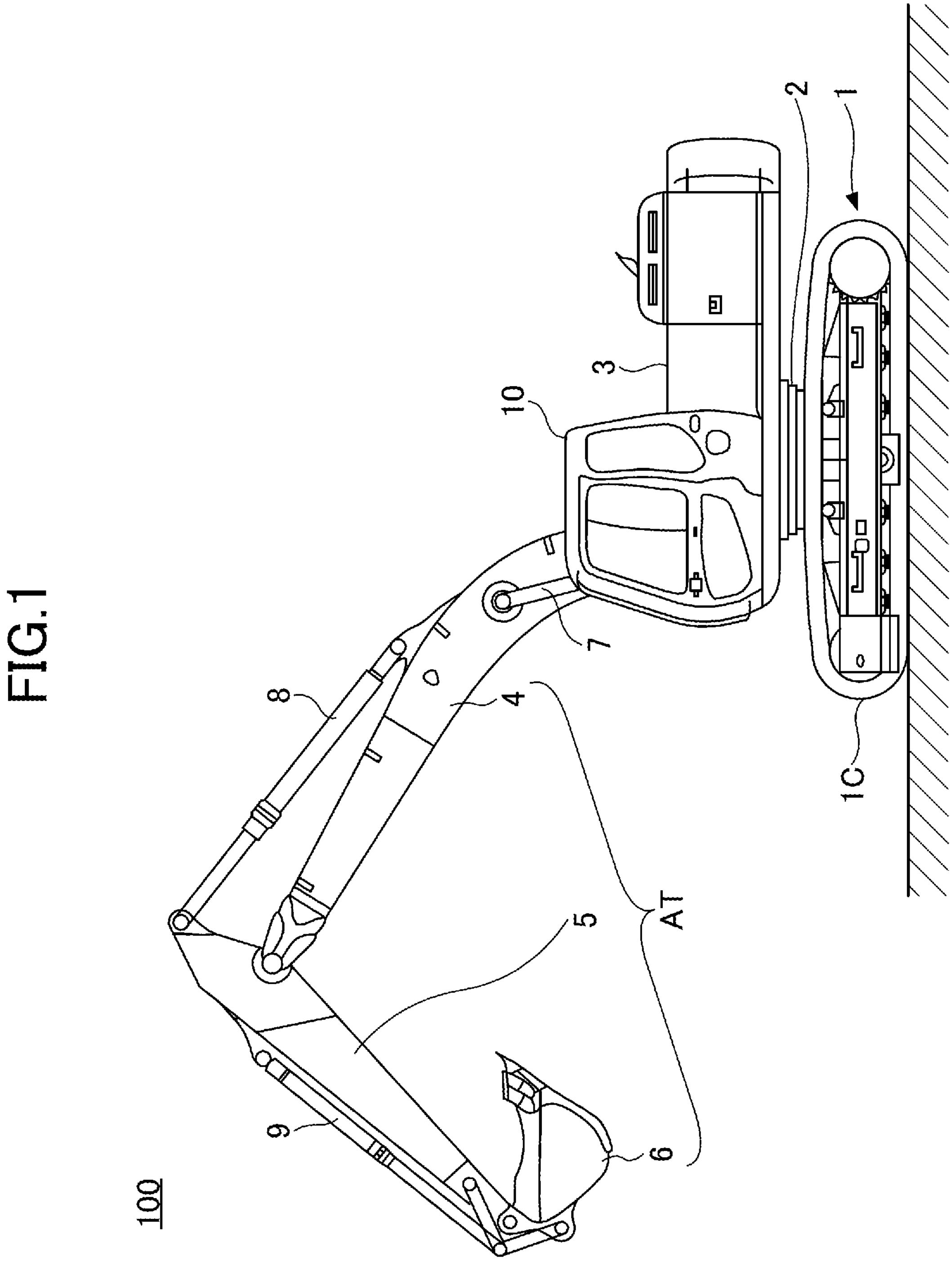
FIG. 1 is a side view of a shovel.

FIG. 1 is a side view illustrating an example of the shovel 100 according to the present embodiment.

The shovel 100 includes a lower traveling body 1, an upper turning body 3 that is turnably mounted on the lower traveling body 1 via a turning mechanism 2, an attachment AT, and a cabin 10 in which an operator is seated.

As will be described later, the cabin 10 may be omitted in a case where the shovel 100 is remotely operated or operates in a fully automatic operation.

The lower traveling body 1 includes, for example, a pair of left and right crawlers 1C (an example of driven part). The crawlers 1C of the lower traveling body 1 are hydraulically driven by a traveling hydraulic motor 1A and a traveling hydraulic motor 1B (see FIGS. 2 and 3) to cause the shovel 100 to travel.

Figure 2:
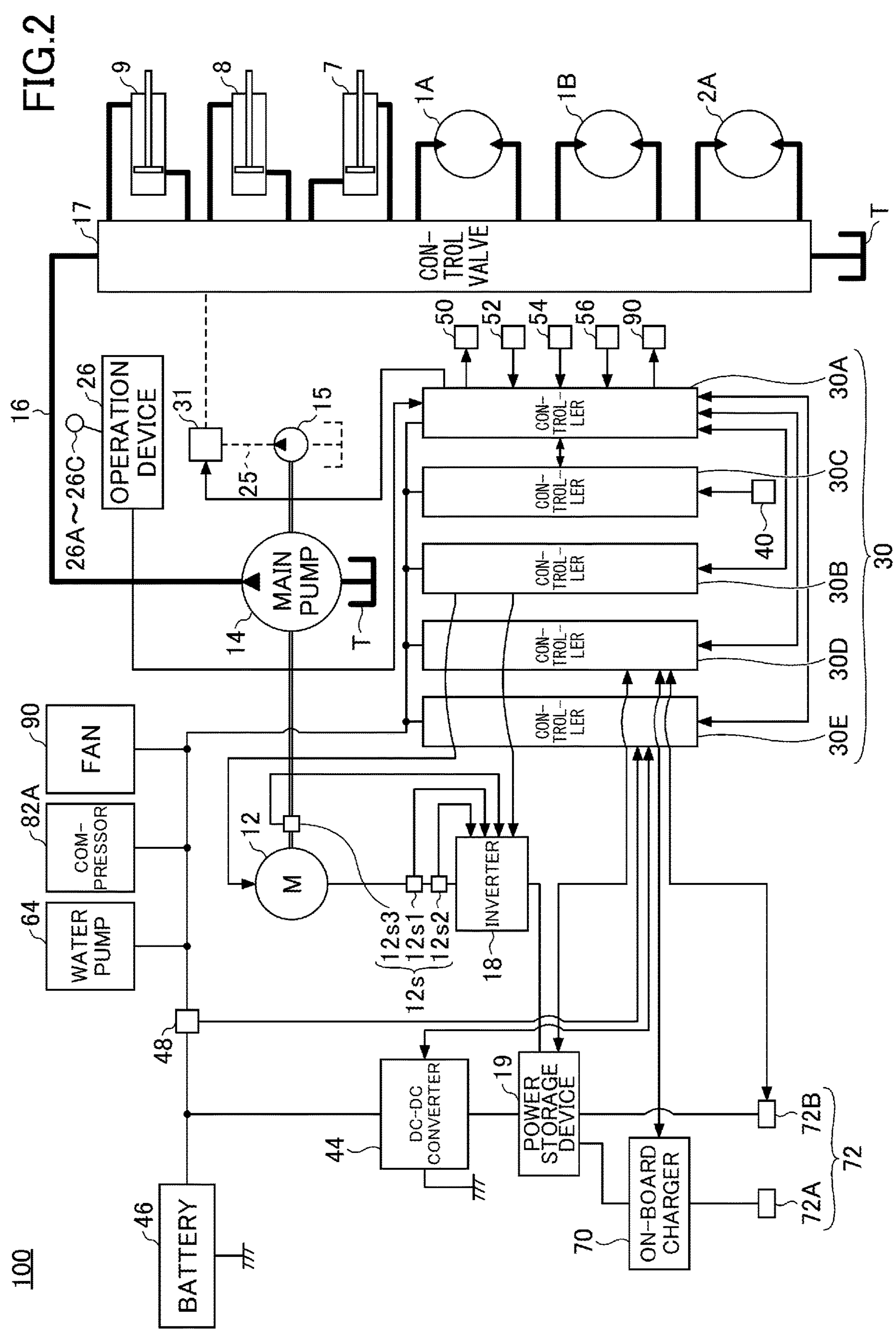
FIG. 2 is a block diagram schematically illustrating an example of a configuration of the shovel.
Figure 3:
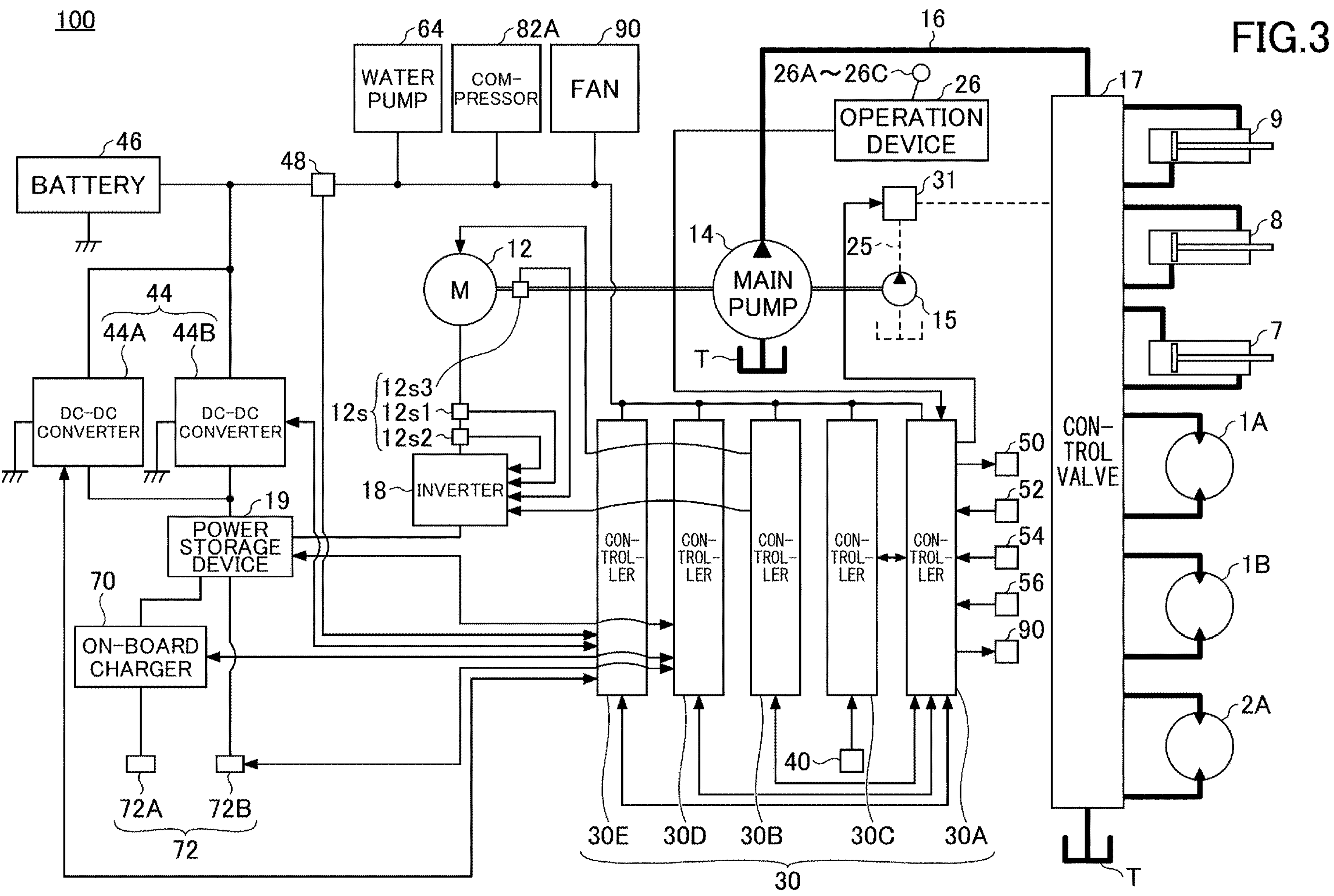
FIG. 3 is a block diagram schematically illustrating another example of a configuration of the shovel.

The upper turning body 3 (an example of a driven part) is hydraulically driven by the turning hydraulic motor 2A through the turning mechanism 2 (see FIGS. 2 and 3).

The attachment AT includes a boom 4, an arm 5, and a bucket 6.

The boom 4 (an example of a driven part) is attached to the center of the front portion of the upper turning body 3 so as to be able to rise and fall, the arm 5 (an example of a driven part) is attached to the distal end of the boom 4 so as to be able to rotate up and down, and the bucket 6 (an example of a driven part) is attached to the distal end of the arm 5 so as to be able to rotate up and down. The boom 4, the arm 5, and the bucket 6 are hydraulically driven by a boom cylinder 7, an arm cylinder 8, and a bucket cylinder 9 as hydraulic actuators, respectively.

The bucket 6 is an example of an end attachment, and is used for excavation work, rolling work, or the like.

Instead of the bucket 6, another end attachment may be attached to the distal end of the arm 5 depending on the work content or the like. The other end attachment may be a bucket of a different type than the bucket 6, for example a slope bucket, a dredging bucket, or the like. In addition, the other end attachment may be an end attachment of a type different from the bucket, such as a breaker, a stirrer, or a grabber, or the like. In addition, an auxiliary attachment such as a quick coupling or a tilt rotator may be provided at a connection portion between the end attachment including the bucket 6 and the arm 5.

In the present example, as will be described later, all the driven parts of the shovel 100 are hydraulically driven by hydraulic oil supplied from a main pump 14 (see FIG. 2) using the pump motor 12 as a power source. That is, in this embodiment, the shovel 100 corresponds to a configuration in which a prime mover (engine) of a so-called hydraulic shovel is replaced with the pump motor 12.

Some or all of the driven parts of the shovel 100 may be electrically driven. For example, the upper turning body 3 may turn with respect to the lower traveling body 1 by being electrically driven by a turning electric motor through the turning mechanism 2.

The cabin 10 is mounted on, for example, a front left side of the upper turning body 3, and a cockpit in which an operator sits, an operation device 26 to be described later, and the like are provided inside the cabin 10.

As will be described later, the cabin 10 may be omitted in a case where the shovel 100 is remotely operated or operates in a fully automatic operation.

The shovel 100 operates driven parts such as the lower traveling body 1 (left and right crawlers 1C), the upper turning body 3, the boom 4, the arm 5, the bucket 6, and the like in accordance with an operation of an operator who sits in the cabin 10.

Further, instead of or in addition to being configured to be operable by the operator sitting the cabin 10, the shovel 100 may be configured to be remotely operable from the outside of the shovel 100. When the shovel 100 is remotely operated, the inside of the cabin 10 may be in an unmanned state. Hereinafter, description will be made on the assumption that the operation of the operator includes at least one of an operation of the operator of the cabin 10 on the operation device 26 and a remote operation of an external operator.

The remote operation includes, for example, an aspect in which the shovel 100 is operated by an operation input related to an actuator of the shovel 100 performed by a predetermined external device. The external device includes, for example, a management device that performs management related to the shovel 100, a terminal device (user terminal) used by a user of the shovel 100, and the like. The same applies to remote monitoring to be described later. In this case, the shovel 100 may be equipped with a communication device capable of communicating with the external device, and may transmit, for example, images (hereinafter referred to as a "surrounding images") representing a state of the surrounding of the shovel 100 based on image information (captured image) output by an imaging device included in a surrounding information acquisition device 40 described later to the external device. Then, the external device may display the received surrounding image of the shovel 100 on a display device (hereinafter referred to as a "remote operation display device") provided in the external device. In addition, various information images (information screens) displayed on an output device 50 (display device) inside the cabin 10 of the shovel 100 may also be displayed on a remote operation display device of an external device. Accordingly, the operator of the external device can remotely operate the shovel 100 while checking display contents such as a surrounding image of the shovel 100 and an information screen displayed on the remote operation display device, for example. Then, the shovel 100 may operate the actuator according to a remote operation signal indicating the content of the remote operation received from the external device by the communication device, and drive the driven parts such as the lower traveling body 1, the upper turning body 3, the boom 4, the arm 5, the bucket 6, and the like.

The remote operation may include, for example, an aspect in which the shovel 100 is operated by a voice input, a gesture input, or the like from the outside to the shovel 100 by a person (for example, an operator) around the shovel 100. Specifically, the shovel 100 recognizes a voice uttered by a nearby worker or the like, a gesture performed by the worker, or the like, through a voice input device (for example, a microphone), a gesture input device (for example, an imaging device), or the like mounted on the shovel 100 (the shovel itself). Then, the shovel 100 may operate the actuator in accordance with the content of the recognized voice, gesture, or the like to drive the driven parts such as the lower traveling body, the upper turning body 3, the boom 4, the arm 5, the bucket 6, and the like.

In addition, the shovel 100 may automatically operate the actuators regardless of the content of the operation by the operator. Thus, the shovel 100 realizes a function (so-called "automatic driving function" or "Machine Control (MC) function") of automatically operating at least a part of the driven parts such as the lower traveling body 1, the upper turning body 3, the boom 4, the arm 5, the bucket 6, and the like.

The automatic driving function may include a function (so-called "semi-automatic driving function" or "operation-assisted MC function") of automatically operating driven parts (actuators) other than the driven parts (actuators) to be operated in response to an operator's operation or remote operation on the operation device 26. In addition, the automatic driving function may include a function (so-called "fully automatic driving function" or "fully automatic MC function") of automatically operating at least a part of a plurality of driven parts (actuators) on the assumption that there is no operation or remote operation on the operation device 26 by an operator. When the fully automatic driving function is enabled in the shovel 100, the interior of the cabin 10 may be in an unmanned state. In addition, the semi-automatic driving function, the fully automatic driving function, or the like may include an aspect in which the operation content of drive parts (actuators) that is a target of automatic driving is automatically determined in accordance with a rule defined in advance. The semi-automatic driving function, the fully automatic driving function, or the like may include an aspect (so-called "autonomous driving function") in which the shovel 100 autonomously makes various determinations and the operation content of driven parts (actuators) that is a target of automatic driving is autonomously determined in accordance with the determination result.

In addition, when the shovel 100 operates with the automatic driving function (particularly, the fully automatic driving function), the work situation by the shovel 100 may be remotely monitored from the outside of the shovel 100.

When remote monitoring is performed, the shovel 100 may be equipped with a communication device capable of communicating with an external device, and may transmit, for example, images (surrounding images) representing a state of the surrounding of the shovel 100 based on image information output by an imaging device included in the surrounding information acquisition device 40 described later to the external device. The external device may display the received image information (captured images) on a display device (hereinafter, referred to as a "remote monitoring display device") provided in the external device. Various information images (information screens) displayed on the output device 50 (display device) inside the cabin 10 of the shovel 100 may also be displayed on a remote monitoring display device of an external device in the same manner. As a result, the observer of the external device can remotely monitor the work situation of the shovel 100 while checking the display content such as the surrounding images of the shovel 100 and the information screen displayed on the remote monitoring display device, for example. In addition, for example, when there is any problem in the work situation of the shovel 100, the observer of the external device may be able to perform an emergency stop of the operation of the shovel 100 or perform an intervention operation of the shovel 100 by performing a predetermined input to the external device. In this case, the shovel 100 may perform an emergency stop of the driven parts such as the lower traveling body 1, the upper turning body 3, the boom 4, the arm 5, the bucket 6, and the like by stopping the actuators in response to a signal indicating an emergency stop received from the external device through the communication device. In addition, the shovel 100 may realize the intervention operation of the driven parts such as the lower traveling body 1, the upper turning body 3, the boom 4, the arm 5, the bucket 6, and the like by operating the actuators in accordance with a signal indicating the content of the intervention operation received from the external device through the communication device.

[Configuration of Shovel]

Next, the configuration of the shovel 100 according to the present embodiment will be described with reference to FIGS. 2 to 7 in addition to FIG. 1.

Figure 4:
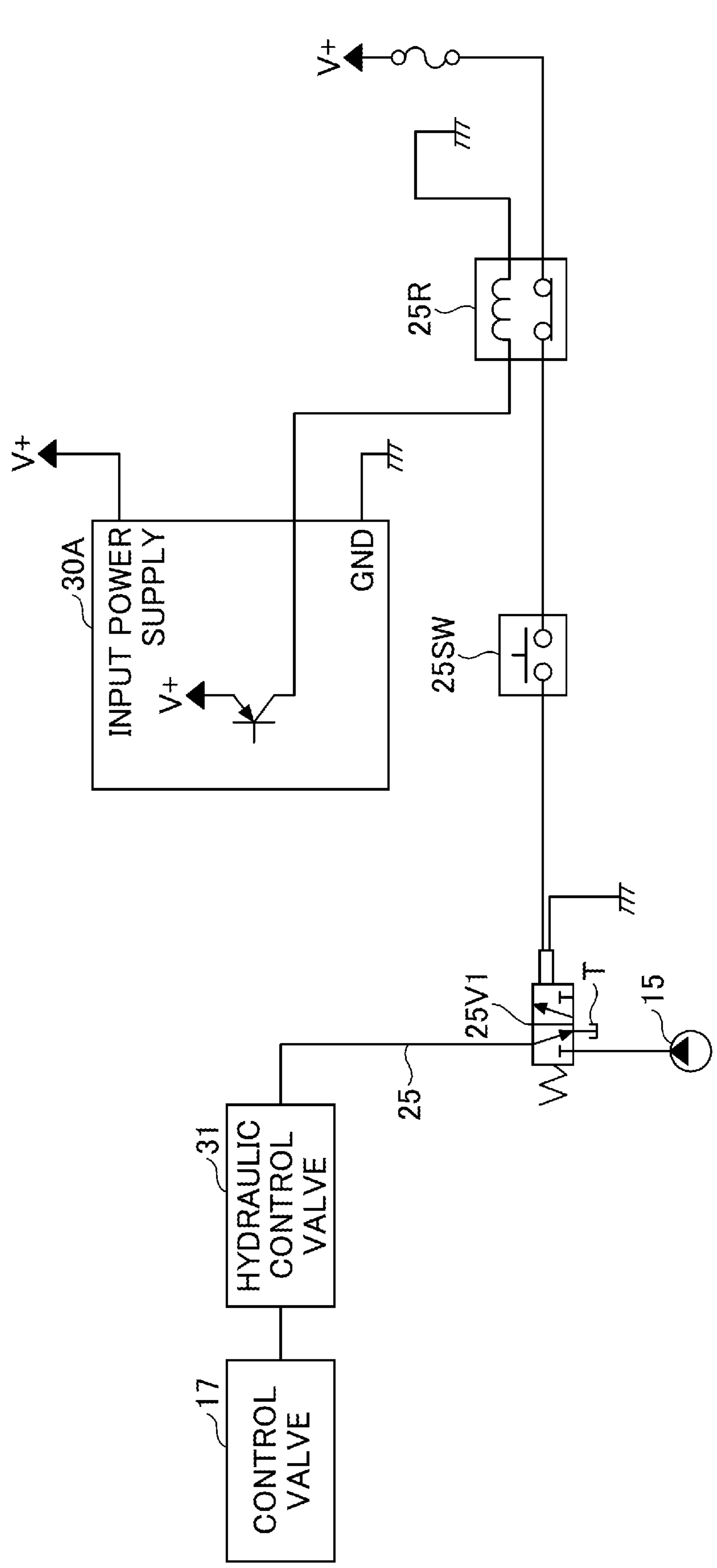
FIG. 4 is a diagram illustrating an example of a configuration relating to operation limitation of a hydraulic drive system.
Figure 5:
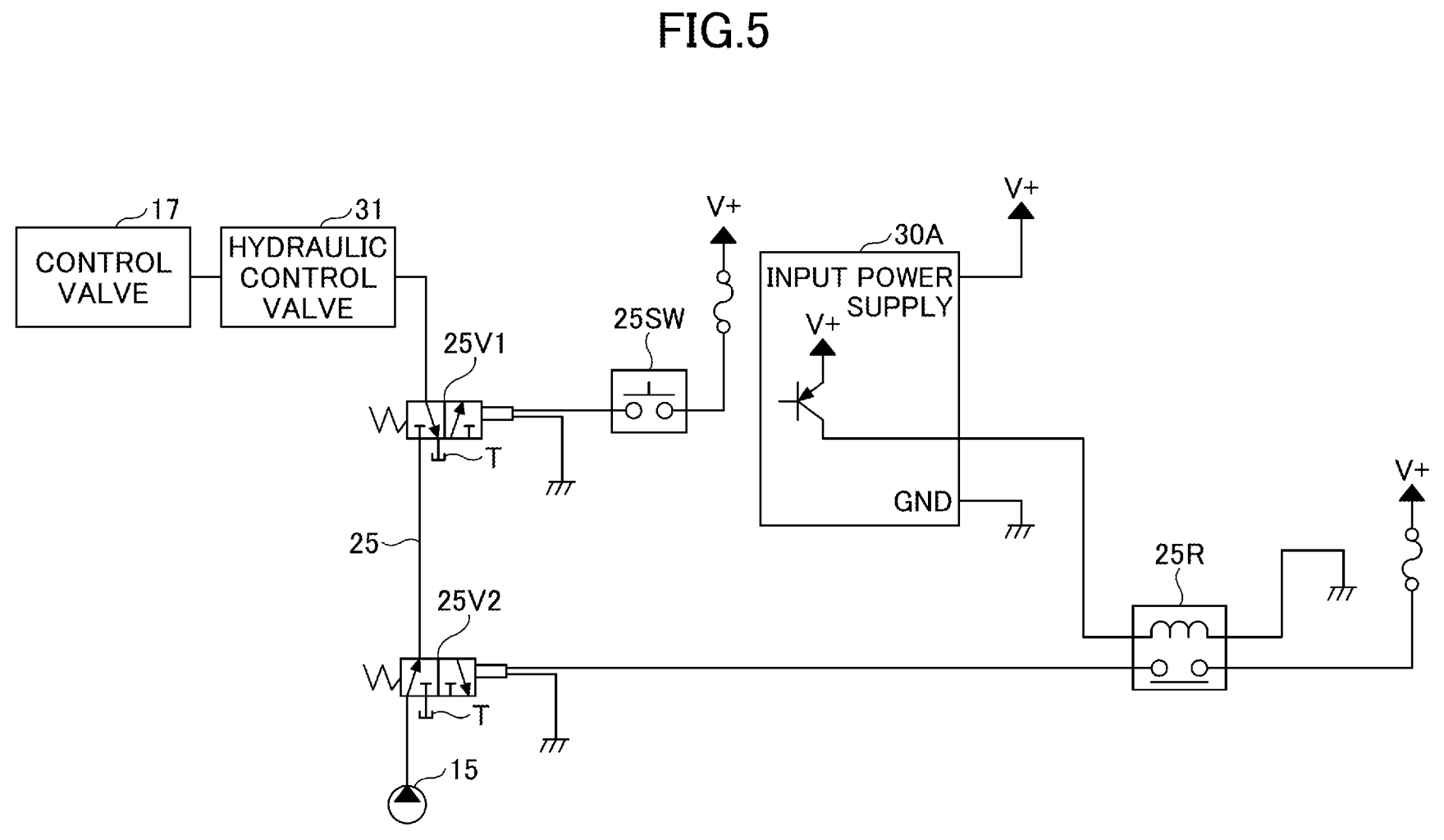
Figure 6:
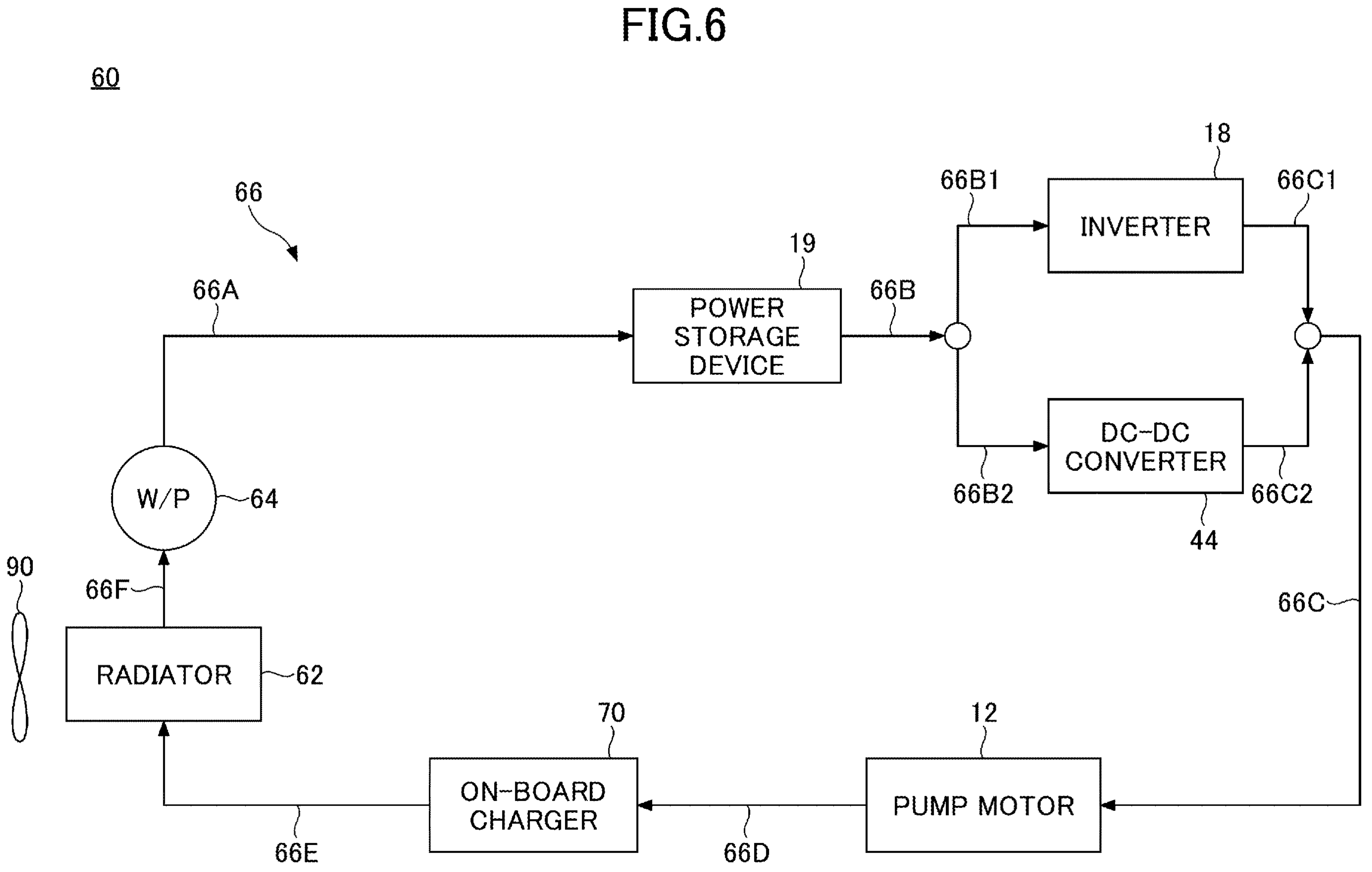
FIG. 6 is a diagram illustrating an example of a configuration of a cooling device.
Figure 7:
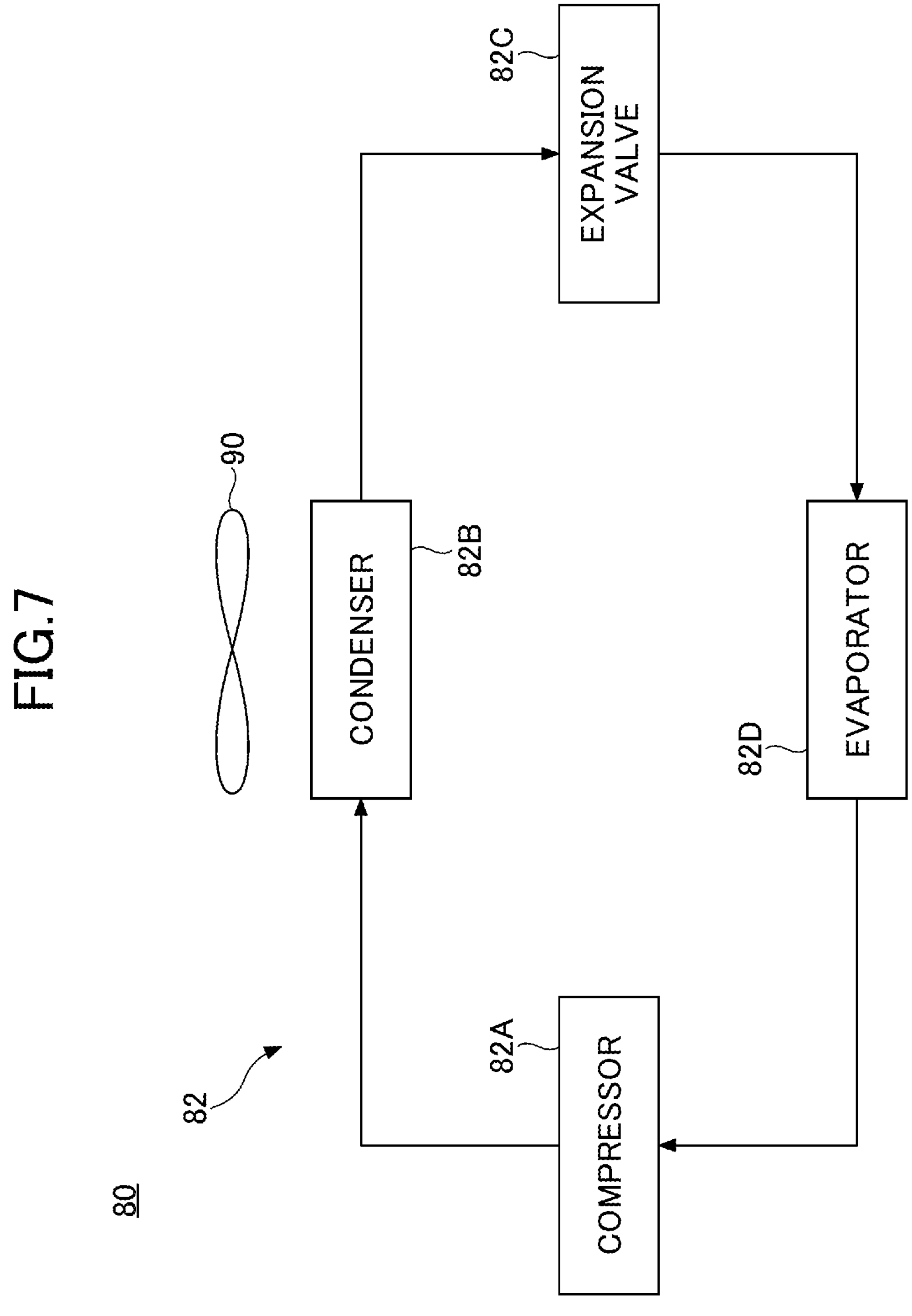
FIG. 7 is a diagram illustrating an example of a heat pump cycle of an air conditioner.

FIGS. 2 and 3 are block diagrams schematically illustrating examples of configurations of the shovel 100. FIG. 4 is a diagram illustrating an example of a configuration relating to operation limitation of a hydraulic drive system. FIG. 5 is a diagram illustrating another example of a configuration relating to operation limitation of a hydraulic control system. FIG. 6 is a diagram illustrating an example of a cooling device 60 mounted on the shovel 100 of the present embodiment. FIG. 7 is a diagram illustrating an example of a heat pump cycle 82 of an air conditioner 80 mounted on the shovel 100 of the present embodiment.

In FIGS. 2 and 3, the transmission system of the mechanical power is indicated by a double line, the transmission system of the relatively high hydraulic pressure, that is, a hydraulic oil line of the hydraulic drive system is indicated by a thick solid line, the transmission system of the pilot pressure, that is, the hydraulic oil line of the operation system is indicated by a broken line, and the transmission system of the electric power and the electric signal is indicated by a thin solid line.

The shovel 100 includes components such as a hydraulic drive system, an electric drive system, a power supply system, an operation system, a cooling system, a user interface system, a comfort system, a control system, or the like.

<Hydraulic Drive System>

The hydraulic drive system of the shovel 100 is a group of components related to hydraulic drive of the driven parts.

The hydraulic drive system of the shovel 100 includes hydraulic actuators such as the traveling hydraulic motors 1A and 1B, the boom cylinder 7, the arm cylinder 8, and the bucket cylinder 9 that hydraulically drive the driven parts such as the lower traveling body 1, the boom 4, the arm 5, and the bucket 6, respectively. The hydraulic drive system of the shovel 100 includes a pump motor 12, a main pump 14, and a control valve 17.

The pump motor 12 (an example of an electric motor) is a power source of the hydraulic drive system. The pump motor 12 is, for example, an interior permanent magnet (IPM) motor. The pump motor 12 is connected to a power storage device 19 via an inverter 18. The pump motor 12 performs a power running operation with the three phase AC power supplied from the power storage device 19 via the inverter 18 to drive the main pump 14 and the pilot pump 15. The drive control of the pump motor 12 may be executed by the inverter 18 under the control of a controller 30B described later.

The main pump 14 (an example of a hydraulic pump and a first hydraulic pump) absorbs the hydraulic oil from a hydraulic oil tank T and discharges the hydraulic oil to a high-pressure hydraulic line 16, thereby supplying the hydraulic oil to the control valve 17 through the high-pressure hydraulic line 16. As described above, the main pump 14 is driven by the pump motor 12. The main pump 14 is, for example, a variable displacement hydraulic pump, and a regulator (not shown) controls the swashplate angle (tilt angle) under the control of a controller 30A, described below. Thus, the main pump 14 can adjust the stroke length of the piston and adjust the discharge flow rate (discharge pressure).

The control valve 17 controls the hydraulic drive system in response to an operator's operation or an operation command corresponding to an automatic driving function. As described above, the control valve 17 is connected to the main pump 14 via the high-pressure hydraulic line 16, and is configured to be capable of selectively supplying the hydraulic oil supplied from the main pump 14 to the plurality of hydraulic actuators. For example, the control valve 17 is a valve unit including a plurality of control valves (direction switch valves) that control the flow rate and the flow direction of the hydraulic oil supplied from the main pump 14 to each of the hydraulic actuators. The hydraulic oil supplied from the main pump 14 and flowing through the control valve 17 and the hydraulic actuators is discharged from the control valve 17 to the hydraulic oil tank T.

<Electric Drive System>

The electric drive system of the shovel 100 is a group of components related to electric driving of a prime mover (power source) and driven parts of the shovel 100.

As illustrated in FIGS. 2 and 3, the electric drive system of the shovel 100 includes the pump motor 12, a sensor 12*s*, and the inverter 18.

When a part or all of the driven parts are electrically driven as described above, the electric drive system of the shovel 100 may include an electric actuator that drives the driven parts, an inverter that drives the electric actuator, and the like.

The sensor 12*s* includes a current sensor 12*s*1, a voltage sensor 12*s*2, and a rotation state sensor 12*s*3.

The current sensor 12*s*1 detects a current of each of the three phases (U phase, V phase, and W phase) of the pump motor 12. The current sensor 12*s*1 is provided, for example, in an electronic path between the pump motor 12 and the inverter 18. Detection signals corresponding to the respective currents of the three phases of the pump motor 12 detected by the current sensor 12*s*1 are directly taken into the inverter 18 through communication lines. Alternatively, the detection signal may be taken into a controller 30B through the communication lines, and input to the inverter 18 via the controller 30B.

The voltage sensor 12*s*2 detects voltages applied to the three phases of the pump motor 12. The voltage sensor 12*s*2 is provided, for example, in an electric path between the pump motor 12 and the inverter 18. Detection signals corresponding to the respective voltages applied to the three phases of the pump motor 12 detected by the voltage sensor 12*s*2 are directly taken into the inverter 18 through communication lines. Alternatively, the detection signal may be taken into the controller 30B through the communication lines, and input to the inverter 18 via the controller 30B.

The rotation state sensor 12*s*3 detects a rotation state of the pump motor 12. The rotation state of the pump motor 12 includes, for example, a rotation position (rotation angle), a rotation speed, and the like. The rotation state sensor 12*s*3 is, for example, a rotary encoder or a resolver. A detection signal corresponding to the rotation state of the pump motor 12 detected by the rotation state sensor 12*s*3 is directly taken into the inverter 18 through a communication line. Alternatively, the detection signal may be taken into the controller 30B through the communication line, and input to the inverter 18 via the controller 30B.

The inverter 18 drives and controls the pump motor 12 under the control of the controller 30B. The inverter 18 includes, for example, a conversion circuit that converts DC power into three phase AC power or converts three phase AC power into DC power, a drive circuit that switch-drives the conversion circuit, and a control circuit that outputs a control signal that defines the operation of the drive circuit. The control signal is, for example, a pulse width modulation (PWM) signal.

The control circuit of the inverter 18 performs drive control of the pump motor 12 while ascertaining the operating state of the pump motor 12. For example, the control circuit of the inverter 18 ascertains the operation state of the pump motor 12 based on the detection signal of the rotation state sensor 12*s*3. Further, the control circuit of the inverter 18 may ascertain the operation state of the pump motor 12 by sequentially estimating the rotation angle or the like of the rotation shaft of the pump motor 12 based on the detection signal of the current sensor 12*s*1 and the detection signal of the voltage sensor 12*s*2 (or the voltage command value generated in the control processing).

At least one of the drive circuit and the control circuit of the inverter 18 may be provided outside the inverter 18.

<Power Supply System>

The power supply system of the shovel 100 is a group of components for supplying electric power to various electric devices.

As illustrated in FIGS. 2 and 3, the power supply system of the shovel 100 includes the power storage device 19, a DC-DC converter 44, a battery 46, an on-board charger 70, and a charging port 72.

The power storage device 19 is an energy source for driving the actuators of the shovel 100. The power storage device 19 is charged (stored) by being connected to an external commercial power supply through a predetermined cable (hereinafter referred to as a "charging cable"), and supplies the charged (stored) power to the pump motor 12. The power storage device 19 is, for example, a lithium ion battery, and has a relatively high output voltage (for example, several hundred volts).

An electric power converter for boosting the output voltage of the power storage device 19 and applying the boosted voltage to the pump motor 12 may be provided between the power storage device 19 and the pump motor 12. When a part or all of the driven parts are electrically driven as described above, the electric power of the power storage device 19 is supplied to the electric actuators that electrically drive the driven parts instead of or in addition to the pump motor 12.

The DC-DC converter 44 (an example of an electric power converter) is provided in, for example, the upper turning body 3, and steps down the DC power of a very high voltage output from the power storage device 19 to a predetermined voltage (for example, about 24 volts) and outputs the DC power. The output power of the DC-DC converter 44 is supplied to and charged (stored) in the battery 46, or is supplied to an electrical device (hereinafter, referred to as a "low-voltage device") driven by the power of the battery 46. The low-voltage devices include, for example, various controllers (controllers 30A to 30E) included in the control device 30. The low-voltage devices include, for example, a water pump 64, an air conditioner 80, a fan 90, and the like which will be described later.

For example, as illustrated in FIG. 2, one DC-DC converter 44 is mounted on the shovel 100.

Further, for example, as illustrated in FIG. 3, the DC-DC converter 44 may include a plurality of DC-DC converters (two DC-DC converters 44A and 44B in the present disclosure) connected in parallel. Thus, the plurality of DC-DC converters 44A and 44B can share and output the current required by the low-voltage devices. In addition, each of the plurality of DC-DC converters 44A and 44B has a relatively small current capacitance, that is, a relatively small maximum value of current that can be outputted, and thus has a relatively small external size. Therefore, the degree of freedom of arrangement in the case of being mounted on the upper turning body 3 can be improved. Even if one of the plurality of DC-DC converters 44A and 44B cannot supply electric power due to an abnormality or the like, electric power supply from the other can be continued.

The DC-DC converter 44 may be replaced with an alternator. In this case, the alternator may be provided in the upper turning body 3 and generate electric power by the power of the pump motor 12. Similar to the case of the DC-DC converter 44, the generated electric power of the alternators is supplied to the battery 46 and is charged (stored) in the battery 46 or is supplied to low-voltage devices such as the controllers 30A to 30E.

The battery 46 is provided in the upper turning body 3 and has a relatively low output voltage (for example, 24 volts). The battery 46 supplies electric power to low-voltage devices other than the electric drive system that require relatively high power. The battery 46 is, for example, a lead storage battery or a lithium ion battery, and is charged with the output power of the DC-DC converter 44 as described above.

The on-board charger 70 charges the power storage device 19 by converting single-phase AC power of a relatively low-voltage (for example, 100 volts or 200 volts) supplied from an external power supply through a charging port 72A described later into DC power and outputting the DC power to the power storage device 19.

The charging port 72 is provided on a side surface of the upper turning body 3, for example, and is connected by inserting a distal end of a charging cable extending from an external power supply. The charging port 72 includes charging ports 72A and 72B.

A charging cable extending from an external power supply (for example, commercial power source) capable of supplying single-phase AC power of relatively low voltage, for example, can be connected to the charging port 72A. The charging port 72A is connected to an on-board charger 70 by an electric power line (wire harness), and supplies power supplied from the external power supply to the power storage device 19 through the on-board charger 70. Thus, so-called normal charging of the power storage device 19 is realized.

For example, a charging cable extending from an external power supply capable of supplying DC power of a relatively high voltage (for example, 400 volts) is connected to the charging port 72B. The charging port 72B is directly connected to the power storage device 19 by an electric power line (wire harness), and directly supplies DC power supplied from the external power supply to the power storage device 19. Thus, so-called quick charging of the power storage device 19 is realized.

<Operation System>

The operation system of the shovel 100 is a group of components related to the operation of the driven parts.

As illustrated in FIGS. 2 and 3, the operation system of the shovel 100 includes the pilot pump 15, the operation device 26, and a hydraulic control valve 31. As illustrated in FIG. 4, the operation system of the shovel 100 includes a gate lock valve 25V1, a gate lock switch 25SW, and a relay 25R. As illustrated in FIG. 5, the operation system of the shovel 100 may include a switch valve 25V2 in addition to the relay 25R.

The pilot pump 15 (an example of a second hydraulic pump) supplies a pilot pressure to various hydraulic devices (for example, the hydraulic control valve 31) mounted on the shovel 100 via the pilot line 25. Thus, under the control of the controller 30A, the hydraulic control valve 31 can supply the pilot pressure corresponding to the operation content (for example, an operation amount or an operation direction) of the operation device 26 to the control valve 17. Therefore, the controller 30A and the hydraulic control valve 31 can realize the operation of the driven parts (hydraulic actuators) according to the operation content of the operator on the operation device 26. Further, under the control of the controller 30A, the hydraulic control valve 31 can supply the pilot pressure corresponding to the content of the remote operation designated by the remote operation signal to the control valve 17. In addition, under the control of the controller 30A, the hydraulic control valve 31 can supply a pilot pressure corresponding to an operation command corresponding to the automatic driving function to the control valve 17. The pilot pump 15 is, for example, a fixed displacement hydraulic pump, and is driven by the pump motor 12 as described above.

It should be noted that the pilot pump 15 may be omitted. In this case, the hydraulic oil discharged from the main pump 14 and reduced to a predetermined pilot pressure via a pressure reducing valve or the like may be supplied to various hydraulic devices such as the hydraulic control valve 31 and the like.

The operation device 26 is provided within reach of an operator in a cockpit of the cabin 10, and is used by the operator to operate the respective driven parts (that is, the left and right crawlers 1C of the lower traveling body 1, the upper turning body 3, the boom 4, the arm 5, the bucket 6, and the like). In other words, the operation device 26 is used for the operator to operate actuators (for example, the traveling hydraulic motors 1A and 1B, the boom cylinder 7, the arm cylinder 8, the bucket cylinder 9, and the like) that drive the respective driven parts. For example, as illustrated in FIGS. 2 and 3, the operation device 26 is of an electric type and outputs an electric signal (hereinafter, referred to as an "operation signal") corresponding to an operation content by the operator. An operation signal output from the operation device 26 is input to the controller 30A. As a result, the control device 30 including the controller 30A can control the hydraulic control valve 31 and the like to control the operations of the driven parts (actuators) of the shovel 100 in accordance with the operation content of the operator, the operation command corresponding to the automatic operation function, and the like.

The operation device 26 includes, for example, levers 26A to 26C. For example, the lever 26A may be configured to be able to receive an operation related to each of the arm 5 (arm cylinder 8) and the upper turning body 3 (turning operation) in accordance with an operation in the front-rear direction and the left-right direction. For example, the lever 26B may be configured to be able to receive an operation related to each of the boom 4 (boom cylinder 7) and the bucket 6 (bucket cylinder 9) according to an operation in the front-rear direction and the left-right direction. For example, the lever 26C may be configured to be able to receive an operation of the lower traveling body 1 (crawler 1C).

When the control valve 17 is constituted by an electromagnetic pilot type hydraulic control valve (direction switch valve), an operation signal of the electric operation device 26 may be directly input to the control valve 17, and each hydraulic control valve may perform an operation according to the operation content of the operation device 26. Further, the operation device 26 may be a hydraulic pilot type that outputs a pilot pressure according to the operation content. In this case, the pilot pressure corresponding to the operation content is supplied to the control valve 17.

The hydraulic control valve 31 outputs a predetermined pilot pressure by using the hydraulic oil supplied from the pilot pump 15 through the pilot line 25 under the control of the controller 30A. The pilot line on the secondary side of the hydraulic control valve 31 is connected to the control valve 17, and the pilot pressure output from the hydraulic control valve 31 is supplied to the control valve 17.

The gate lock valve 25V1 is a switch valve provided in the pilot line 25. The gate lock valve 25V1 is, for example, an electromagnetic solenoid valve. In the non-energized state (the state illustrated in FIGS. 4 and 5), the gate lock valve 25V1 maintains the spool at the right-hand position in the drawing by its elastic force to bring the pilot line 25 into the disconnected state. In this case, the gate lock valve 25V1 discharges the hydraulic oil of the pilot line 25 on the downstream side to the hydraulic oil tank T. On the other hand, when the gate lock valve 25V1 is in the energized state, the spool is moved in the left direction against the elastic force by the action of the electromagnetic solenoid to bring the pilot line 25 into the connected state. In this case, the gate lock valve 25V1 supplies the hydraulic oil of the pilot pump 15 to the downstream side.

The gate lock switch 25SW is provided in an electric power line between the battery 46 and the gate lock valve 25V1 (electromagnetic solenoid). When the gate lock switch 25SW is in the OFF state, the gate lock switch 25SW opens the electric power line and brings the gate lock valve 25V1 into the non-energized state. When the gate lock switch 25SW is in the ON state, the gate lock switch 25SW closes the electric power line and brings the gate lock valve 25V1 into the energized state.

The gate lock switch 25SW is turned on and off in accordance with an operation state of a gate lock lever in the cabin 10. The gate lock switch 25SW is, for example, a limit switch that operates in conjunction with the operation of the gate lock lever.

The gate lock switch 25SW is turned off when the gate lock lever is in an operation state corresponding to a state in which the gate bar is pulled up, that is, a state in which the cockpit of the cabin 10 is opened to allow get on and off the cabin 10. Thus, in a state where the gate bar is pulled up, the gate lock valve 25V1 maintains the pilot line 25 in a disconnected state. Therefore, the gate lock switch 25SW can operate the gate lock valve 25V1 so that the pilot pressure is not supplied to the hydraulic control valve 31 in accordance with a situation in which the operator of the cabin 10 does not intend to operate the cabin 10 or a situation in which the operator is absent in the cabin 10. On the other hand, the gate lock switch 25SW is turned on when the gate bar is in a lowered state, that is, in an operating state corresponding to a state in which the cockpit in the cabin 10 is closed so that the operator cannot get on and off. As a result, the gate lock switch 25SW can operate the gate lock valve 25V1 so that the pilot pressure is supplied to the hydraulic control valve 31 in accordance with the situation in which the operator of the cabin 10 has the intention of operating.

The relay 25R is used to block (disconnect) the pilot line 25 regardless of the operation state of the gate lock lever, that is, the state of the gate lock switch 25SW.

For example, as illustrated in FIG. 4, the relay 25R is disposed on an electric power line between the battery 46 and the gate lock valve 25V1 (electromagnetic solenoid). In this case, the relay 25R is a normally closed type, and is opened when the relay 25R is energized by a control current input from the controller 30A. As a result, the controller 30A energizes the relay 25R and opens the relay 25R. Thus, even when the gate lock switch 25SW is in the ON state, the gate lock valve 25V1 is in the non-energized state and the pilot line 25 can be shifted to the disconnected state. Therefore, the control device 30 (controller 30A) can stop the operation of the driven parts (hydraulic actuators).

Further, for example, as illustrated in FIG. 5, the relay 25R may be provided in an electric power line between the battery 46 and the switch valve 25V2 (electromagnetic solenoid). In this case, the relay 25R is a normally open type, and is closed when the relay 25R is energized by a control current input from the controller 30A.

The switch valve 25V2 is provided in the pilot line 25. For example, as illustrated in FIG. 5, the switch valve 25V2 may be provided downstream of the gate lock valve 25V1 in the pilot line 25, or may be provided upstream of the gate lock valve 25V1. The switch valve 25V2 is, for example, an electromagnetic solenoid valve. Similar to the gate lock valve 25V1, in the non-energized state (the state illustrated in FIG. 5), the switch valve 25V2 maintains the spool at the position on the right side in the drawing by an elastic force and brings the pilot line 25 into the connected state. On the other hand, when the switch valve 25V2 is energized, the spool moves to the left against the elastic force under the action of the electromagnetic solenoid to disconnect the pilot line 25.

When the coil of the relay 25R is in a non-energized state, the relay 25R is opened, so that the switch valve 25V2 maintains the pilot line 25 in a connected state. On the other hand, in a state where the coil of the relay 25R is energized by the controller 30A, the relay 25R is closed, so that the switch valve 25V2 maintains the pilot line 25 in a disconnected state. Thus, the control device 30 (controller 30A) can shift the switch valve 25V2 to the disconnected state even when the gate lock valve 25V1 is in the connected state. Therefore, the control device 30 (controller 30A) can stop the operation of the driven parts (hydraulic actuators).

The relay 25R and the control valve 25V2 may be omitted. In this case, the control device 30 may limit the operation of the driven parts (hydraulic actuators) by controlling the pilot pressure output from the hydraulic control valve 31, for example.

<Cooling System>

The cooling system of the shovel 100 is a group of components for cooling components that generate heat in association with the operation of the shovel 100.

As illustrated in FIG. 6, the cooling system of the shovel 100 includes a cooling device 60 and a fan 90.

The cooling device 60 cools an electric drive system device, a power supply system device having a relatively high voltage, and the like in the shovel 100. For example, as illustrated in FIG. 6, the devices to be cooled by the cooling device 60 include the pump motor 12, the inverter 18, the power storage device 19, the DC-DC converter 44, the on-board charger 70, and the like.

It should be noted that, as long as the condition related to the required cooling performance for each of the plurality of cooling targets is satisfied, the connection mode in a refrigerant circuit 66 of the cooling target configured to allow the refrigerant to pass around or inside the refrigerant circuit 66 may be arbitrary. That is, as long as the condition regarding the required cooling performance for each of the plurality of cooling targets is satisfied, some or all of the plurality of cooling targets cooled by the refrigerant circuit 66 may be connected in series, or some or all of the plurality of cooling targets may be connected in parallel. Further, as long as the condition related to the required cooling performance for each of the plurality of cooling targets is satisfied, the order of arrangement of the plurality of cooling targets starting from a radiator 62 in the refrigerant circuit 66 may be arbitrary.

The cooling device 60 includes the radiator 62, the water pump 64, and the refrigerant circuit 66.

The radiator 62 cools the refrigerant (for example, cooling water) in the refrigerant circuit 66. Specifically, the radiator 62 performs heat exchange between the surrounding air and the refrigerant to cool the refrigerant.

The water pump 64 (an example of an electrical load or a refrigerant pump) circulates the refrigerant in the refrigerant circuit 66. The water pump 64 operates with electric power supplied from the DC-DC converter 44 or the battery 46, for example.

The refrigerant circuit 66 (an example of a circulation circuit) includes refrigerant flow paths 66A, 66B, 66C, 66C1, 66C2, 66D, 66D1, 66D2, 66E, and 66F.

The refrigerant flow path 66A connects the water pump 64 and the power storage device 19, and causes the refrigerant discharged from the water pump 64 to flow into a refrigerant flow path inside or around the power storage device 19. Thus, the cooling device 60 can cool the power storage device 19 with the refrigerant. The refrigerant flowing through the refrigerant flow path inside or around the power storage device 19 flows out to the refrigerant flow path 66B.

The refrigerant flow paths 66B, 66B1, 66B2 connect the power storage device 19 to the inverters 18 and the DC-DC converter 44. The refrigerant flow paths 66B, 66B1, and 66B2 cause the refrigerant flowing out of a refrigerant flow path inside or around the power storage device 19 to flow into refrigerant flow paths inside or around the inverter 18 and the DC-DC converter 44. To be specific, the refrigerant flow path 66B whose one end is connected to the power storage device 19 is branched at the other end into refrigerant flow paths 66B1 and 66B2, which are connected to the inverters 18 and the DC-DC converter 44, respectively. The refrigerant flow paths 66B1 and 66B2 allow the refrigerant to flow into the refrigerant paths inside or around the inverter 18 and the DC-DC converter 44. Thus, the cooling device 60 can cool the inverter 18 and the DC-DC converter 44 with the refrigerant. The refrigerant flowing through the refrigerant flow path inside or around the inverter 18 flows out to the refrigerant flow path 66C1. The refrigerant flowing through the refrigerant flow path inside or around the DC-DC converter 44 flows out to the refrigerant flow path 66C2.

The refrigerant flow paths 66C, 66C1, 66C2 connect the inverter 18 and the DC-DC converter 44 to the pump motor 12. The refrigerant flow paths 66C, 66C1, 66C2 cause the refrigerant flowing out of the refrigerant flow paths inside or around the inverter 18 and the DC-DC converter 44 to flow into a refrigerant flow path inside or around the pump motor 12. To be more specific, the refrigerant flow paths 66C1 and 66C2 whose one ends are connected to the inverter 18 and the DC-DC converter 44, respectively, join one end of the refrigerant flow path 66C, and the other end of the refrigerant flow path 66C is connected to the pump motor 12. Thus, the cooling device 60 can cool the pump motor 12 with the refrigerant. The refrigerant flowing through the refrigerant flow path inside or around the pump motor 12 flows out to the refrigerant flow path 66D.

When an electric power converter is provided between the power storage device 19 and the pump motor 12, the electric power converter may be cooled by the cooling device 60. In this case, the electric power converter may be disposed in parallel with the inverter 18 and the DC-DC converter 44 in the refrigerant circuit 66, for example, and may be cooled by the refrigerant flowing out of the power storage device 19. Further, the DC-DC converter 44 may be air-cooled. In this case, the refrigerant flow paths 66B2 and 66C2 are omitted. At least a portion of the inverter 18 and the DC-DC converter 44 may be disposed in series in the refrigerant circuit 66.

The refrigerant flow path 66D connects the pump motor 12 and the on-board charger 70, and causes the refrigerant flowing out of a refrigerant flow path inside or around the pump motor 12 to flow into a refrigerant flow path inside or around the on-board charger 70. Thus, the cooling device 60 can cool the on-board charger 70 with the refrigerant. The refrigerant flowing through a refrigerant flow path inside or around the on-board charger 70 flows out to the refrigerant flow path 66E.

The refrigerant flow path 66E connects the on-board charger 70 and the radiators 62, and supplies the radiator 62 with refrigerant flowing out of a refrigerant flow path inside or around the on-board charger 70. As a result, the refrigerant circuit 66 cools the various devices of the electric drive system and the power supply system so that the refrigerant whose temperature has risen can be cooled by the radiator 62 to return the various devices of the electric drive system and the power supply system to a coolable state again.

The refrigerant flow path 66F connects the radiator 62 and the water pump 64, and supplies the refrigerant cooled by the radiator 62 to the water pump 64. Thus, the water pump 64 can discharge the refrigerant cooled by the radiator 62 to the refrigerant flow path 66A and circulate the refrigerant in the refrigerant circuit 66.

The fan 90 (an example of an electrical load or a cooling fan) operates under the control of the control device 30 (for example, the controller 30A) and blows air toward a predetermined device that performs heat exchange with air (hereinafter, referred to as a "heat exchanging device"). The fan 90 operates, for example, with electric power supplied from the DC-DC converter 44 or the battery 46.

For example, as illustrated in FIG. 6, the fan 90 may blow air toward the radiator 62 to cool the radiator 62. As a result, air capable of performing heat exchange with the refrigerant flowing through the inside is sequentially supplied to the surrounding of the radiator 62, and the degree of cooling of the refrigerant by the radiator 62 can be increased.

One fan 90 may be provided, or a plurality of fans 90 may be provided as described later. That is, an arbitrary number of fans 90 may be provided as long as the degree of heat exchange (degree of cooling or degree of heating) required for the heat exchanging device can be ensured.

The cooling system of the shovel 100 may include an oil cooler that cools hydraulic oil used in a hydraulic drive system (high-pressure hydraulic line) and an operation system (pilot line). The oil cooler may be provided in, for example, a return oil passage between the control valve 17 and the hydraulic oil tank T, and may cool the hydraulic oil by performing heat exchange between the surrounding air and the hydraulic oil flowing through the inside. In this case, the fan 90 may blow air toward the oil cooler to cool the oil cooler. As a result, air capable of performing heat exchange with the hydraulic oil flowing through the inside is sequentially supplied to the surrounding of the oil cooler, and the degree of cooling of the hydraulic oil by the oil cooler can be increased. In this case, the fan 90 that blows air to the radiator 62 and the fan 90 that blows air to the oil cooler may be common, that is, the same fan 90, or may be different fans 90.

<User Interface System>

A user interface system of the shovel 100 is a group of components related to exchange of information with a user.

As illustrated in FIGS. 2 and 3, the user interface system includes an output device 50 and an input device 52.

The output device 50 (an example of a notification device) outputs various types of information to a user under the control of the control device 30 (for example, the controller 30A). For example, the output device 50 includes an output device that is provided inside the cabin 10 and outputs various types of information to a user (for example, an operator) inside the cabin 10. In addition, for example, the output device 50 may include an output device that is provided outside the cabin 10 and outputs various types of information to a user (for example, a worker, a supervisor, or the like around the shovel 100) around the shovel 100.

The output device 50 includes, for example, a display device, an illumination device that outputs (notifies) information to the user by a visual method. The display device may display various information images under the control of the controller 30A. The display device is, for example, a liquid crystal display, an organic electroluminescence (EL) display, or the like. The illumination device is, for example, a warning lamp or the like.

The output device 50 includes, for example, a sound output device that outputs information to the user in an auditory manner. The sound output device is, for example, a buzzer, a speaker, or the like.

The input device 52 receives various inputs from a user. For example, the input device 52 includes an input device that is provided inside the cabin 10 and receives various inputs from the user (for example, an operator) inside the cabin 10. For example, the input device 52 may include an input device that is provided outside the cabin 10 and receives various inputs from a user outside the cabin 10 (for example, a worker, a supervisor, or the like around the shovel 100).

The input device 52 may include, for example, an operation input device that receives an operation input of a user. The operation input device includes, for example, a button, a toggle, a lever, a touch panel, a touch pad, and the like. In addition, the input device 52 may include, for example, a voice input device that receives voice input from the operator or a gesture input device that receives gesture input from the operator. The voice input device includes, for example, a microphone that acquires voice of the user. The gesture input device includes, for example, a camera capable of capturing a state of a gesture of the user. A signal corresponding to an input from the operator received by the input device 52 is taken into the control device 30 (for example, the controller 30A).

<Comfort Equipment System>

A comfort equipment system of the shovel 100 is a group of components relating to a comfort equipment of the user (operator) inside the cabin 10.

As illustrated in FIG. 7, the comfort equipment system of the shovel 100 includes an air conditioner 80. As also illustrated in FIG. 7, the comfort equipment system of shovel 100 includes a fan 90.

The air conditioner 80 (an example of an electrical load) adjusts a state of the air inside the cabin 10, specifically, the temperature, humidity, and the like of the air. The air conditioner 80 operates, for example, with electric power supplied from the DC-DC converter 44 or the battery 46. The air conditioner 80 is, for example, a heat pump type for both cooling and heating, and includes a heat pump cycle 82.

The air conditioner 80 may include, for example, a refrigeration cycle and a heater for heating instead of the heat pump cycle 82. The heater for heating may include, for example, a positive temperature coefficient (PTC) heater. Examples of the heater include a heater, a combustion heater, and the like.

As illustrated in FIG. 7, the heat pump cycle 82 includes a compressor 82A, a condenser 82B, an expansion valve 82C, and an evaporator 82D.

It should be noted that arrows in FIG. 7 indicate the flow of the refrigerant during the cooling operation of the air conditioner 80, and the flow of the refrigerant during the heating operation of the air conditioner 80 is in the opposite direction.

The compressor 82A compresses the refrigerant in the heat pump cycle 82. The compressor 82A includes, for example, a built-in motor and an inverter circuit for driving the motor, and is electrically driven by electric power supplied from the battery 46 or the DC-DC converter 44. The refrigerant compressed by the compressor 82A is sent to the condenser 82B during the cooling operation of the air conditioner 80, and is sent to the evaporator 82D during the heating operation of the air conditioner 80.

It should be noted that the compressor 82A may be driven by electric power directly supplied from the power storage device 19. Alternatively, the compressor 82A may be mechanically driven by the pump motor 12.

During the cooling operation of the air conditioner 80, the condenser 82B cools the refrigerant in a gas state that is compressed by the compressor 82A and has a relatively high temperature. To be specific, the condenser 82B dissipates heat of the refrigerant to the outside air by heat exchange between the refrigerant flowing through the condenser 82B and the outside air, thereby cooling the refrigerant. The refrigerant cooled in the condenser 82B changes to a liquid state.

During the heating operation of the air conditioner 80, the condenser 82B absorbs heat from the outside air by heat exchange between the refrigerant flowing through the condenser 82B and the outside air, and increases the temperature of the refrigerant that has been reduced to a relatively low temperature by pressure reduction through the expansion valve 82C.

The expansion valve 82C rapidly reduces the pressure of the flowing refrigerant and lowers the temperature of the refrigerant. The expansion valve 82C rapidly lowers the pressure of the refrigerant that is in a liquid state and under high-pressure delivered from the condenser 82B during the cooling operation of the air conditioner 80, thereby lowering the temperature. Furthermore, the expansion valve 82C rapidly lowers the pressure of the refrigerant that is in a liquid state and under high-pressure delivered from the evaporator 82D during the heating operation of the air conditioning system 80, thereby lowering the temperature.

The evaporator 82D exchanges heat between the refrigerant flowing through the inside of the evaporator 82D and the air sent from the air conditioner 80 into the cabin 10. The evaporator 82D cools the air delivered into cabin 10 during the cooling operation of air conditioner 80 in the form of a relatively low-temperature refrigerant (gas-liquid mixture) delivered from the expansion valve 82C that removes heat from the air. The evaporator 82D warms the air delivered into the cabin 10 during heating operation of the air conditioner 80 in the form of air taking heat from the relatively high temperature refrigerant (gaseous state) delivered from the compressor 82A.

For example, as illustrated in FIG. 7, the fan 90 may blow air toward the condenser 82B to cool or heat the condenser 82B. As a result, air capable of performing heat exchange with the refrigerant flowing through the inside the condenser 82B is sequentially supplied to the surrounding of the condenser 82B, and the degree of cooling or heating of the refrigerant by the condenser 82B can be increased.

<Control System>

The control system of the shovel 100 is a group of components related to various controls of the shovel 100.

As illustrated in FIGS. 2 and 3, the control system of the shovel 100 includes a control device 30. The control system of the shovel 100 includes the surrounding information acquisition device 40, a sensor 48, and temperature sensors 54 and 56.

The control device 30 includes controllers 30A to 30E.

The functions of the controllers 30B to 30E may be integrated into the controller 30A. That is, various functions realized by the control device 30 may be realized by one controller or may be realized in a distributed manner by two or more controllers which are appropriately set.

The functions of the controllers 30A to 30E may be realized by arbitrary hardware or a combination of arbitrary hardware and software. For example, each of the controllers 30A to 30E is mainly configured by a computer including central processing unit (CPU), a memory device such as a random access memory (RAM), an auxiliary storage device such as a read only memory (ROM), an interface device with the outside, and the like. The controllers 30A to 30E implement various functions by, for example, loading programs installed in the auxiliary storage devices into the memory devices and executing the programs on the CPU.

The controller 30A performs drive control of the shovel 100 in cooperation with various controllers constituting the control device 30 including the controllers 30B to 30E.

For example, the controller 30A outputs a control command to the hydraulic control valve 31 in response to an operation signal input from the operation device 26, and causes the hydraulic control valve 31 to output a pilot pressure corresponding to the operation content of the operation device 26. Thus, the controller 30A can realize the operation of the driven parts (hydraulic actuators) of the shovel 100 corresponding to the operation content of the electric operation device 26.

When the shovel 100 is remotely operated, the controller 30A may perform control related to the remote operation, for example. To be specific, the controller 30A may output a control command to the hydraulic control valve 31 and cause the hydraulic control valve 31 to output a pilot pressure corresponding to the content of the remote operation. Thus, the controller 30A can realize the operation of the driven parts (hydraulic actuators) of the shovel 100 corresponding to the content of the remote operation.

In addition, the controller 30A may perform control related to an automatic driving function, for example. To be specific, the controller 30A may output a control command to the hydraulic control valve 31, and cause a pilot pressure corresponding to an operation command corresponding to the automatic driving function to act on the control valve 17 from the hydraulic control valve 31. Thus, the controller 30A can realize the operation of the driven parts (hydraulic actuators) of the shovel 100 corresponding to the automatic driving function.

For example, the controller 30A may integrally control operations of the entire shovel 100 (various devices mounted on the shovel 100) based on two-way communication with various controllers such as the controllers 30B to 30E.

The controller 30B performs control related to the electric drive system based on various kinds of information (for example, a control command including an operation signal of the operation device 26) input from the controller 30A.

For example, the controller 30B outputs a control command to the inverter 18 to perform drive control of the pump motor 12.

When the electric power converter is provided between the power storage device 19 and the pump motor 12 as described above, the controller 30B may, for example, output a control command to the electric power converter to control the operation of the electric power converter.

The controller 30C performs control related to a surrounding monitoring function of the shovel 100.

For example, the controller 30C detects a predetermined object (hereinafter, referred to as a "monitoring object") around the shovel 100 and estimates the position of the monitoring object based on the situation of the three-dimensional space around the shovel 100 taken in from the surrounding information acquiring device 40. The monitoring object includes, for example, a person. Examples of the monitoring object include another work vehicle and another work machine. In addition, the monitoring object may include, for example, a utility pole, a pylon, a fence, a material of a site, and the like. The data regarding the situation of the three-dimensional space around the shovel 100 includes, for example, detection data regarding an object around the shovel 100 and the position of the object.

In addition, for example, when a monitoring object is detected within a predetermined monitoring range, the controller 30C outputs an alarm to a user in the cabin 10 and the surrounding of the shovel 100 through the output device 50 (for example, a display device, a sound output device, or the like). For example, the monitoring range is appropriately set as a range around the shovel 100 in which the distance from the shovel 100 is relatively short.

In addition, for example, when a monitoring object is detected within a predetermined monitoring range, the controller 30C may limit the operation of the driven parts (actuators) of the shovel 100.

The limitation of the operation of the driven parts includes, for example, stopping the operation of the driven parts. The controller 30C may forcibly stop the operation of the driven parts (hydraulic actuators) by, for example, outputting a request signal to the controller 30A to open the relay 25R described above. The controller 30C may also output a request signal to the controller 30A to force the driven parts (hydraulic actuators) to stop the operation by disabling the operation by an operator or operation command.

The limitation of the operation of the driven parts include, for example, deceleration of the operation of the driven parts. For example, the controller 30C may output a request signal to the controller 30A, relatively reduce the pilot pressure output from the hydraulic control valve 31 to the control valve 17, and decelerate the operation of the driven parts (hydraulic actuators) in response to an operation by an operator or operation command.

The controller 30D, for example, controls the power storage device 19.

The controller 30D, for example, controls the charging of the power storage device 19.

The controller 30D monitors various states of the power storage device 19 (for example, a current state, a voltage state, a temperature state, a charging state, a deterioration state, presence or absence of abnormality, and the like) based on, for example, outputs of various sensors incorporated in the power storage device 19.

The controller 30E controls the DC-DC converter 44.

The controller 30E, for example, controls the operation of the DC-DC converter 44.

The controller 30E, for example, monitors various states (for example, a current state, a voltage state, a temperature state, and the like) of the DC-DC converter 44.

The surrounding information acquisition device 40 outputs information regarding the situation of the three-dimensional space around the shovel 100. The surrounding information acquisition device 40 may include, for example, an ultrasonic sensor, a millimeter wave radar, a monocular camera, a stereo camera, a depth camera, a light detection and ranging (LIDAR), a distance image sensor, an infrared sensor, or the like. The surrounding information acquisition device 40 is taken into the controller 30C.

The surrounding monitoring function of the shovel 100 may be omitted. In this case, the controller 30C and the surrounding information acquisition device 40 may be omitted.

The sensor 48 measures a state of electric power supplied from the DC-DC converter 44 and the battery 46 to the low-voltage load. For example, the sensor 48 may include a current sensor that measures the current supplied from DC-DC converter 44 and battery 46 to the low-voltage load and a voltage sensor that measures the voltage.

The temperature sensor 54 measures (detects) the temperature of a device of the electric drive system to be cooled of the cooling device 60 described later. The temperature sensor 54 includes, for example, a temperature sensor that detects the temperature of the pump motor 12. The temperature sensor 54 includes a temperature sensor that detects the temperature of the inverter 18. The temperature sensor 54 includes, for example, a temperature sensor that detects the temperature of the power storage device 19. The temperature sensor 54 includes, for example, a temperature sensor that detects the temperature of the DC-DC converter 44. The temperature sensor 54 includes, for example, a temperature sensor that detects the temperature of the on-board charger 70. The detection signal of the temperature sensor 54 is taken into, for example, the controller 30A. Thus, the controller 30A can ascertain the temperature state of the device of the electric drive system.

When an electric power converter is provided between the power storage device 19 and the pump motor 12, the temperature sensor may include a temperature sensor that ascertains a temperature state of the electric power converter.

The temperature sensor 56 measures (detects) an indoor temperature of the cabin 10. The detection signal of the temperature sensor 56 is taken into, for example, the controller 30A. As a result, the controller 30A can ascertain the temperature state in the cabin 10.

[Arrangement Structure of Various Devices in Upper Turning Body]

Next, an arrangement structure of various devices in the upper turning body 3 will be described with reference to FIG. 8.

Figure 8:
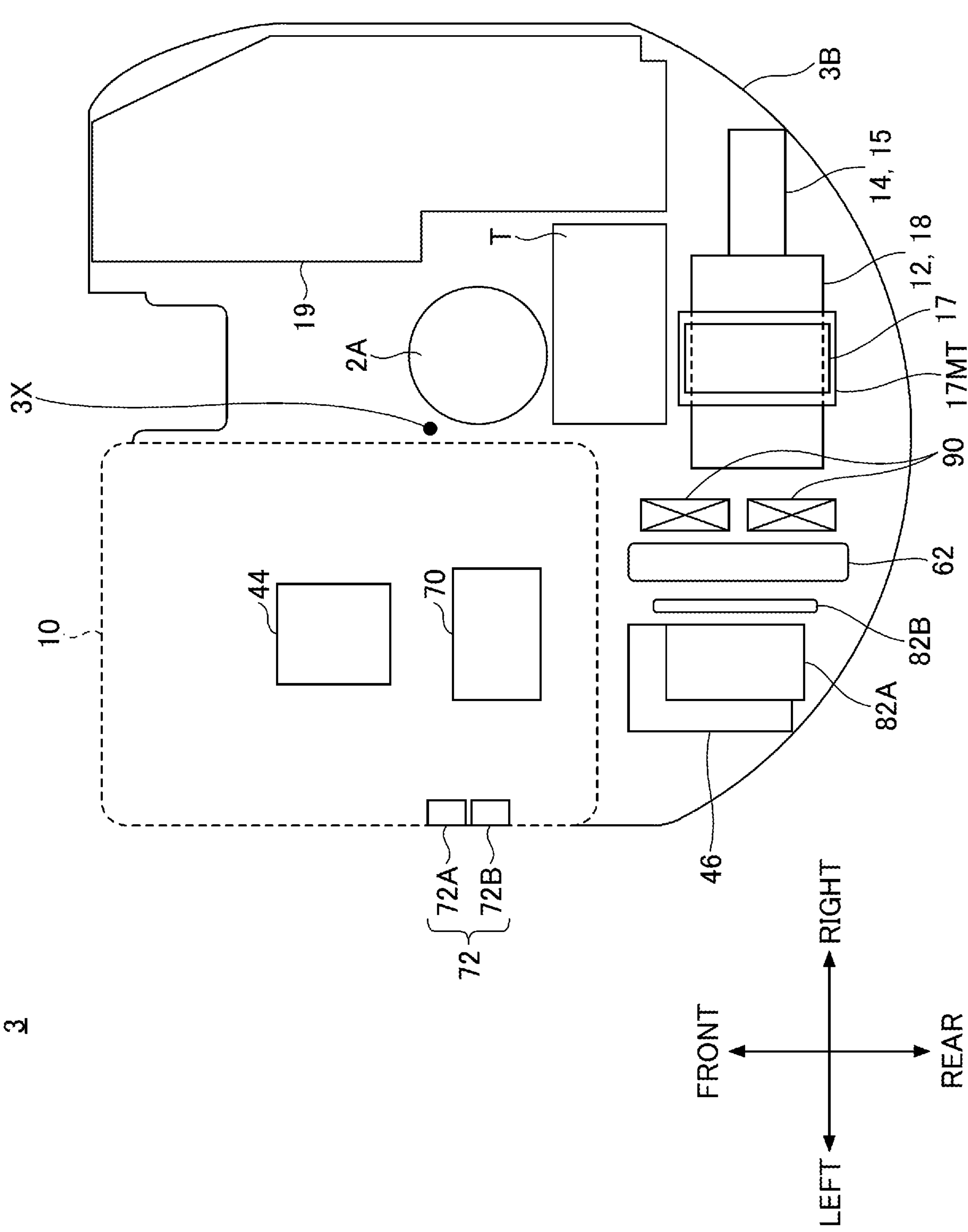
FIG. 8 is a top view illustrating an example of an arrangement structure of various devices of the upper turning body.
Figure 9:
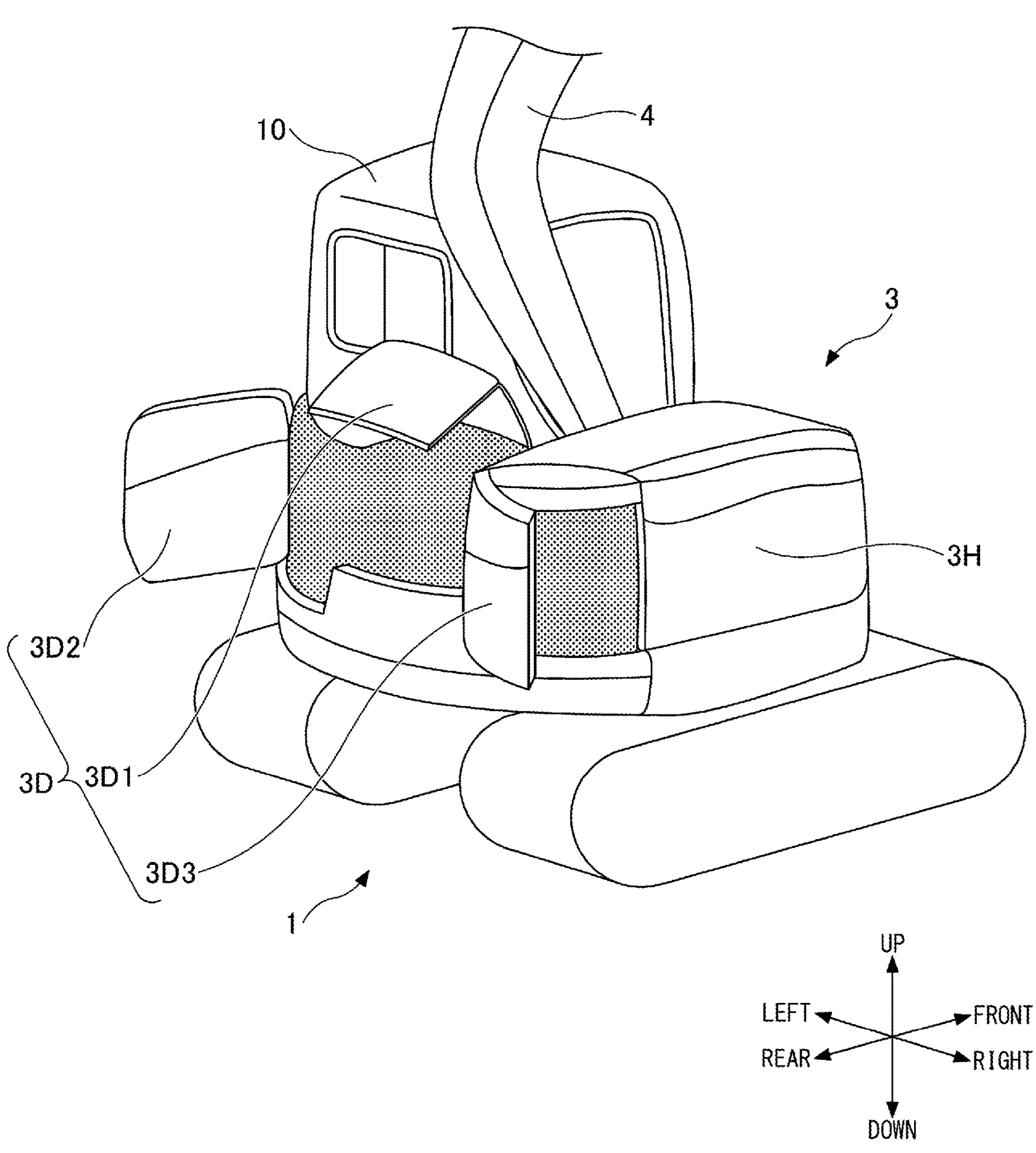
FIG. 9 is a perspective view illustrating an example of a maintenance door of the upper turning body.

FIG. 8 is a top view illustrating an example of an arrangement structure of various devices of the upper turning body 3. FIG. 9 is a perspective view illustrating an example of the maintenance door 3D of the upper turning body 3. In FIG. 8, a house portion 3H (see FIG. 9) of the upper turning body 3 is omitted in order to expose various devices of the upper turning body 3.

As illustrated in FIG. 8, in the present example, the power storage device 19 is mounted in a range from the front portion to the central portion in the front-rear direction on the right side of the upper turning body 3.

The pump motor 12, the main pump 14, the pilot pump 15, the control valve 17, and the inverter 18 are provided in a range from a central portion to a right end portion in the left-right direction of the rear portion of the upper turning body 3.

The pump motor 12 and the inverter 18 are integrally disposed at a central portion in the left-right direction of the rear portion of the upper turning body 3. The pump motor 12 and the inverter 18 are arranged such that a rotation shaft of the pump motor 12 extends along the left-right direction and an output shaft of the pump motor 12 extends rightward. For example, the pump motor 12 is mounted on a bottom portion 3B (turning frame) of the upper turning body 3 via a mount member. To be specific, the pump motor 12 may be disposed at a position relatively close to the bottom portion 3B so that the positions of the main pump 14 and the pilot pump 15 coupled to each other in a mechanically drivable manner are as low as possible. As a result, this allows the main pump 14 to be positioned lower than the liquid level inside the hydraulic oil tank T. Therefore, the occurrence of air entrainment in the main pump 14 can be suppressed.

The main pump 14 and the pilot pump 15 are disposed adjacent to the right side of the pump motor 12 in such a manner that the input shafts thereof are coupled to the output shaft of the pump motor 12. The main pump 14 and the pilot pump 15 are mounted on the bottom portion 3B via the pump motor 12 by being coupled to the pump motor 12, for example.

The control valve 17 is disposed at a central portion in the left-right direction of the rear portion of the upper turning body 3 and above the pump motor 12. For example, the pump motor 12 and the main pump 14 are disposed at a relatively low position in the space between the bottom portion 3B of the upper turning body 3 and a house portion 3H, and the control valve 17 is disposed at a relatively high position in the space. To be specific, a frame 17MT provided so as to straddle the pump motor 12 in the front-rear direction is attached to the bottom portion 3B. The control valve 17 is then mounted on top of the frame 17MT, which is mounted on the bottom portion 3B via the frame 17MT.

The control valve 17 may be disposed on the main pump 14 or the pilot pump. Further, the control valve 17 may be disposed so as to extend between the pump motor 12 and the main pump 14 or the pilot pump 15 in the left-right direction.

A turning hydraulic motor 2A is mounted on the central portion of the upper turning body 3.

The hydraulic oil tank T is disposed in a space in the front-rear direction between the turning hydraulic motor 2A and the pump motor 12 and the control valve 17. The hydraulic oil tank T is mounted on the bottom portion 3B directly or via a bracket or the like.

The radiator 62, the condenser 82B, and the fan 90 are disposed on the left side of the rear portion of the upper turning body 3, that is, on the left side of the pump motor 12, the main pump 14, and the control valve 17.

The radiator 62 is disposed in a state of standing substantially perpendicular to the bottom portion 3B so that the front-rear direction is substantially the longitudinal direction (widthwise direction) and the left-right direction is substantially the lateral direction (thickness direction). "Substantially" is intended to allow, for example, a manufacturing error of the shovel 100 or a device mounted on the shovel 100. Hereinafter, "Substantially" is used with the same intention. Thus, the radiator 62 can perform heat exchange by introducing air between fins of the core and causing the air to pass in the left-right direction (short-side direction). The radiator 62 is attached to the bottom portion 3B via, for example, mount members.

The condenser 82B is disposed adjacent to the left side of the radiator 62. The condenser 82B is arranged in series with the radiator 62 with respect to the flow of air. That is, similarly to the radiator 62, the condenser 82B is disposed in a state of standing substantially perpendicular to the bottom portion 3B so that the front-rear direction is substantially the longitudinal direction (widthwise direction) and the left-right direction is the lateral direction (thickness direction). The condenser 82B is mounted on the bottom portion 3B via the radiator 62 by being attached to the radiator 62 directly or via a bracket or the like, for example.

Other heat exchanging devices may be disposed adjacent to the radiator 62 and the condenser 82B. For example, an oil cooler may be disposed on the left side of the radiator 62 and adjacent to and above or below the condenser 82B. This is because the vertical size of the condenser 82B is usually smaller than that of the radiator 62 to some extent.

The fan 90 is disposed adjacent to the right side of the radiator 62. The fan 90 is mounted on the bottom portion 3B via the radiator 62, for example, by being attached to the radiator 62 via a plastic fan shroud. For example, the fans 90 are arranged in two rows in the longitudinal direction (front-rear direction) of the radiator 62 and in two stages in the height direction (vertical direction) of the radiator 62. The fan 90 blows air to the radiator 62, condenser 82B, and the like in a manner that draws air from the radiator 62 side (left side) to the right side.

It should be noted that the fan 90 may be disposed adjacent to the left side of the condenser 82B and the radiator 62. In this case, the fan 90 blows air to the radiator 62, condenser 82B, and the like in a manner that pushes air from the left side to the condenser 82B and radiator 62 side (right side).

At the left end of the rear of the upper turning body 3, that is, to the left of the radiator 62, condenser 82B, and fan 90, the battery 46 and compressor 82A are disposed.

The battery 46 is attached to the bottom portion 3B via a bracket or the like, for example.

The compressor 82A is positioned above the battery 46, for example, by being mounted on a frame rising from the bottom portion 3B.

A charging port 72 is provided on a side surface of the cabin 10 of the upper turning body 3. The charging ports 72A and 72 are arranged, for example, in the front-rear direction. The DC-DC converter 44 and an on-board charger 70 are disposed inside the cabin 10.

For example, as illustrated in FIG. 9, a maintenance door 3D is provided at a rear portion of the upper turning body 3 (house portion 3H).

In the present example, as described above, the power storage device 19 having a relatively large size is disposed at the right front portion of the upper turning body 3, and relatively small sized component group is concentrated at the rear portion of the upper turning body 3. Therefore, a worker can easily access the component group through the maintenance door 3D.

The maintenance door 3D includes maintenance doors 3D1 to 3D3.

The maintenance door 3D1 is provided at the left-right center of the rear of the house portion 3H and can be opened upward using the left-right axis on the top of the house portion 3H as the axial point. This allows the worker to access the pump motor 12, control valve 17, inverter 18, and hydraulic oil tank T, and the like through the opening of maintenance door 3D1 to perform various maintenance. In particular, the worker can easily perform the maintenance of the hydraulic device such as the oil filter of the hydraulic oil tank T in which the necessity or frequency of the maintenance is relatively high.

The maintenance door 3D2 is provided on the side surface of the left end of the rear of the house portion 3H and can be opened in the left direction using a vertical axis on the side surface of the house portion 3H as an axial point. Accordingly, the worker can access the battery 46, the compressor 82A, the condenser 82B, the radiator 62, and the like through the opening of the maintenance door 3D2 to perform various kinds of maintenance.

The maintenance door 3D3 is provided on the side surface of the right end of the rear portion of the house portion 3H, and can be opened leftward with the vertical axis of the side surface of the house portion 3H as an axial point. Accordingly, the worker can access the main pump 14, the pilot pump 15, components in the vicinity thereof, and the like through the opening of the maintenance door 3D3 to perform various kinds of maintenance. In particular, the worker can easily perform the maintenance of the filters disposed in the vicinity of the main pump 14 where the necessity and frequency of the maintenance are relatively high.

In the present disclosure, the rear portion of the upper turning body 3 is configured to have a substantially arc shape centered on a turning center (axial center) 3X in a top view. Thus, the turning radius of the rear portion of the upper turning body 3 can be made relatively small. The turning radius of the rear portion of the upper turning body 3 means a radius centered on the turning center 3X of a locus (outer edge) drawn by the rear portion of the upper turning body 3 when the upper turning body 3 turns. The shovel 100 corresponds to, for example, a rear ultra-small turning shovel. The rear ultra-small turning shovel means a shovel in which the ratio of the turning radius of the rear portion of the upper turning body 3 to half (½) of the total width of the crawler 1C is within 120%. Thus, the shovel 100 can improve the workability in a narrow work site.

On the other hand, in the case of the rear ultra-small turning type shovel, the space in the rear portion of the upper turning body 3, in particular, the spaces at the left and right end portions are reduced and become relatively small. In addition, since there is a tendency that motorization advances mainly in small-sized machines, even in a case where the electric shovel 100 is not a rear ultra-small turning shovel, a space behind the upper turning body 3 is limited in the first place and tends to be relatively small. Therefore, if a relatively large component is arranged in the rear portion of the upper turning body 3, a dead space increases, and there is a possibility that an efficient arrangement structure of the components cannot be realized.

On the other hand, in the present example, the power storage device 19, which is one of the largest components mounted on the upper turning body 3, is disposed at the right front portion of the upper turning body 3. The pump motor 12 and the main pump 14 are mounted on a rear portion of the upper turning body 3.

Accordingly, in the shovel 100, the pump motor 12, the main pump 14, and the like, which are relatively small in size, are disposed at the rear portion of the upper turning body 3, and thus a dead space can be relatively reduced. In addition, the shovel 100 can secure a relatively large arrangement space for the power storage device 19 along the right side surface of the upper turning body 3 in which a change in the left-right position is small over the front-rear direction in a top view. Therefore, the shovel 100 can realize an efficient arrangement structure of the components of the upper turning body 3 including the power storage device 19.

Further, in this example, the shovel 100 may be a rear ultra-small turning shovel in which the ratio of the turning radius of the rear portion of the upper turning body 3 to half of the total width of the lower traveling body 1 is 120% or less. To be specific, the shape of the rear portion of the upper turning body 3 may be a substantially arc shape with respect to the turning center 3X in a top view.

Thus, the shovel 100 can realize a relatively small turning radius in the rear portion of the upper turning body 3 by an efficient arrangement structure including the power storage device 19. Therefore, the shovel 100 can improve work efficiency in a narrow work site.

In this example, the control valve 17 is disposed on at least one of the main pump 14 and the pump motor 12.

Thus, the shovel 100 can secure a space above the main pump 14 and the pump motor 12 having a relatively small dimension in the height direction as an arrangement space for the control valve 17. In addition, in the shovel 100, the control valve 17 to which the hydraulic oil is supplied from the main pump 14 is disposed at a position relatively close to the main pump 14, and thus the piping of the hydraulic oil can be relatively shortened. Therefore, the shovel 100 can realize a more efficient arrangement structure of components in the upper turning body 3.

In the present example, the main pump 14 may be disposed below the liquid level of the hydraulic oil in the hydraulic oil tank T.

Thus, the shovel 100 can suppress the occurrence of air entrainment in the main pump 14.

In the present example, the power storage device 19 may be disposed in a range extending from the front portion on the right side of the upper turning body 3 to the central portion in the front-rear direction on the right side. The main pump 14 may be disposed behind the power storage device 19. The pump motor 12 may be disposed on the left side of the main pump 14 so as to be able to mechanically drive the main pump 14.

Thus, in the shovel 100, the main pump 14 having a relatively small size is disposed on the rear side of the power storage device 19 while ensuring a relatively large capacity of the power storage device 19, so that the dimension in the front-rear direction at the right corner (right end portion) of the rear portion of the upper turning body 3 can be suppressed to be small. Therefore, the shovel 100 can ensure the capacity of the power storage device 19 and reduce the turning radius of the rear portion of the upper turning body 3 at the same time.

In this example, the hydraulic oil tank T may be disposed in front of the pump motor 12 and on the left side of the power storage device 19.

Thus, the hydraulic oil tank T can be specifically disposed and the capacity thereof can be secured by utilizing the space in front of the pump motor 12 and in the power storage device 19.

In this example, the radiator 62 may be disposed on the left side of the pump motor 12.

Thus, the radiator 62 can be specifically disposed by using a space on the left side of the rear portion of the upper turning body 3.

Further, in the present example, the maintenance door 3D may be provided at the rear of the house portion 3H of the upper turning body 3, allowing access to the components mounted on the upper turning body 3.

Accordingly, as described above, the worker can easily access the group of components that is relatively small compared to the power storage device 19 and is collectively disposed in the rear portion of the upper turning body 3.

[Details of Power Storage Device]

Next, the power storage device 19 will be described in detail with reference to FIGS. 10 to 13.

Figure 10:
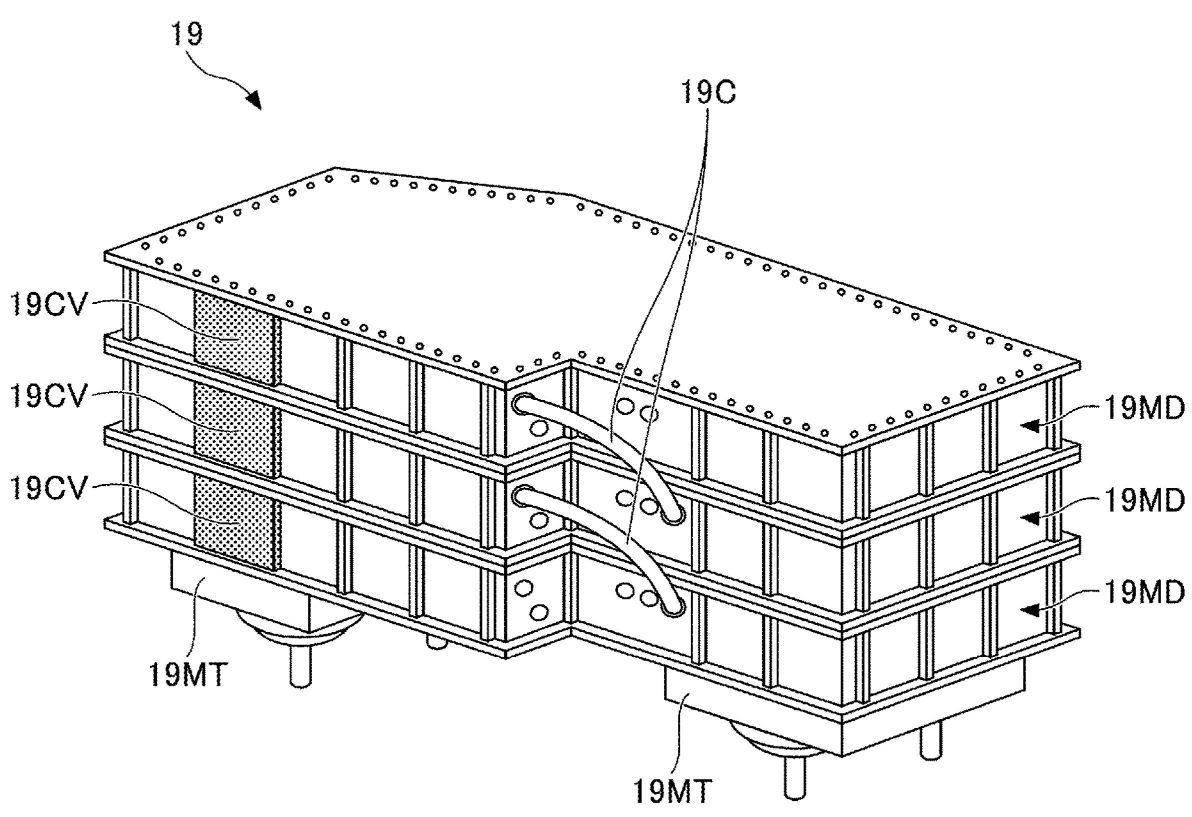
FIG. 10 is a perspective view illustrating an example of a power storage device.
Figure 11:
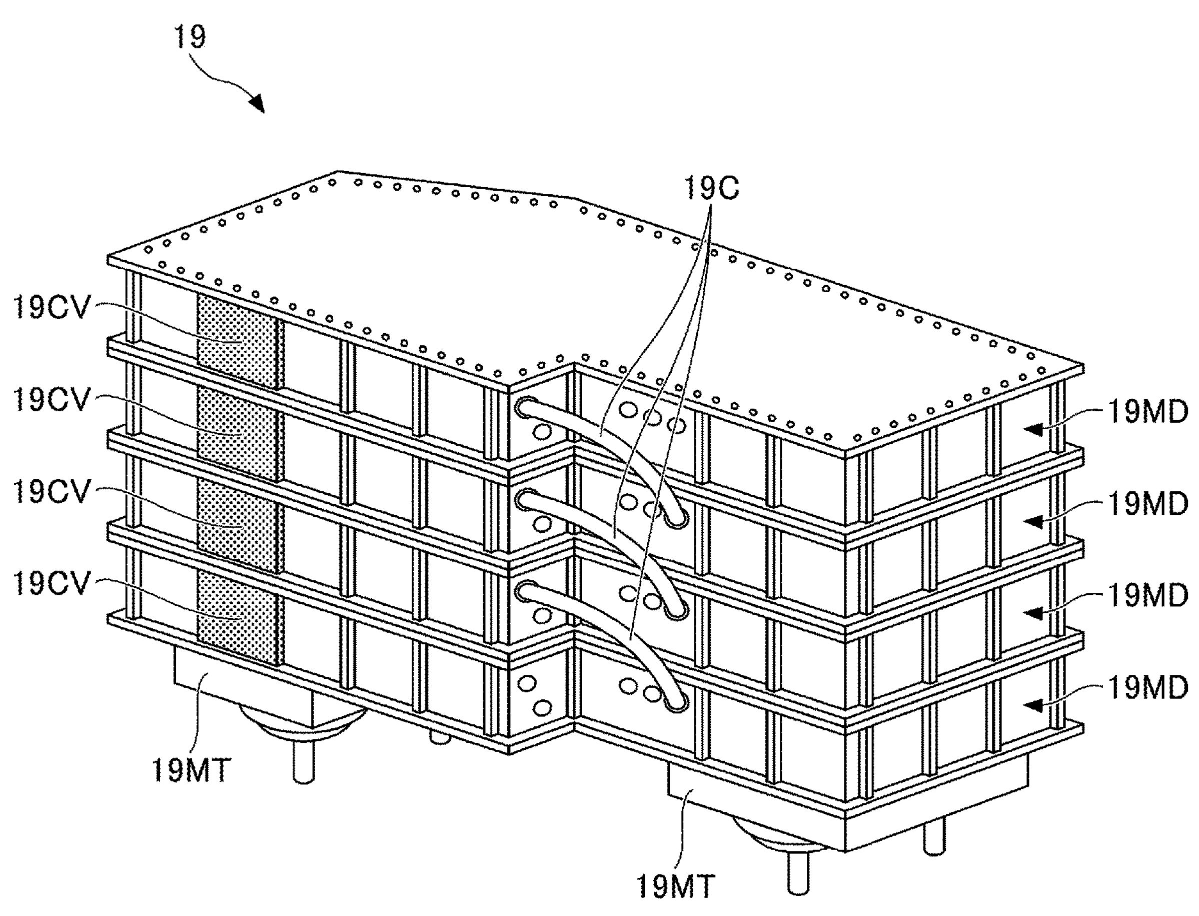
FIG. 11 is a perspective view illustrating another example of the power storage device.
Figure 12:
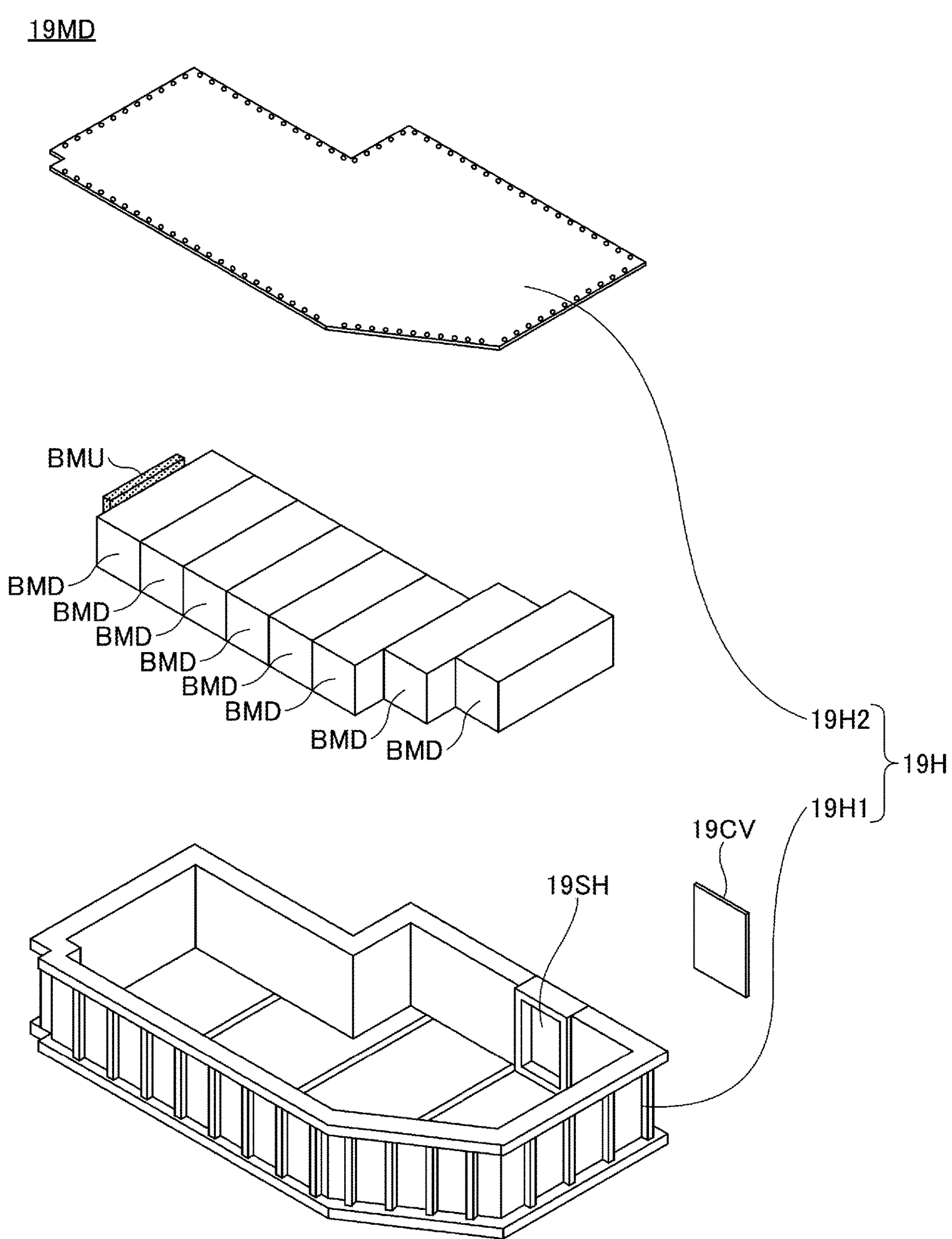
FIG. 12 is an exploded view illustrating an example of a configuration of a power storage module.
Figure 13:
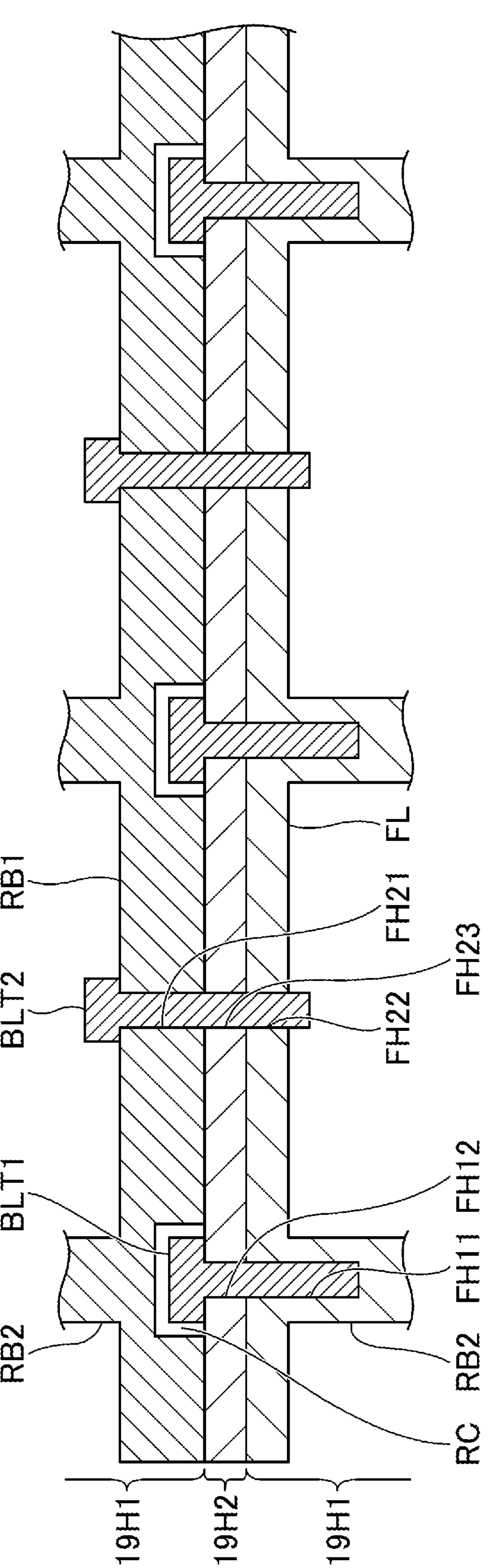
FIG. 13 is a cross-sectional view illustrating an example of a coupling structure between power storage modules.

FIGS. 10 and 11 are perspective views illustrating an example and another example of the power storage device. FIG. 12 is an exploded view illustrating an example of a configuration of a power storage module 19MD. FIG. 13 illustrates an example of a coupling structure between power storage modules.

As illustrated in FIGS. 10 and 11, the power storage device 19 is configured such that a plurality of power storage modules 19MD are stacked in the vertical direction and the vertically adjacent power storage modules are connected to each other by a wire harness 19C. In this example, a plurality of power storage modules 19MD are connected in series, and the positive terminals of one of the vertically adjacent power storage modules 19MD and the negative terminals of the other are connected by one wire harness 19C.

When at least some of the plurality of power storage modules 19MD are connected in parallel, the vertically adjacent power storage modules 19MD to be connected in parallel may be connected by two wire harnesses 19C that connect the positive terminals and the negative terminals of the power storage modules 19MD.

Further, the power storage device 19 is mounted on the bottom portion 3B (turning frame) of the upper turning body 3 via a mount member 19MT attached to the power storage module 19MD of the lowermost layer.

As illustrated in FIG. 12, the power storage module 19MD includes a plurality of (eight in this example) battery modules BMD, a battery management unit 19MU, a housing 19H, a service plug installation portion 19SH, and a cover 19CV.

The battery module BMD is an assembly formed by connecting a plurality of battery cells in series.

The battery management unit BMU communicates with various sensors built in the power storage module 19MD to sequentially obtain detection data thereof, and communicates with the host controller 30D to transmit the detection data thereof to the controller 30D. Examples of the various sensors include a voltage sensor, a current sensor, a temperature sensor, and the like. Thus, the controller 30D can monitor the state of the battery module BMD and the state of each battery cell included in the battery module BMD.

The housing 19H houses the components of the power storage module 19MD inside of the housing, such as the multiple battery modules BMD, the battery management unit BMU, and the like. The housing 19H is made of metals such as aluminum alloys and iron. The housing 19H includes a housing portion 19H1 that houses the components and a cover portion 19H2 that seals an opening at an upper portion of the housing portion 19H1. The cover portion 19H2 is fastened to a flange FL (see FIG. 13) provided at an outer edge of the opening of the housing portion 19H1 in the vertical direction by bolts BLT1 (see FIG. 13).

Each of the multiple power storage modules 19MD has the housing 19H with the same approximate shape. As a result, the plurality of power storage modules 19MD can be easily stacked in the vertical direction by having substantially the same shape in a top view.

The housing 19H of the plurality of power storage modules 19MD may have substantially the same basic shape manufactured by forging or casting, and may have a slight difference in additional processing. For example, the lower most power storage module 19MD of a plurality of power storage modules 19MD may be specially processed for connection to the mount member 19MT. In addition, some of the housing 19H of the multiple power storage modules 19MD may be specially machined to mount brackets for supporting other components when mounted on the upper turning body 3.

The service plug installation portion 19SH is a hole portion for installing a service plug for blocking the electrical connection state of the plurality of battery modules BMD included in the power storage module 19MD. The service plug installation portion 19SH is provided on a side surface of the housing 19H (in the housing portion 19H1). Thus, as illustrated in FIGS. 10 and 11, in a state in which the plurality of power storage modules 19MD are stacked in the vertical direction and mounted on the upper turning body 3, an operator can access the service plug of each power storage module 19MD only by removing the cover 19CV.

The service plug is installed (for example, engaged) in the service plug installation portion 19SH to achieve a sealed structure of the housing 19H.

The cover 19CV is detachably attached to the side surface of the housing 19H (housing portion 19H1) so as to cover the service plug installation portion 19H1, that is, the service plug. Thus, the cover 19CV can protect the service plug. In addition, the cover 19CV has a structure such that the cover cannot be attached to the housing 19H (housing portion 19H1) when the service plug is not fully attached (e.g., semi-engaged) to the service plug installation portion 19SH. Accordingly, a situation in which the cover 19CV is closed in a state in which the service plug is not correctly mounted due to human error can be prevented.

In addition, devices related to the power storage device 19 may be separately incorporated in the plurality of power storage modules 19MD. The related devices include, for example, the controller 30D, a junction box, and the like. The junction box relays electric power between the power storage device 19 and a plurality of other devices (for example, the inverter 18, the DC-DC converter 44, the on-board charger 70, the charging port 72B, and the like). For example, the controller 30D may be housed in the housing 19H of any one power storage module 19MD among the plurality of power storage modules 19MD, and the junction box may be housed in the housing 19H of another power storage module 19MD. Thus, the free space of each of the plurality of power storage modules 19MD can be used to house the related devices of the power storage device 19.

As illustrated in FIG. 13, the housing 19H of the vertically adjacent power storage modules 19MD are directly coupled to each other in the vertical direction.

A rib RB1 circulating so as to extend along an outer edge in a top view is provided at the lower end portion of the side surface of the housing portion 19H1. In addition, in a range in the height direction between the rib RB1 at the lower end portion and the flange FL at the upper end portion on the side surface of the housing portion 19H1, ribs RB2 are provided at predetermined intervals along the outer edge in a top view.

A fastening hole FH11 is provided at a position where the rib RB2 is connected to the flange FL of the housing portion 19H1, and a fastening hole FH12 is provided at a corresponding position of the cover portion 19H2 in a top view. Accordingly, in a state in which the fastening holes FH11 and FH12 are aligned with each other, the bolts BLT1 are inserted into and fastened to the fastening holes FH11 and FH12, and thus the cover portion 19H2 can be attached to the housing portion 19H1 and the housing portion 19H1 can be sealed by the cover portion 19H2.

A sealing member is provided between the back surface of the cover portion 19H2 and the flange FL of the housing portion 19H1 to ensure airtightness.

A recessed portion RC is provided on the lower surface of the rib RB1 of the housing portion 19H1. The recessed portions RC are arranged in the same number as the number of the bolts BLT1 so that when the housing 19H (housing portion 19H1) is stacked on top of the housing 19H (cover portion 19H2) of the adjacent power storage module 19MD below, the head portions of the bolts BLT1 can be accommodated. Accordingly, when the power storage modules 19MD are stacked in the vertical direction, the head portion of the bolt BLT1 on the upper surface of the housing 19H of the lower power storage module 19MD can be prevented from coming into contact with the lower surface of the housing 19H (housing portion 19H1) of the upper power storage module 19MD. Therefore, it is possible to prevent the bolt BLT1 from being damaged or prevent the size of the power storage device 19 in the height direction from being increased by the head portion of the bolt BLT1.

The rib RB1 of the housing portion 19H1 has a plurality of fastening holes FH21 that penetrate from the top surface to the bottom surface. The plurality of fastening holes FH21 are located between two adjacent ribs RB2 at the outer edge of the housing portion 19H1 in a top view.

The flange FL of the housing portion 19H1 is provided with a plurality of fastening holes FH22 penetrating from the upper surface to the lower surface. The plurality of fastening holes FH22 are provided at substantially the same positions as the fastening holes FH21 in a top view.

The cover portion 19H2 is provided with a plurality of fastening holes FH23 penetrating from the upper surface to the lower surface. The plurality of fastening holes FH23 are provided at substantially the same positions as the fastening holes FH21 and FH22 in a top view in a state where the housing portion 19H1 and the cover portion 19H2 are coupled to each other.

As a result, the bolts BLT2 are inserted from above into the fastening hole FH21 of the upper power storage module 19MD (housing 19H) and the fastening holes FH22, FH23 of the lower power storage module 19MD (housing 19H) and fastened thereto, so that the two power storage modules 19MD can be connected to each other.

For example, the power storage modules 19MD are stacked in the vertical direction by setting a frame on the bottom portion 3B of the upper turning body 3, with the power storage modules 19MD mounted on the frame. However, for example, in a case where the number of the power storage modules 19MD for each of the specifications of the shovel 100 is desired to be changed, the frame is needed to be changed, and there is a possibility that a cost increase is caused. On the other hand, a relatively large frame can be set in accordance with the assumed maximum value of the power storage module 19MD. However, for example, in a case where the number of mounted power storage module 19MD is relatively small, there is a possibility that the frame limits the layout of other devices. Also, for example, a relatively large frame may result in increased cost, or the weight of a relatively large frame may result in reduced energy consumption efficiency.

On the other hand, in the present example, the power storage device 19 is configured by vertically laminating a plurality of power storage modules 19MD. In the plurality of power storage modules 19MD, the housing 19H of the power storage modules 19MD, which are vertically adjacent to each other, are connected to each other.

Thus, the plurality of power storage modules 19MD can be mounted on the upper turning body 3 via the lowermost power storage module 19MD only by coupling the housing 19H of the vertically adjacent power storage modules 19MD to each other. Therefore, for example, as in the case of FIGS. 10 and 11, when the number of the power storage modules 19MD is changed in accordance with the specifications or the like of the shovel 100, the number of the power storage modules 19MD can be easily changed. Therefore, the capacity of the power storage device 19 can be easily changed.

Further, in the present example, each of the plurality of power storage modules 19MD may be configured such that the coupling structure (for example, the fastening holes FH22, FH23) at the upper portion thereof is adapted to the coupling structure (for example, the fastening hole FH21) at the lower portion of all other power storage modules 19MD.

Similarly, in each of the plurality of power storage modules 19MD, the coupling structure (for example, the fastening hole FH21) of the lower portion may be configured so as to match the coupling structure (for example, the fastening holes FH22 and FH23) of the upper portions of all the other power storage modules 19MD.

Accordingly, for example, since the plurality of power storage modules 19MD can be stacked and coupled in an arbitrary order, the plurality of power storage modules 19MD can be stacked and mounted on the upper turning body 3 more easily. Therefore, the number of the power storage modules 19MD can be changed more easily.

Further, in the present example, the plurality of power storage modules 19MD may have substantially the same shape in a top view.

Accordingly, for example, since the plurality of power storage modules 19MD can be stacked in an arbitrary order, the plurality of power storage modules 19MD can be more easily stacked and mounted on the upper turning body 3. Therefore, the number of the power storage modules 19MD can be changed more easily.

Further, in the present example, at least two or more power storage modules 19MD among the plurality of power storage modules 19MD may have substantially the same outer shape of the housing 19H.

Accordingly, for example, since the plurality of power storage modules 19MD can be stacked in an arbitrary order, the plurality of power storage modules 19MD can be more easily stacked and mounted on the upper turning body 3. Therefore, the number of the power storage modules 19MD can be changed more easily.

In this example, the related devices of the power storage device 19 may be distributed and built into the housing 19H of the plurality of power storage modules 19MD.

As a result, the empty space of each housing 19H of the plurality of power storage modules 19MD can be effectively utilized.

In this example, the related device may include at least one of the controller 30D that performs control related to the power storage device 19 and the junction box that relays electric power between the power storage device 19 and a plurality of other devices.

As a result, the controller 30D and the junction box can be distributed and built into the housing 19H of the plurality of power storage modules 19MD.

Further, in the present example, each of the plurality of power storage modules 19MD may include the service plug installation portion 19SH to which a service plug that blocks a power path is detachably attached on the side surface of the housing 19H, and the cover 19CV that covers the service plug installation portion 19SH.

Accordingly, even in a state where the plurality of power storage modules 19MD are stacked in the vertical direction, for example, at the time of maintenance of the power storage device 19, a worker can access the service plug by removing the cover 19CV on the side surface of the housing 19H. Therefore, blocking the power path at the time of maintenance of the power storage device 19 can be easily realized.

Further, in the present example, the housing 19H may include the housing portion 19H1 that houses the battery module BMD and has an open upper portion, the cover portion 19H2 that closes the open upper portion of the housing portion 19H1, and a plurality of bolts BLT1 that fasten the cover portion 19H2 to the housing portion 19H1 in the vertical direction. The housing 19H of the vertically adjacent power storage modules 19MD may be coupled to each other by a plurality of bolts BLT2 fastened in the vertical direction. In the housing 19H, the fastening holes FH21, FH22, and FH23 for fastening the bolt BLT2 may be provided between fastening holes FH11 and FH12 where the two adjacent bolts BLT1 are fastened.

With this configuration, for example, the coupling structure that couples the housings 19H of the power storage modules 19MD adjacent to each other in the vertical direction is disposed near the coupling structure of the housing portion 19H1 and the cover portion 19H2 of the housing 19H, and a situation in which the outer edge of the housing 19H protrudes outward in a top view can be avoided. Therefore, the coupling structure between the housing portion 19H1 and the cover portion 19H2 of the housing 19H and the coupling structure for coupling the housings 19H of the vertically adjacent power storage modules 19MD can be compatible with each other in a smaller space.

Further, in the present example, the housing 19H may have, on the lower surface thereof, the recessed portion RC at substantially the same position as the bolt BLT1 of the housing 19H when the housing 19H is stacked on the housing 19H of another power storage module 19MD.

Thus, when the housing 19H of another power storage module 19MD is stacked on the housing 19H, the head portion of the bolt BLT1 can be housed in the recessed portion RC. Therefore, a situation in which the head portion of the bolt BLT1 of the lower housing 19H and the lower surface of the upper housing 19H come into contact with each other can be avoided. Therefore, the occurrence of breakage of the head portion of the bolt BLT1, an increase the size in the vertical direction of the power storage device 19 due to the head portion of the bolt BLT1, and the like can be suppressed.

[Method of Switching Operation and Stop of DC-DC Converter]

Next, with reference to FIGS. 14 and 15, a method of switching between operation and stop of the DC-DC converters 44A and 44B will be described.

Figure 14:
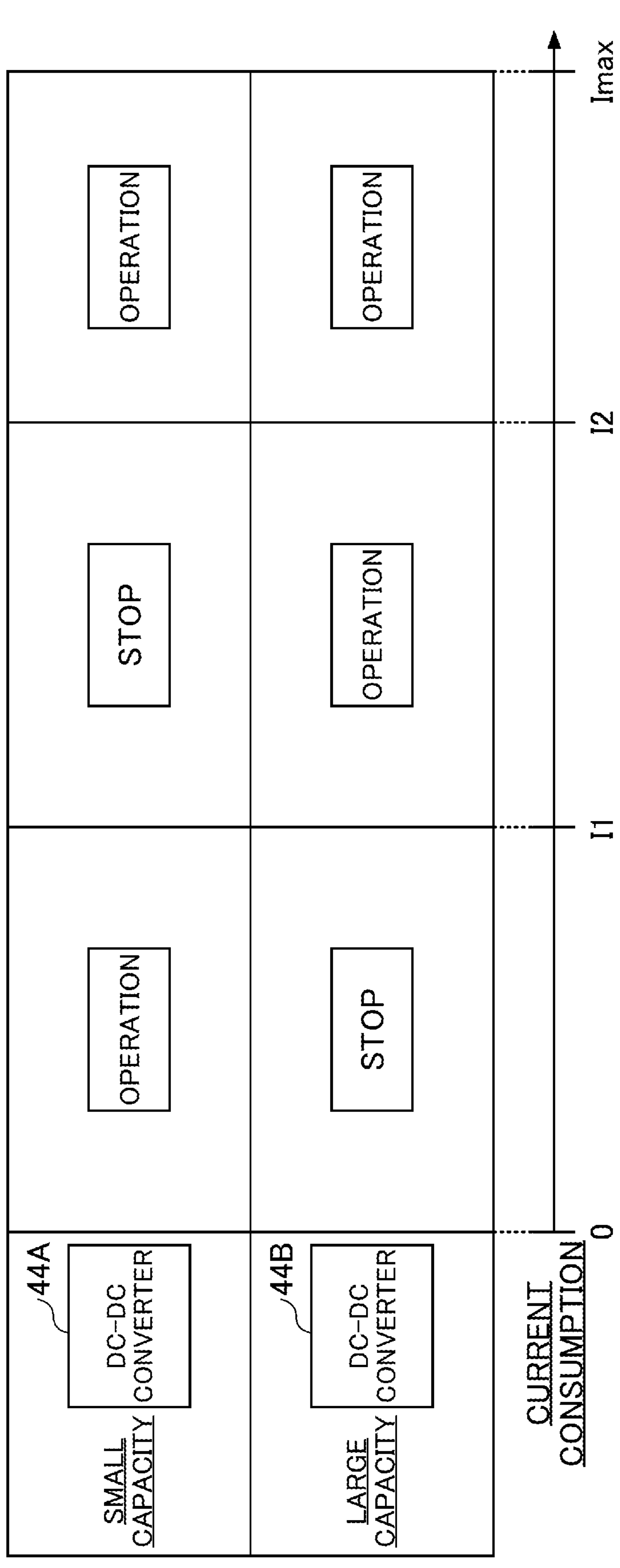
FIG. 14 is a diagram illustrating a method of switching between operation and stop of a DC-DC converter.

FIG. 14 is a diagram illustrating a method of switching between operation and stop of the DC-DC converters 44A and 44B. FIG. 15 is a diagram illustrating conversion efficiency of the DC-DC converter 44.

In FIG. 14, there is no meaning in the interval of the scale of the consumption current, and the magnitude relationship between thresholds I1 and I2 and a maximum value Imax is merely shown in a simulated manner.

In this example, the DC-DC converters 44A and 44B have different current capacities, i.e., different maximum values of currents that can be outputted. To be specific, the DC-DC converter 44A is configured to have a relatively small current capacitance, and the DC-DC converter 44B is configured to have a relatively large current.

As illustrated in FIG. 14, in this example, the controller 30E switches between operation and stop of the DC-DC converters 44A and 44B in accordance with the current required by the entire low-voltage devices, that is, the consumption current of the entire low-voltage devices. Based on the output of the sensor 48, the controller 30E can acquire the total consumption current of the low-voltage devices.

To be more specific, the controller 30E operates the DC-DC converter 44A and stops the DC-DC converter 44B when the total consumption current of the low-voltage devices is equal to or less than a threshold value I1 (>0). The threshold I1 is set to a value somewhat smaller than the maximum value of the current that can be output by the DC-DC converter 44A. That is, the controller 30E allows only the DC-DC converter 44A, which has relatively low current capacity, to supply electric power to the battery 46 and low-voltage device in the range where the current consumption of the entire low-voltage devices is equal to or less than the threshold value I1.

The controller 30E stops the DC-DC converter 44A and operates the DC-DC converter 44B when the total consumption current of the low-voltage devices is greater than the threshold value I1 and equal to or less than the threshold value I2 (>I1). The threshold I2 is set to a value somewhat smaller than the maximum value of the current that can be output by the DC-DC converter 44B. That is, the controller 30E allows only the DC-DC converter 44B, which has a relatively large current capacity, to supply electric power to the battery 46 and low-voltage devices in the range where the current consumption of the entire low-voltage devices is greater than the threshold value I1 and equal to or less than the threshold value I2.

When the total current consumption of the low-voltage devices changes from a state equal to or less than the threshold value I1 to a state greater than the threshold value I1, or vice versa, both the DC-DC converters 44A and 44B may stop instantaneously. However, since the battery 46 functions as a buffer, problems such as instantaneous block of power supply to the low-voltage devices do not occur.

The controller 30E operates both the DC-DC converters 44A and 44B when the total consumption current of the low-voltage devices is larger than the threshold value I2 and equal to or less than the maximum value Imax. That is, the controller 30E causes both the DC-DC converters 44A and 44B to supply electric power to the battery 46 and the low-voltage devices in a range in which the consumption current of the entire low-voltage devices is larger than the threshold value I2.

Hysteresis may be provided in the method of switching between operation and stop of the DC-DC converters 44A and 44B depending on whether the consumption current of the entire low-voltage devices increases or decreases, and the thresholds I1 and I2 may be set to different values depending on the case.

Figure 15:
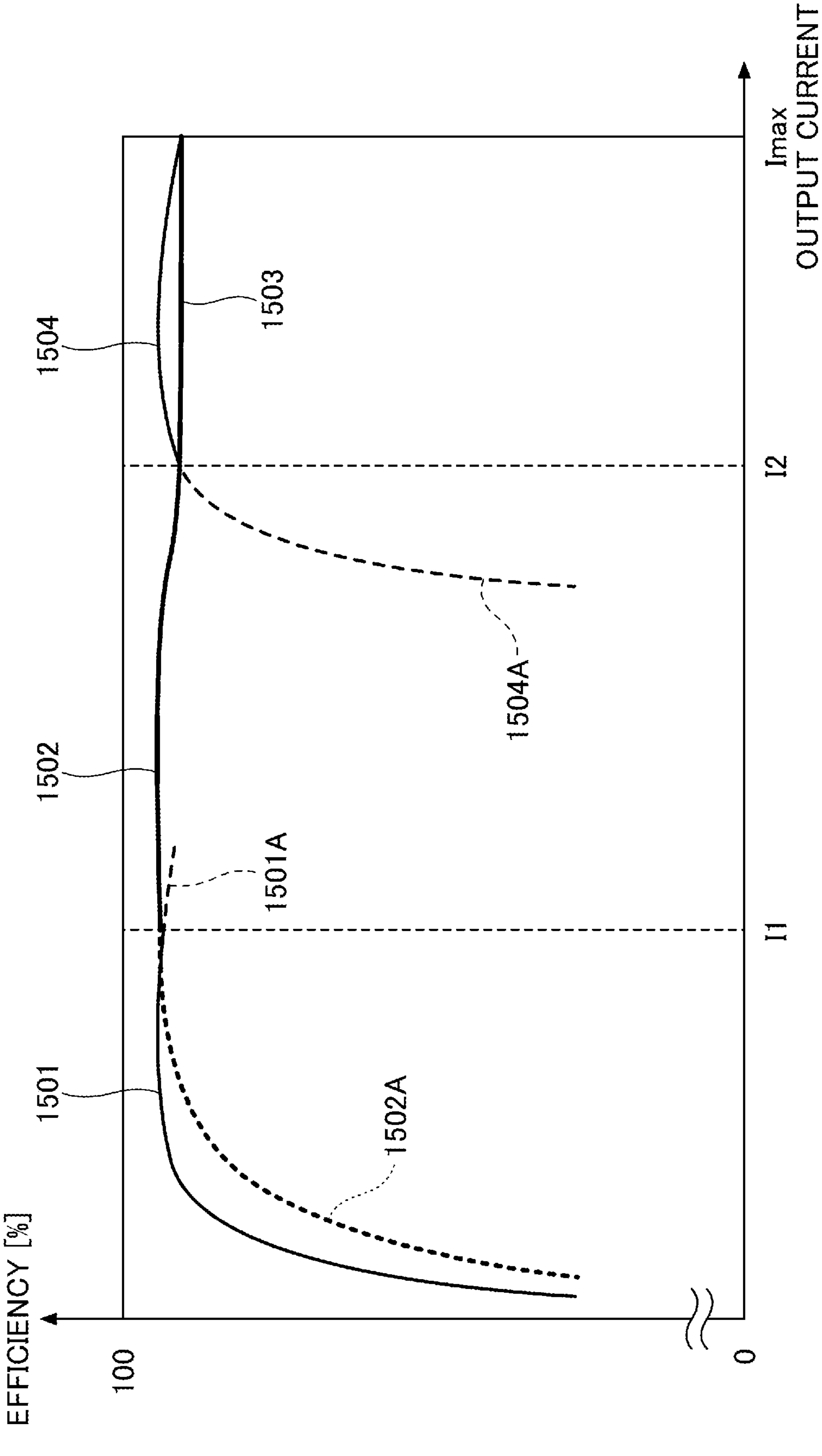
FIG. 15 is a diagram illustrating conversion efficiency of the DC-DC converter.

As illustrated in FIG. 15, the conversion efficiency of the DC-DC converter 44A (see the graph 1501) is higher than the conversion efficiency of the DC-DC converter 44B (see the graph 1502A) in a range where the output current is equal to or less than the threshold value I1. This is because there is a tendency that the smaller the current capacity is, the better the rise of the conversion efficiency with respect to the increase of the output current becomes. Therefore, only the DC-DC converter 44A is operated in the range in which the consumption current of the entire low-voltage devices is equal to or less than the threshold value I1, so that the conversion efficiency of the entire DC-DC converter 44 can be relatively increased.

In addition, the conversion efficiency of the DC-DC converter 44B is maintained at a relatively high level when the output current is larger than the threshold value I1 and equal to or less than the threshold value I2 (see the graph 1502). On the other hand, when the output current exceeds the threshold value I1, the conversion efficiency of the DC-DC converter 44A slightly decreases because the conversion efficiency is close to the upper limit of the output current (see the graph 1501A). Therefore, in a range in which the consumption current of the entire low-voltage devices is larger than the threshold value I1 and equal to or less than the threshold value I2, only the DC-DC converter 44B is operated, so that the conversion efficiency of the entire DC-DC converter 44 can be relatively increased.

In addition, when the consumption current of the entire low-voltage devices exceeds the threshold value I2 to some extent, the consumption current of the entire low-voltage devices cannot be covered only by the DC-DC converter 44B. Therefore, in a range where the consumption current of the entire low-voltage devices is larger than the threshold value I2, the consumption current of the entire low-voltage devices can be covered by operating the DC-DC converter 44A in addition to the DC-DC converter 44B. In this case, since the output current from the DC-DC converter 44B is maintained at a relatively high level, the conversion efficiency of the DC-DC converter 44B is maintained at a relatively high level (see the graph 1503). In addition, the DC-DC converter 44A is maintained at a relatively high conversion efficiency (see graph 1504) outside the region (graph 1504A) of a relatively low conversion efficiency by appropriately controlling the output current from the DC-DC converter 44A. This makes it possible to relatively increase the conversion efficiency of the entire DC-DC converter 44.

As described above, in the present example, the shovel 100 supplies power to the low-voltage devices and the battery 46 using the plurality of DC-DC converters 44A and 44B connected in parallel.

As a result, the rising of the output current from each of the DC-DC converters 44A and 44B can be made relatively fast. Therefore, the conversion efficiency of the entire DC-DC converter 44 can be relatively increased. Therefore, the power consumption of the power storage device 19 can be suppressed, and the operation time of the shovel 100 can be relatively lengthened.

In this example, the current capacities of the DC-DC converters 44A and 44B are set to be different from each other.

As a result, a case where only the DC-DC converter 44A is operated, a case where only the DC-DC converter 44B is operated, and a case where both the DC-DC converters 44A and 44B are operated, can be switched in accordance with the current consumption of the entire low-voltage devices. Therefore, the conversion efficiency of the entire DC-DC converter 44 can be further increased. Therefore, the power consumption of the power storage device 19 can be further suppressed and the operation time of the shovel 100 can be further extended.

Further, in this example, the controller 30E switches between operation and stop of the DC-DC converters 44A and 44B in accordance with the consumption current of the entire low-voltage devices.

As a result, a case where only the DC-DC converter 44A is operated, a case where only the DC-DC converter 44B is operated, and a case where both the DC-DC converters 44A and 44B are operated, can be switched in accordance with the consumption current of the entire low-voltage devices.

[Control Method when Power Supply from DC-DC Converter is Limited]

With reference to FIGS. 16 to 20, a control method by the control device 30 when limiting the power supply from the DC-DC converter 44 to the battery 46 or low-voltage devices is described.

The limitation of the power supply from the DC-DC converter 44 to the battery 46 or the low-voltage devices includes, for example, stopping of the power supply. The limitation of the power supplied from the DC-DC converter 44 to the battery 46 and the low-voltage devices includes, for example, stopping the power supplied from one of the DC-DC converter 44A and the DC-DC converter 44B to the battery 46 and the low-voltage devices, that is, limiting the current that can be supplied from the entire DC-DC converter 44. The stop of the power supply from the DC-DC converter 44 to the battery 46 or the low-voltage devices includes, for example, a stop of the power supply due to an abnormality of the DC-DC converter 44. The abnormality of the DC-DC converter 44 includes, for example, an input overvoltage in which the input voltage from the power storage device 19 exceeds a predetermined range and an input low voltage in which the input voltage falls below a predetermined range. The abnormality of the DC-DC converter 44 includes, for example, an output overvoltage in which the output voltage to the battery 46 or the low-voltage devices exceeds a predetermined range and an output low voltage in which the output voltage falls below a predetermined range. The abnormality of the DC-DC converter 44 includes, for example, a short circuit of the circuit of the DC-DC converter 44. The abnormality of the DC-DC converter 44 includes, for example, an overcurrent. The abnormality of the DC-DC converter 44 includes, for example, overheating in which the temperature of a predetermined portion exceeds a predetermined range. The abnormality of the DC-DC converter 44 includes an abnormality in communication with the outside such as the controller 30E. The abnormality of the DC-DC converter 44 includes, for example, an excessive power supply voltage in which the power supply voltage of the DC-DC converter 44 exceeds a predetermined range and an insufficient power supply voltage in which the power supply voltage falls below a predetermined range. The stop of the power supply from the DC-DC converter 44 to the battery 46 or the low-voltage devices includes, for example, a temporary output limitation due to the transition of the DC-DC converter 44 to the protection mode.

<First Example of Control Method>

Figure 16:
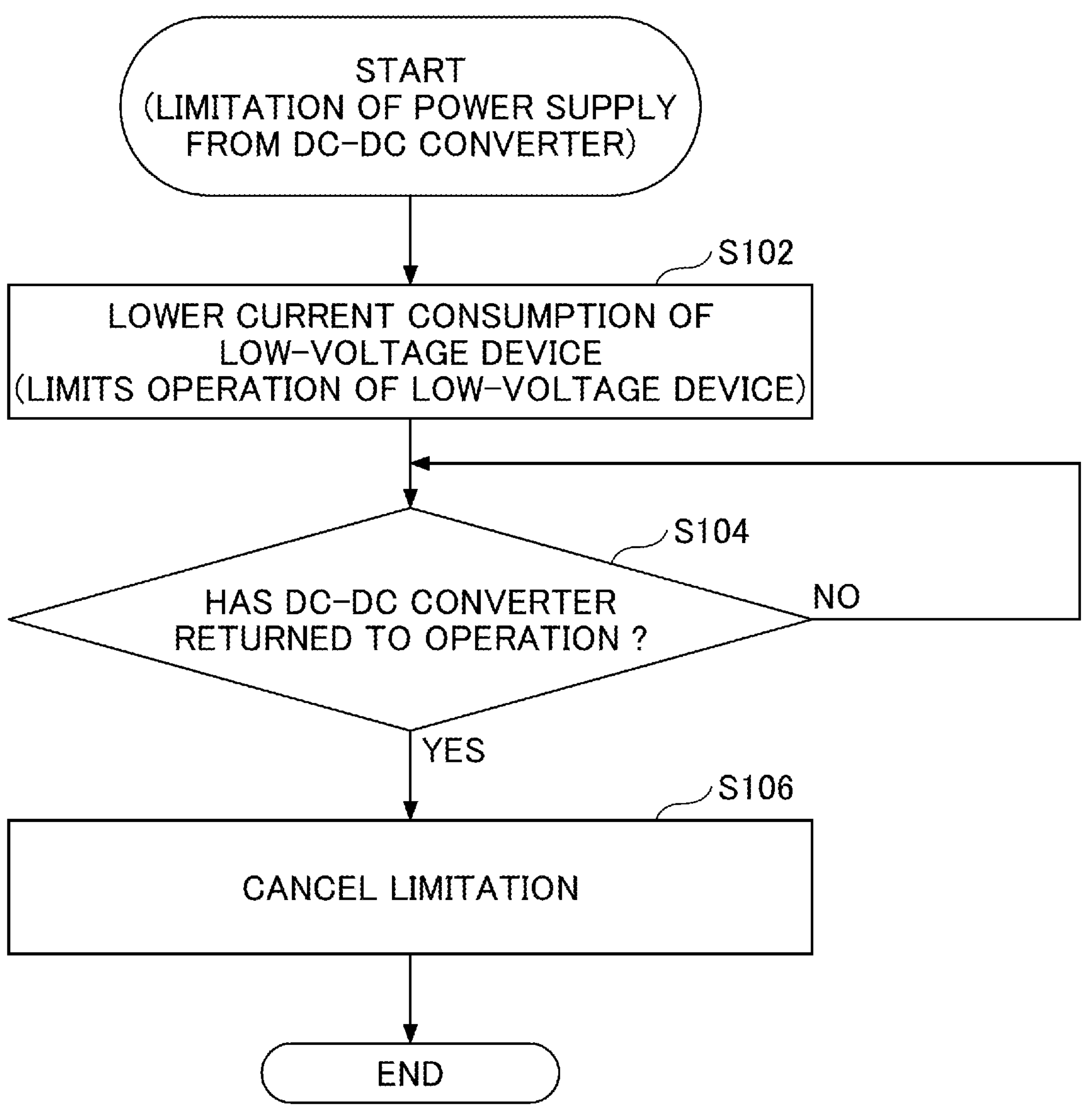
FIG. 16 is a flowchart schematically illustrating a first example of control processing when power supply from the DC-DC converter is limited.
Figure 17:
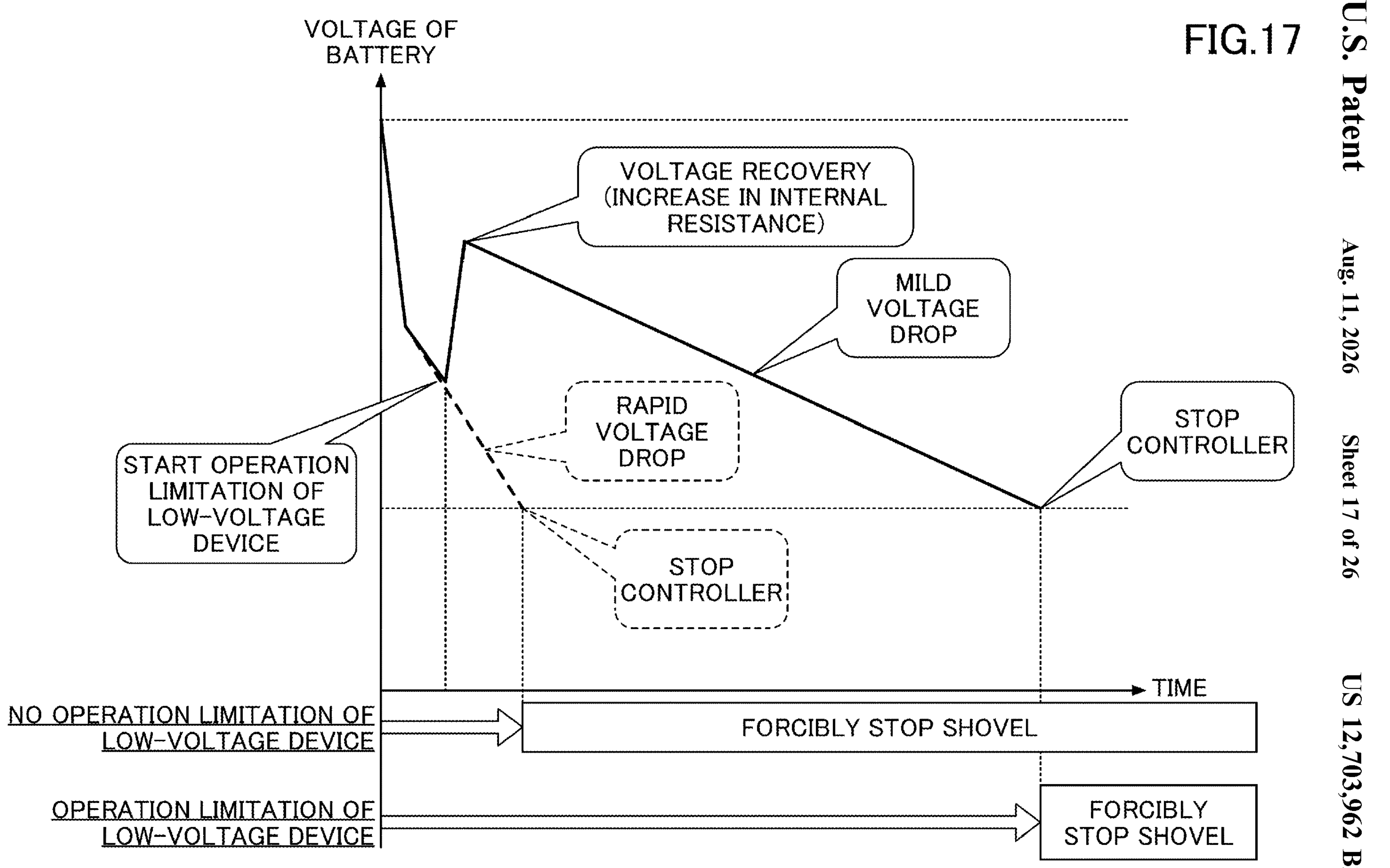
FIG. 17 is a diagram illustrating an example of a change in voltage of a battery when power supply from the DC-DC converter is limited.

FIG. 16 is a flowchart schematically showing a first example of a control processing when power supply from the DC-DC converter 44 is limited. FIG. 17 is a diagram illustrating an example of a change in the voltage of the battery 46 when the power supply from the DC-DC converter 44 is limited.

This flowchart is started when the power supply from the DC-DC converter 44 to the battery 46 and the low-voltage devices is limited. To be specific, when the power supply from the DC-DC converter 44 is limited or when the power supply from the DC-DC converter 44 is limited due to an abnormality or the like, the controller 30E may transmit a signal indicating the limitation to the controller 30A. Then, upon receiving the signal, the controller 30A may start the present flowchart. Hereinafter, the same may be applied to flowcharts of FIGS. 18 to 20 described below.

As illustrated in FIG. 16, in step S102, the controller 30A reduces the current consumption of the low-voltage devices by limiting the operation of the low-voltage devices. As a result, in a situation in which power supply from the DC-DC converter 44 to the battery 46 and the low-voltage devices is limited, the current consumption of the low-voltage devices can be suppressed and the time during which the controllers 30A to 30E can operate only with power of the battery 46 can be relatively increased. As a result, the controller 30A can relatively increase the operable time of the various devices of the shovel 100 other than the low-voltage devices subject to the operation limitation, and can relatively lengthen the operable time of the shovel 100.

After the process of step S102, the controller 30A may notify a user that the operation limitation of the low-voltage devices is performed through the output device 50. When the shovel 100 is remotely operated or remotely monitored, the controller 30A may transmit a notification signal indicating that the operation of the low-voltage devices is limited to the external device via the communication device.

The operation limitation of the low-voltage device includes, for example, stopping the operation of the low-voltage device. As a result, the current consumption of the target low-voltage device can be reduced to substantially zero (0). In addition, the operation limitation of the low-voltage device includes a state (hereinafter, referred to as an "operation-limited state") in which the low-voltage device continues to operate in a performance of the low-voltage device is relatively low. As a result, the current consumption of the target low-voltage device can be reduced as compared with the case of the operation state in which the performance of the target low-voltage device is relatively high.

The low-voltage device whose current consumption is to be reduced is a low-voltage device whose current consumption is relatively large. The target low-voltage device includes, for example, the water pump 64. The operation-limited state of the water pump 64 includes, for example, a state in which the discharge flow rate of the water pump 64 is limited to be relatively smaller (lower) than normal. The target low-voltage device includes, for example, the fan 90. The operation-limited state of the fan 90 includes, for example, a state in which the rotation speed of the fan 90 is limited to be relatively smaller (lower) than normal. The target low-voltage device includes, for example, the air conditioner 80. The operation-limited state of the air conditioner 80 includes, for example, an operation state in which the set temperature of the air conditioner 80 is limited to be relatively high in a situation where the set temperature is lower than the outside air temperature (for example, in summer). The operation-limited state of the air conditioner 80 includes, for example, an operation state in which the set temperature of the air conditioner 80 is limited to be relatively low in a situation where the set temperature is higher than the outside air temperature (for example, in winter).

The refrigerant circuit 66 is filled with a relatively large volume of refrigerant. Therefore, even when the operation of the water pump 64 and the fan 90 is limited, the heat of the cooling target moves to the refrigerant circuit 66. Therefore, although the cooling performance decreases, the cooling device 60 can continue to cool the cooling target even in a state in which the operation of the water pump 64 or the fan 90 is limited.

In step S102, the controller 30A may stop the operation of the target low-voltage device, may shift the operation of the target low-voltage device to the operation-limited state, or may selectively stop the operation of the target low-voltage device and shift the operation of the target low-voltage device to the operation-limited state.

For example, the controller 30A may determine whether to stop the operation of the target low-voltage device or to set the target low-voltage device to the operation-limited state in accordance with the voltage of the battery 46. The voltage of the battery 46 can be ascertained based on the output of the sensor 48. For example, when the voltage of the battery 46 is relatively high, the controller 30A may set the operation of the target low-voltage device to the operation-limited state, and when the voltage of the battery 46 is relatively low, the controller 30A may set the operation of the target low-voltage device to the stopped state.

In addition, in step S102, the controller 30A may limit the operation of all of the target low-voltage devices such as the water pump 64, the fan 90, and the air conditioner 80, or may limit the operation of some of them. In addition, in step S102, the controller 30A may selectively use a case where the operation limitation is performed on all the target low-voltage devices such as the water pump 64, the fan 90, and the air conditioner 80 and a case where the operation limitation is performed on a part of the target low-voltage devices.

For example, the controller 30A may change the number of low-voltage devices to be subjected to operation limitation in accordance with the voltage of the battery 46. To be more specific, the controller 30A may increase the number of low-voltage devices subject to the operation limitation as the voltage of the battery 46 decreases. In this case, the controller 30A may preferentially limit the operation of the water pump 64 or the fan 90 over the operation of the air conditioner 80. Further, when the fan 90 for blowing the condenser 82B and the fan 90 for blowing the radiator 62 are separately provided, the controller 30A may preferentially limit the operation of the latter fan 90 over the former fan 90.

Hereinafter, also in the case of FIGS. 18 to 20 described later, various aspects of the operation limitation of the target low-voltage device described above may be appropriately employed.

When the process of step S102 is completed, the controller 30A proceeds to step S104.

In step S104, the controller 30A determines whether or not the DC-DC converter 44 has returned from the operation-limited state to the normal operation state. When the DC-DC converter 44 has returned to the normal operation state, the controller 30A proceeds to step S106. When the DC-DC converter 44 has not returned to the normal operation state, the controller 30A repeats the processing of this step until the DC-DC converter 44 returns to the normal operation state.

In step S106, the controller 30A cancels the operation limitation of the target low-voltage device.

The controller 30A may notify a user a cancellation of the operation limitation of the target low-voltage device through the output device 50 in conjunction with the cancellation of the operation limitation of the target low-voltage device. In addition, when the shovel 100 is remotely operated or remotely monitored, the controller 30A may transmit a notification signal indicating that the operation limitation of the target low-voltage device is canceled to the external device through the communication device. The same applies to step S204 in a second example (FIG. 18), step S302 in a third example (FIG. 19), and step S402 in a fourth example (FIG. 20), which will be described later.

When the process of step S106 is completed, the controller 30A ends the process of the current flowchart.

When the possibility that the operation limitation of the DC-DC converter 44 will be canceled is very small, for example, when the operation limitation is caused by an abnormality of the DC-DC converter 44, the processes of steps S104 and S106 may be omitted.

For example, as illustrated in FIG. 17, when the power supply from the DC-DC converter 44 to the battery 46 is limited and the low-voltage device is operated by taking out the power from the battery 46, the voltage of the battery 46 decreases. In particular, in the electric shovel 100, the power consumption of the controllers 30B, 30D, and the like of the electric drive system and the power supply system and the power consumption of the cooling system such as the water pump 64 and the fan 90 are relatively increased as compared with the normal shovel, and the voltage drop due to the internal resistance becomes remarkable. Therefore, in a situation in which the operation limitation of the DC-DC converter 44 is not canceled, the voltage of the battery 46 rapidly drops when the operation limitation of the low-voltage device is not performed. Then, the lower limit values of the control power sources of the various controllers such as the controllers 30A to 30E included in the control device 30 are immediately reached, and the various controllers are stopped (see the broken lines in the drawing). As a result, the shovel 100 is forcibly stopped. Therefore, when the power supply from the DC-DC converter 44 to the battery 46 or the low-voltage device is limited, there is a possibility that the shovel 100 cannot be retracted to a safe place or the shovel 100 cannot be moved for repair in some cases.

On the other hand, in this example, the controller 30A limits the operation of the low-voltage device. Therefore, since the current consumption of the low-voltage device decreases, the voltage drop due to the internal resistance decreases, the voltage recovers, and the voltage drop of the battery 46 also becomes slower due to the decrease in the current consumption (see the solid line in the drawing). As a result, a relative long time can be secured until the voltage of the battery 46 reaches the lower limit value of the control power supply of the various controllers and the shovel 100 is forcibly stopped. Therefore, the user can operate the shovel 100 to evacuate the shovel 100 to a safe place or move the shovel 100 for repair. When the shovel 100 operates with the fully automatic operation function, the shovel 100 can automatically evacuate the shovel 100 to a safe place or automatically move the shovel 100 for repair, for example, in a predetermined evacuation mode or the like.

As described above, in this example, when the power supply from the DC-DC converter 44 to the battery 46 is limited, the controller 30A limits the operation of the target low-voltage load to reduce the power consumption.

As a result, the controller 30A can suppress the voltage drop of the battery 46 when the power supply from the DC-DC converter 44 is limited, and can secure a relatively long time until the various controllers are stopped. Therefore, the shovel 100 can evacuate the shovel 100 (the shovel itself) to a safe place or move the shovel 100 (the shovel itself) for repair by an operator's operation or an automatic operation function.

In the present example, a case where the power supply from the DC-DC converter 44 to the battery 46 is limited may include a case where an abnormality occurs in the DC-DC converter 44. Specifically, the abnormality of the DC-DC converter 44 includes at least one of an input overvoltage, an input low voltage, an output overvoltage, an output low voltage, a short circuit, an overcurrent, overheating, an excessive power supply voltage, an insufficient power supply voltage, and a communication abnormality Accordingly, when the abnormality occurs in the DC-DC converter 44, the controller 30A can suppress a voltage drop of the battery 46 and ensure a relatively long time until the various controllers are stopped.

In the present example, the case where the power supply from the DC-DC converter 44 to the battery 46 is limited may include a case where the power supply from at least one of the plurality of DC-DC converters 44A and 44B to the battery 46 is stopped.

Accordingly, for example, when the power supply from one of the DC-DC converters 44A and 44B is stopped, the controller 30A can suppress the voltage drop of the battery 46 and secure a relatively long time until the various controllers are stopped.

In the present example, the low-voltage load whose operation is to be limited may include at least one of the water pump 64 and the fan 90.

As a result, the controller 30A can limit the operation of the water pump 64 and the fan 90, which consume relatively large current, to reduce the current consumption of the low-voltage devices.

In the present example, the low-voltage load subject to the operation limitation may include the air conditioner 80.

As a result, the controller 30A limits the operation of the air conditioner 80 that consumes a relatively large amount of current, so that the current consumption of all the low-voltage devices can be reduced.

In the present example, the controller 30A may limit the operations of the water pump 64 and the fan 90 with priority over the operation of the air conditioner 80.

As a result, the controller 30A can reduce the current consumption of all the low-voltage devices while taking into consideration the comfort and health of the user (operator) of the cabin 10, for example.

<Second Example of Control Method>

Figure 18:
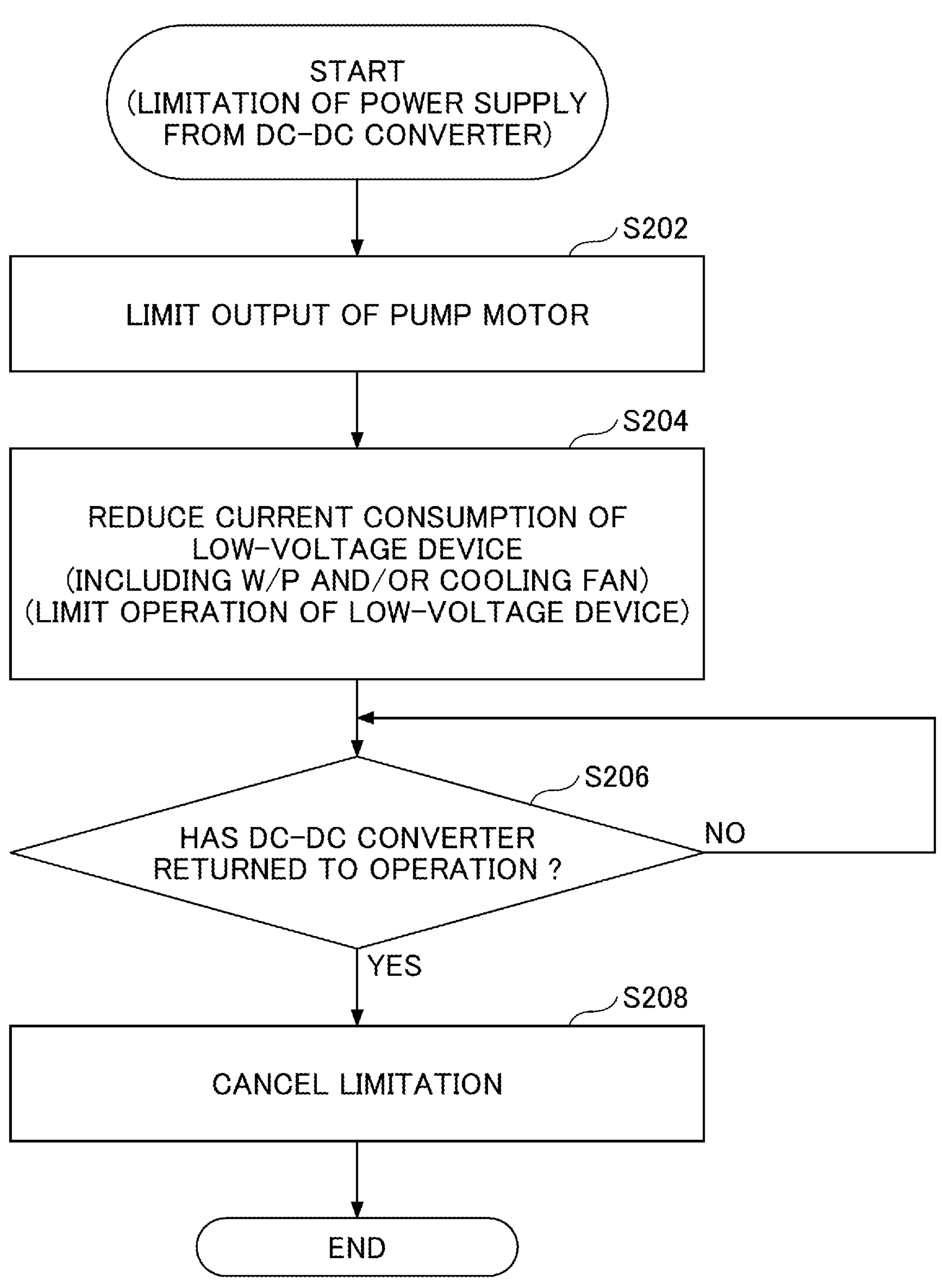
FIG. 18 is a flowchart schematically illustrating a second example of control processing when power supply from the DC-DC converter is limited.

FIG. 18 is a flowchart schematically showing a second example of the control processing when the power supply from the DC-DC converter 44 is limited.

As illustrated in FIG. 18, in step S202, the controller 30A outputs a control command to the controller 30B to limit the output of the pump motor 12. To be specific, the controller 30A may limit the output of the pump motor 12 by controlling regulators (not shown) to reduce the displacement of the variable displacement main pump 14 to reduce the load. Further, the controller 30A may limit the output of the pump motor 12 by reducing the rotational speed of the pump motor 12. In addition, the controller 30A may limit the output of the pump motor 12 by implementing both of them. As a result, heat generation of devices of the electric drive system and the power supply system can be suppressed and the load of the cooling device 60 can be reduced.

When the process of step S202 is completed, the controller 30A proceeds to step S204.

In step S204, the controller 30A reduces the current consumption of the low-voltage devices by limiting the operation of the low-voltage devices including the water pump 64 and the fan 90. Thus, similarly to the case of the first example described above, the controller 30A can relatively lengthen the time during which the controllers 30A to 30E and the like can operate only with the electric power of the battery 46.

Since the processes in steps S206 and S208 are the same as those in steps S104 and S106 in FIG. 16, the description thereof will be omitted.

When the process of step S208 is completed, the controller 30A ends the process of the current flowchart.

As described above, in this example, the controller 30A limits the output of the pump motor 12 when limiting the operation of at least one of the water pump 64 and the fan 90.

Thus, the controller 30A can suppress heat generation from the electric drive system and the power supply system by limiting the power of the pump motor 12. Therefore, even in a state in which the operation of the water pump 64 or the fan 90 is limited, the controller 30A can suppress the occurrence of a temperature rise (overheating) of the device to be cooled by the cooling device 60.

The controller 30A may ascertain the temperature state of the device to be cooled based on the output of the temperature sensor 54 and limit the output of the pump motor 12 in accordance with the temperature state of the device to be cooled by the cooling device 60. For example, the controller 30A may limit the output of the pump motor 12 when the temperature of the device to be cooled by the cooling device 60 exceeds a predetermined value.

<Third Example of Control Method>

Figure 19:
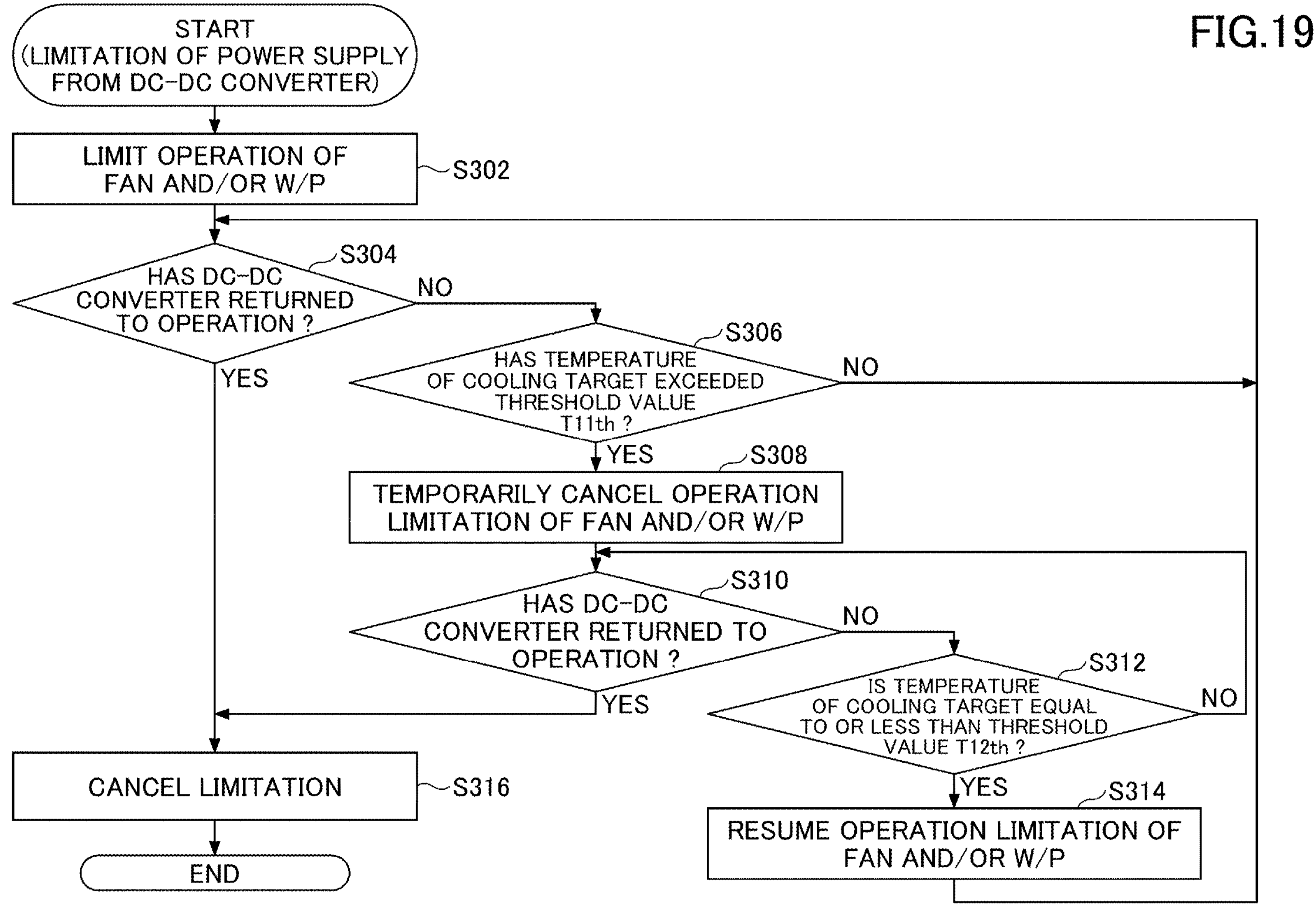
FIG. 19 is a flowchart schematically illustrating a third example of control processing when power supply from the DC-DC converter is limited.

FIG. 19 is a flowchart schematically showing a third example of the control processing when power supply from the DC-DC converter 44 is limited.

As illustrated in FIG. 19, in step S302, the controller 30A limits the operation of at least one of the water pump 64 and the fan 90. As a result, the current consumption of the entire low-voltage devices can be reduced.

When the process of step S302 is completed, the controller 30A proceeds to step S304.

In step S304, the controller 30A determines whether or not the DC-DC converter 44 has returned from the operation-limited state to the normal operation state. The controller 30A proceeds to step S306 when the DC-DC converter 44 has not returned to the normal operation state, and proceeds to step S316 when the DC-DC converter 44 has returned to the normal operation state.

On the other hand, in step S306, the controller 30A determines whether or not the temperature of the device to be cooled by the cooling device 60 exceeds a threshold value T11*th* (>0) based on the output of the temperature sensor 54. The controller 30A proceeds to step S308 when the temperature of the device to be cooled exceeds the threshold value T11*th*, and otherwise returns to step S304.

In Step S308, the controller 30A temporarily cancels the operation limitation of the water pump 64 or the fan 90 that has been subjected to the operation limitation in Step S302.

Accordingly, the cooling performance of the cooling device 60 can be enhanced and the temperature rise of the device to be cooled can be suppressed.

When the process of step S308 is completed, the controller 30A proceeds to step S310.

In step S310, the controller 30A determines whether or not the DC-DC converter 44 has returned from the operation-limited state to the normal operation state. The controller 30A proceeds to step S316 when the DC-DC converter 44 has returned to the normal operation state, and proceeds to step S312 when the DC-DC converter 44 has not returned to the normal operation state.

In step S312, the controller 30A determines whether or not the temperature of the device to be cooled by the cooling device 60 is equal to or lower than a threshold value T12*th* (<T11*th*). When the temperature of the device to be cooled is equal to or lower than the threshold value T12*th*, the controller 30A proceeds to step S314, and otherwise returns to step S310.

In step S314, the controller 30A resumes the operation limitation of the water pump 64 and the fan 90 temporarily canceled in step S308.

When the process of step S314 is completed, the controller 30A returns to step S304.

On the other hand, in step S316, the controller 30A cancels the operation limitation of the target low-voltage device.

When the process of step S316 is completed, the controller 30A ends the process of the current flowchart.

As described above, in the present example, when the temperature of the device to be cooled by the cooling device 60 becomes relatively high in a state where the operation limitation of the water pump 64 or the fan 90 is performed, the controller 30A temporarily cancels the operation limitation of the water pump 64 or the fan 90.

Thus, the controller 30A can suppress the temperature rise of the device to be cooled while suppressing the consumption current of the entire low-voltage devices.

<Fourth Example of Control Method>

Figure 20:
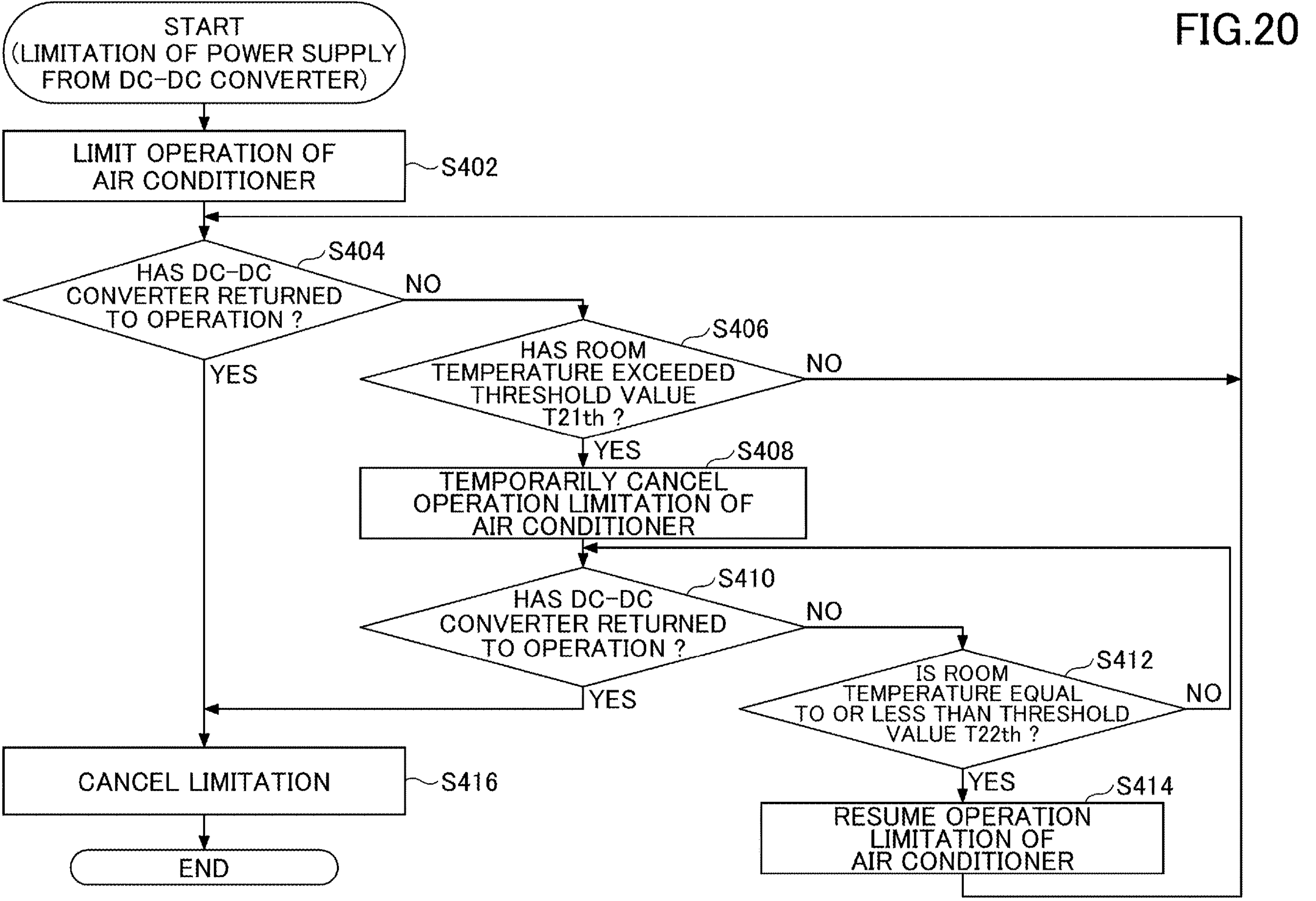
FIG. 20 is a flowchart schematically illustrating a fourth example of control processing when power supply from the DC-DC converter is limited.

FIG. 20 is a flowchart schematically showing a fourth example of the control processing when power supply from the DC-DC converter 44 is limited.

In this example, the control processing is performed in a situation where the set temperature of the air conditioner 80 is lower than the outside air temperature (for example, in summer).

As shown in FIG. 20, in step S402, the controller 30A limits the operation of the air conditioner 80. As a result, the current consumption of the entire low-voltage devices can be reduced.

When the process of step S402 is completed, the controller 30A proceeds to step S404.

In step S404, the controller 30A determines whether or not the DC-DC converter 44 has returned from the operation-limited state to the normal operation state. The controller 30A proceeds to step S406 when the DC-DC converter 44 has not returned to the normal operation state, and proceeds to step S416 when the DC-DC converter 44 has returned to the normal operation state.

On the other hand, in step S406, the controller 30A determines whether or not the temperature in the cabin 10 exceeds a threshold value T21*th* (>0) based on the output of the temperature sensor 56. The controller 30A proceeds to step S408 when the temperature of the device to be cooled exceeds the threshold value T21*th*, and otherwise returns to step S404.

In the case of the control processing in a situation where the set temperature of the air conditioner 80 is higher than the outside air temperature, it may be determined whether or not the indoor temperature of the cabin 10 is lower than the predetermined threshold value.

In step S408, the controller 30A temporarily cancels the operation limitation of the air conditioner 80 that has been subjected to the operation limitation in step S402. As a result, the performance of the air conditioner 80 can be enhanced, and an increase in the indoor temperature of the cabin 10 can be suppressed.

When the process of step S408 is completed, the controller 30A proceeds to step S410.

In step S410, the controller 30A determines whether or not the DC-DC converter 44 has returned from the operation-limited state to the normal operation state. The controller 30A proceeds to step S416 when the DC-DC converter 44 has returned to the normal operation state, and proceeds to step S412 when the DC-DC converter 44 has not returned to the normal operation state.

In step S412, the controller 30A determines whether or not the room temperature of the cabin 10 is equal to or lower than a threshold value T22*th* (<T11*th*). When the temperature of the device to be cooled is equal to or lower than the threshold value T22*th*, the controller 30A proceeds to step S414, and otherwise returns to step S410.

In the case of control processing in a situation where the set temperature of the air conditioner 80 is higher than the outside air temperature, it may be determined whether or not the indoor temperature of the cabin 10 is equal to or higher than the predetermined threshold value.

In Step S414, the controller 30A resumes the operation limitation of the air conditioner 80 temporarily canceled in Step S408.

When the process of step S414 is completed, the controller 30A returns to step S404.

On the other hand, in step S416, the controller 30A cancels the operation limitation of the target low-voltage device.

When the process of step S416 is completed, the controller 30A ends the process of the current flowchart.

As described above, in the present example, the controller 30A temporarily cancels the operation limitation of the air conditioner 80 when the indoor temperature of the cabin 10 exceeds the predetermined value in a direction away from the preset temperature of the air conditioner 80 in a state where the operation limitation of the air conditioner 80 is performed.

As a result, the controller 30A can suppress a situation in which the temperature in the cabin 10 becomes too high in summer or too low in winter while suppressing the current consumption of the entire low-voltage devices.

[Control Processing Relating to Start-Up and Fall-Down of Operation Mode]

Next, with reference to FIGS. 21 and 22, a description will be given of a control processing related to start-up and fall-down of an operation mode of the shovel 100.

Figure 21:
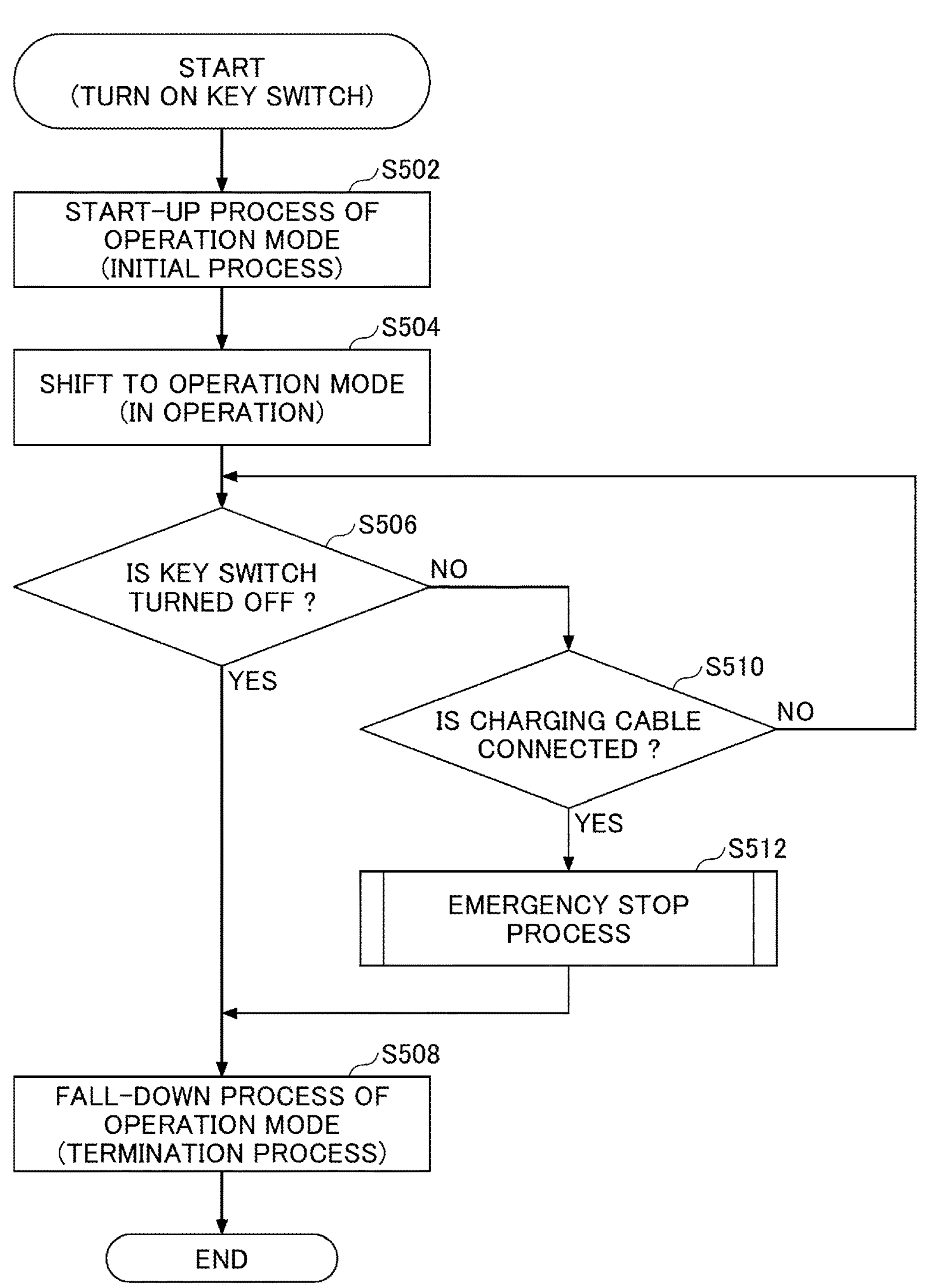
FIG. 21 is a flowchart schematically illustrating an example of control processing relating to start-up and fall-down of an operation mode of the shovel.

FIG. 21 is a flowchart schematically illustrating a control processing related to start-up and fall-down of the operation mode of the shovel 100. FIG. 22 is a flowchart schematically illustrating an example of an emergency stop processing of the shovel 100.

The flowchart of FIG. 21 is started when the key switch is turned on in response to a predetermined input from a user through the input device 52. The key switch is provided in an electric power system between the battery 46 and various controllers such as the controllers 30A to 30E.

As illustrated in FIG. 21, in step S502, the controller 30A performs the start-up process of the operation mode, which corresponds to the initial process at an activation of the shovel 100. The operation mode is a default control mode at the time of operation (during operation) of the shovel 100 for performing normal work by operating the actuator in accordance with an operation of the operator or an operation command corresponding to the automatic operation function.

When the process of step S502 is completed, the controller 30A proceeds to step S504.

In step S504, the controller 30A transits to the operating mode corresponding to the normal operation of the shovel 100.

When the process of step S504 is completed, the controller 30A proceeds to step S506.

In step S506, the controller 30A determines whether or not the key switch is turned on. When the key switch is turned on, the controller 30A proceeds to step S508, and when the key switch is not turned on, the controller 30A proceeds to step S510.

In Step S508, the controller 30A performs a fall-down process of the operation mode corresponding to a termination process when the shovel 100 is stopped.

When the process of step S508 is completed, the controller 30A ends the process of the current flowchart.

On the other hand, in step S510, the controller 30A determines whether or not the charging cable extending from the external power supply is connected to the charging port 72. For example, when the charging cable is connected to the charging port 72A, the on-board charger 70 transmits to the controller 30D a signal indicating that the charging cable is connected to the charging port 72A. Accordingly, through the controller 30D, the controller 30A can ascertain that the charging cable is connected to the charging port 72A by ascertaining the reception of the signal from the on-board charger 70. In addition, for example, when the charging cable is connected to the charging port 72B, the controller 30D ascertains the state in which the charging cable is connected to the charging port 72B by a contact detection, communication with the charging station side by electric power line communication, or the like. Accordingly, through the controller 30D, the controller 30A can ascertain that the charging cable is connected to the charging port 72B. The controller 30A proceeds to step S512 when the charging cable extending from the external power supply is connected to the charging port 72, and returns to step S506 when the charging cable is not connected.

In step S512, emergency stop processing of the shovel 100 is performed. Specifically, the process proceeds to the flowchart of FIG. 22.

Figure 22:
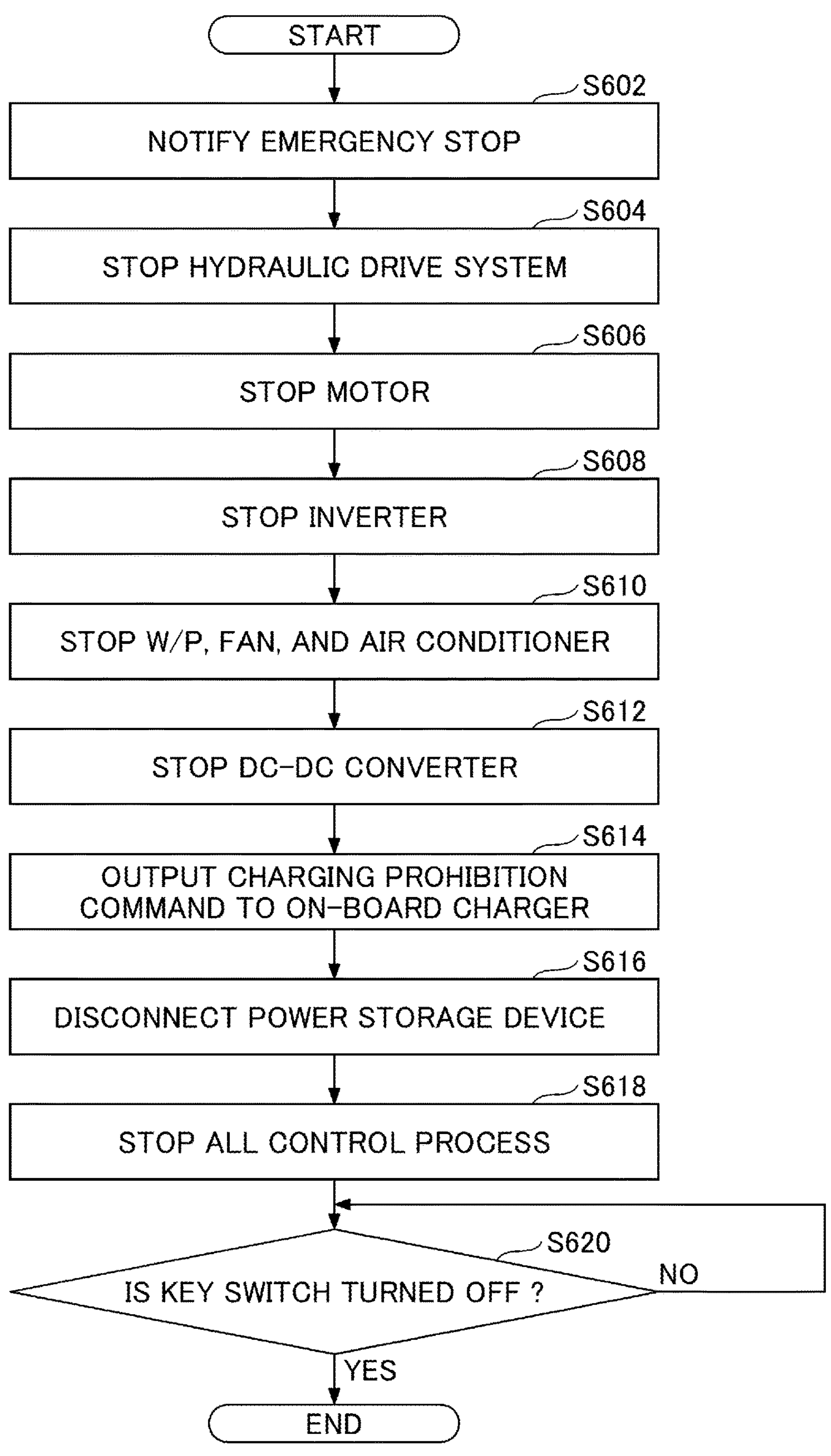
FIG. 22 is a flowchart schematically illustrating an example of an emergency stop processing of the shovel.

FIG. 22 is a flowchart of the emergency stop processing when the charging cable is connected to the charging port 72A.

As illustrated in FIG. 22, in step S602, the controller 30A notifies the user through the output device 50 that the shovel 100 is to be urgently stopped along with the reason. In addition, the controller 30A may also notify that it is necessary to turn off the key switch once in order to return the shovel 100 from the emergency stop state (see step S620). When the shovel 100 is remotely operated or remotely monitored, the controller 30A may transmit a signal indicating that the shovel 100 is brought to an emergency stop or the like to the external device via the communication device.

The controller 30A proceeds to step S604 when the process of step S602 is completed and a predetermined time has elapsed.

In step S604, the controller 30A stops the hydraulic drive system. For example, the controller 30A blocks the pilot line 25 through the switch valve 25V2 by energizing the relay 25R and opening the relay 25R. As a result, the supply of the pilot pressure to the hydraulic control valve 31 is blocked (stopped), and even if the operation device 26 is operated, the hydraulic actuator does not operate, and the hydraulic drive system is stopped.

When the process of step S604 is completed, the controller 30A proceeds to step S606.

In step S606, the controller 30A stops the pump motor 12 through the controller 30B.

Through the controller 30B, when the controller 30A confirms the pump motor 12 has been stopped, the controller 30A proceeds to step S608. For example, through the controller 30B, the controller 30A receives a signal related to the rotational speed of the pump motor output from the inverter 18, and ascertains that the rotation of the pump motor 12 has been stopped.

In step S608, the controller 30A stops the inverter 18 through the controller 30B.

When the controller 30A confirms that inverter 18 has stopped, it proceeds to step S610. For example, through controller 30B, the controller 30A receives a signal output from inverter 18 indicating that operation has stopped, and grasps that inverter 18 has stopped.

In step S610, the water pump 64, the fan 90, and the air conditioner 80 are stopped.

When the process of step S610 is completed, the controller 30A proceeds to step S612.

In step S612, the controller 30A stops the DC-DC converter 44 through the controller 30E.

When the controller 30A confirms that the DC-DC converter 44 has stopped, controller 30A proceeds to step S614. Through the controller 30E, the controller 30A receives a signal output from the DC-DC converter 44 indicating that operation has stopped, and grasps that the DC-DC converter 44 has stopped.

In step S614, the controller 30A outputs a charging prohibition command of the power storage device 19 to the on-board charger 70 through the controller 30D.

When the charging cable is connected to the charging port 72B, in this step, the controller 30A may output a signal requesting prohibition (stop) of charging of the power storage device 19 to the external power supply (charging station) side.

When the controller 30A confirms that the charging prohibition is reflected in the on-board charger 70, the controller 30A proceeds to step S616. For example, the controller 30A grasps the charging prohibition state of the on-board charger 70 by receiving a signal indicating the charging prohibition state output from the on-board charger 70 through the controller 30D.

In step S616, the controller 30A blocks the system main relay through the controller 30D to disconnect the power storage device 19 from the power supplying system.

When the controller 30A confirms that the power storage device 19 is disconnected from the power supplying system, the controller 30A proceeds to step S618. For example, the controller 30A receives a signal indicating a measurement result of the voltage of the power storage device 19 input from the power storage device 19 through the controller 30D, and thereby grasps that the power storage device 19 is in a state of being disconnected from the power supplying system.

In step S618, the controller 30A stops all the control processing of the control device 30.

When the process of step S618 is completed, the controller 30A proceeds to step S620.

In step S620, the controller 30A determines whether or not the key switch is turned off. When the key switch is not turned off, the process of this step is repeated until the key switch is turned off, and when the key switch is turned off, the process of this flowchart is ended.

In the emergency stop processing, only one of the stop of the hydraulic drive system and the stop of the electric drive system and the power storage system may be performed. When only the stop of the hydraulic drive system is performed, the process from step S604 to step S618 may be omitted. When only the electric drive system and the power storage system are stopped, the process of step S602 is omitted.

Referring back to FIG. 21, when the process of step S512, that is, the flowchart of FIG. 22 ends, the controller 30A proceeds to step S508.

As described above, in the present example, when the charging cable is connected to the charging port 72 during operation of the shovel 100, the controller 30A causes the hydraulic actuators to transition to the inoperable state.

Thus, the controller 30A can substantially prohibit continuation of the work of the shovel 100 in a state where the charging cable is connected to the charging port. Therefore, for example, in a case where a third party connects a charging cable to the charging port 72 during operation of the shovel 100 and a user (operator) of the cabin 10 is not aware, a situation in which the shovel 100 continues the work can be avoided. Therefore, for example, a situation in which the shovel 100 continues the work and the charging cable is broken or the charging cable is dragged to affect the surrounding of the shovel 100 can be avoided and the safety of the electric shovel 100 can be improved.

In the present example, the controller 30A may stop the pump motor 12 when the charging cable is connected to the charging port 72 during operation of the shovel 100.

As a result, the shovel 100 can stop the main pump 14, and specifically, can shift the operation of the hydraulic actuator to an inoperable state.

When a predetermined cable is connected to the charging port 72 during the operation of the shovel 100, the controller 30A may block the supply of the hydraulic oil from the pilot pump 15 (the main pump 14 when the pilot pump 15 is omitted) to the hydraulic control valve 31.

As a result, the shovel 100 can stop the supply of the pilot pressure from the pilot pump 15 or the main pump 14 to the hydraulic control valve 31, and specifically, can shift the operation of the hydraulic actuators to the inoperable state.

The output device 50 may notify the user of the reason why the hydraulic actuators are shifted to the inoperable state under the control of the controller 30A.

Accordingly, the shovel 100 can cause the user to recognize that the hydraulic actuators are shifted to the inoperable state due to the connection of the charging cable.

[Control Processing Relating to Start-Up and Fall-Down of Charging Mode]

Next, with reference to FIGS. 23 and 24, a description will be given of a control processing related to start-up and fall-down of the charging mode.

FIG. 23 is a flowchart schematically illustrating an example of a control processing related to start-up and fall-down of the charging mode of the shovel 100. FIG. 24 is a flowchart schematically illustrating an example of a forced termination processing of the charging mode.

Figure 24:
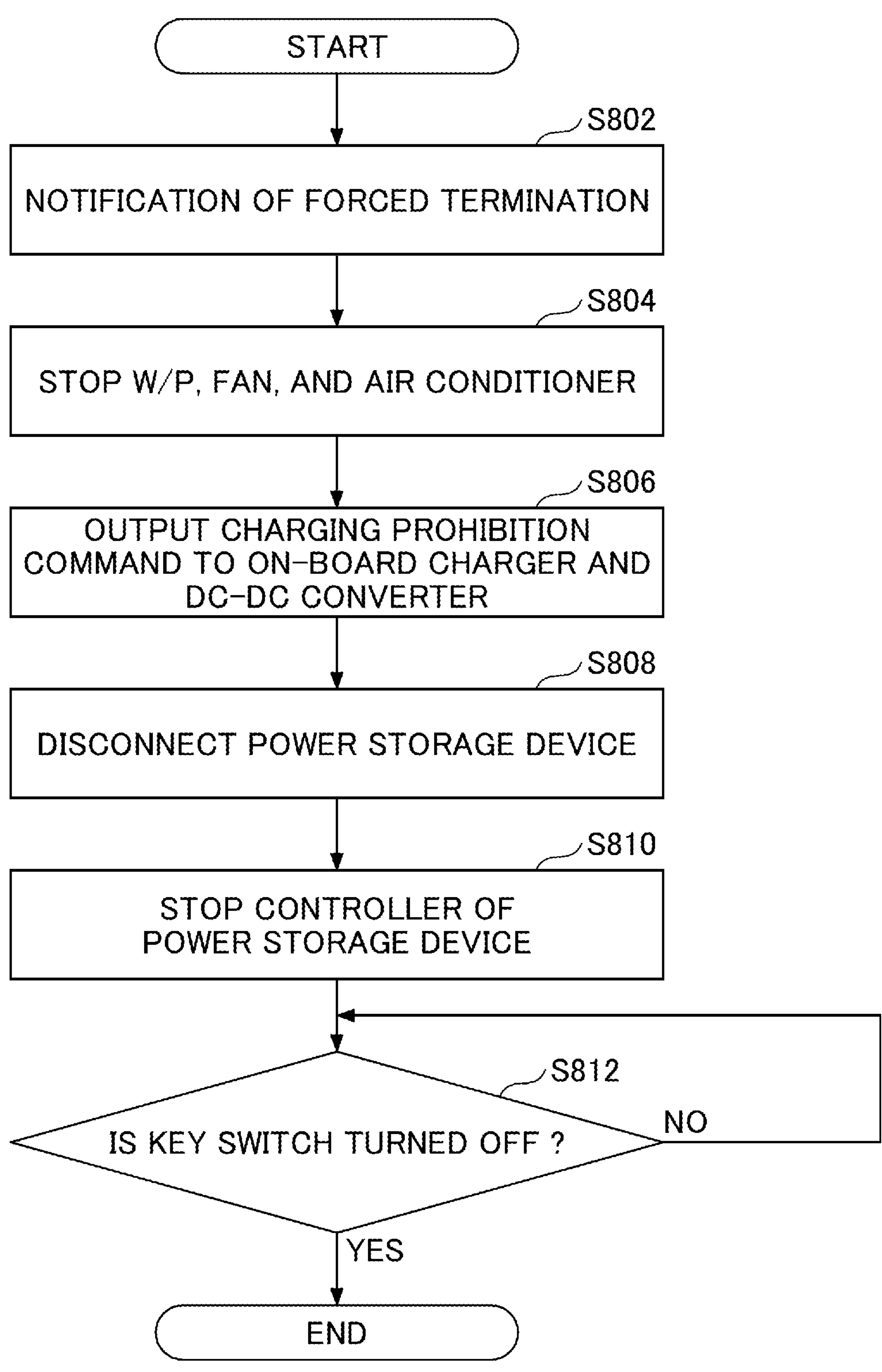
FIG. 24 is a flowchart schematically illustrating an example of forced termination processing of the charging mode.

FIGS. 23 and 24 are flowcharts of the emergency stop processing when the charging cable is connected to the charging port 72A.

The flowchart of FIG. 23 is started, for example, when the charging cable is connected to the charging port 72 while the shovel 100 is stopped, that is, while the key switch is in the OFF state. The flowchart of FIG. 23 may be started, for example, when the key switch is in the OFF state, the accessory switch is in the OFF state, and the charging cable is connected to the charging port 72. The accessory switch is provided on a power supply path between predetermined low-voltage devices, other than the control device 30, and the battery 46. When the accessory switch is switched from an OFF state (open state) to an ON state (closed state), power can be supplied from the battery 46 or the DC-DC converter 44 to the low-voltage devices while the shovel 100 is stopped.

As illustrated in FIG. 23, in step S702, the controller 30A starts a process of starting up the charging mode of the shovel 100. The charging mode of the shovel 100 is a control mode for charging the power storage device 19 through the charging cable.

When the process of step S702 is completed, the controller 30A proceeds to step S704.

In step S704, the controller 30A determines whether or not the start-up process of the charging mode is completed. The controller 30A proceeds to step S706 when the start-up process of the charging mode is not completed, and proceeds to step S708 when the start-up process of the charging mode is completed.

In step S706, the controller 30A determines whether or not a condition for stopping the start-up of the charging mode (hereinafter referred to as "start-up stop condition") is satisfied. The start-up stop condition includes, for example, reception of a signal indicating an abnormality from the on-board charger 70 through the controller 30D. When the start-up stop condition is not satisfied, the controller 30A returns to step S704, and when the start-up stop condition is satisfied, the controller 30A proceeds to step S732.

When the charging cable is connected to the charging port 72B, the start-up stop condition in this step may include, for example, reception of a signal indicating an abnormality from the external power supply (charging station) side through the controller 30D.

On the other hand, in step S708, the controller 30A shifts to the charging mode.

When the process of step S708 is completed, the controller 30A proceeds to step S710.

In step S710, the controller 30A determines whether or not there is an abnormality in the on-board charger 70. For example, the controller 30A may determine whether or not a signal indicating an abnormality output from the on-board charger 70 is received through the controller 30D. The controller 30A proceeds to step S712 when there is no abnormality in the on-board charger 70, and proceeds to step S732 when there is an abnormality in the on-board charger 70.

When the charging cable is connected to the charging port 72B, in this step, the controller 30A may determine whether or not a signal indicating an abnormality is received from the external power supply (charging station) side through the controller 30D.

In step S712, the controller 30A determines whether or not the key switch is in the OFF state. The controller 30A proceeds to step S714 when the key switch is in the OFF state, and proceeds to step S732 when the key switch is in the ON state.

In step S714, the controller 30A prepares to start charging. To be more specific, the controller 30A may shift the system main relay to the connected state through the controller 30D. Further, the controller 30A may notify a user that charging is started through the output device 50.

When the process of step S714 is completed, the controller 30A proceeds to step S716.

In step S716, the controller 30A determines whether or not a charging start condition is satisfied. The charging start condition includes, for example, that a key switch is in an OFF state. The charging start condition includes, for example, that the on-board charger 70 is in a standby state. For example, the controller 30A grasps the state of the on-board charger 70 by receiving a signal indicating the current state from the on-board charger 70 through the controller 30D. The charging start condition includes a condition that charging from the DC-DC converter 44 to the battery 46 is completed and the battery 46 is fully charged. For example, the controller 30A grasps the voltage state of the battery 46 by receiving the output of the sensor 48 through the controller 30E. The charging start condition includes that the system main relay of the power storage device 19 is connected. For example, the controller 30A can grasps the connection state of the system main relay by receiving, through the controller 30D, a signal indicating the measurement result of the voltage of the power storage device 19 including the system main relay in the path. The controller 30A proceeds to step S718 when the charging start condition is satisfied, and proceeds to step S732 when the charging start condition is not satisfied.

When the charging cable is connected to the charging port 72B, the charging start condition may include a condition related to the state of the external power supply (charging station side) instead of the condition related to the on-board charger 70.

In step S718, the controller 30A starts charging the power storage device 19. To be specific, the controller 30A outputs a charging start command to the on-board charger 70 through the controller 30D. Further, the controller 30A operates the water pump 64 and the fan 90. As a result, a temperature rises due to heat generation of the power storage device 19 and the on-board charger 70 can be suppressed.

During charging of the power storage device 19, the controller 30A may switch between operation and stop of the water pump 64 and the fan 90 while ascertaining the temperature states of the devices to be cooled (the power storage device 19, the on-board charger 70, and the like) based on the output of the temperature sensor 54.

When the process of step S718 is completed, the controller 30A proceeds to step S720.

In step S720, the controller 30A determines whether or not a charging stop condition is satisfied. For example, the charge stop condition includes that a key switch is in an ON state. In addition, for example, the charging stop condition includes a signal indicating an abnormality in another controller (controllers 30B to 30E, or the like). The controller 30A proceeds to step S722 when the charging stop condition is not satisfied, and proceeds to step S732 when the charging stop condition is satisfied.

In step S722, the controller 30A determines whether or not a charging end condition is satisfied. For example, the charge end condition includes a state of charge (SOC) of the power storage device 19 reaching a predetermined target value (target charge amount). The target charge amount may be, for example, 100% representing full charge, or may be a charge amount (for example, 80%) lower than full charge which is appropriately set manually or automatically. For example, the controller 30A grasps the charging state of the power storage device 19 by receiving a signal indicating a calculation result of the charging state based on a measurement result of the voltage of the power storage device 19 from the controller 30D. In addition, the charging end condition may include, for example, removal of the charging cable from the charging port 72. The controller 30A proceeds to step S724 when the charging end condition is satisfied, and returns to step S720 when the charging end condition is not satisfied.

In step S724, the controller 30A stops the water pump 64, the fan 90, and the air conditioner 80.

When the process of step S724 is completed, the controller 30A proceeds to step S726.

In step S726, the controller 30A prepares to end charging of the power storage device 19. To be specific, the controller 30A may output a control command for transition to the standby state to the on-board charger 70. Further, the controller 30A may output a control command for stopping the operation to the DC-DC converter 44.

When the controller 30A confirms that the on-board charger 70 is shifted to the standby state and the operation of the DC-DC converter 44 is stopped, the controller 30A proceeds to step S728.

In Step S728, the controller 30A blocks the system main relay through the controller 30D to disconnect the power storage device 19 from the power supplying system.

When the controller 30A confirms that the power storage device 19 is disconnected from the power supplying system, the controller proceeds to step S730.

In step S730, the controller 30A stops the controller 30D of the power storage device 19.

When the process of step S730 is completed, the controller 30A proceeds to step S734.

On the other hand, in step S732, the controller 30A performs a forced termination process of the charging mode. Specifically, the process proceeds to the flowchart of FIG. 24.

As illustrated in FIG. 24, in step S802, the controller 30A notifies the user via the output device 50 that the charging mode of the shovel 100 will be forcibly terminated together with the reason. The controller 30A may also notify that the key switch is needed to be turned off once in order to recover from the forced termination of the charging mode (see step S812). When the shovel 100 is remotely operated or remotely monitored, the controller 30A may transmit a signal indicating that the shovel 100 is brought to an emergency stop or the like to the external device via the communication device.

The controller 30A proceeds to step S802 when the process of step S804 is completed and a predetermined time has elapsed.

In step S804, the water pump 64, the fan 90, and the air conditioner 80 are stopped.

When the process of step S804 is completed, the controller 30A proceeds to step S806.

In step S806, the controller 30A outputs a charging prohibition command for the power storage device 19 and the battery 46 to the on-board charger 70 and the DC-DC converter 44 through the controllers 30D and 30E.

When the charging cable is connected to the charging port 72B, in this step, the controller 30A may output a signal requesting prohibition (stop) of charging of the power storage device 19 to the external power supply (charging station) side.

When the controller 30A confirms that the charging prohibition is reflected in the on-board charger 70, the controller 30A proceeds to step S808.

In Step S808, the controller 30A blocks the system main relay through the controller 30D to disconnect the power storage device 19 from the power supplying system.

When the controller 30A confirms that the power storage device 19 is disconnected from the power supplying system, the controller 30A proceeds to step S810.

In step S810, the controller 30A stops the controller 30D of the power storage device 19.

When the process of step S810 is completed, the controller 30A proceeds to step S812.

In step S812, the controller 30A determines whether or not the key switch is turned off. When the key switch is not turned off, the process of this step is repeated until the key switch is turned off, and when the key switch is turned off, the process of this flowchart is ended.

Referring back to FIG. 23, when the process of step S732, that is, the flowchart of FIG. 24 ends, the controller 30A proceeds to step S734.

In Step S734, the controller 30A performs a process of falling down the charging mode.

When the process of step S734 is completed, the controller 30A ends the process of the current flowchart.

As described above, in the present example, when the charging cable is connected to the charging port 72, the controller 30A does not start the pump motor 12 even if an input for activating the pump motor 12 (for example, an input for turning on the key switch) is received from the user.

Accordingly, for example, a situation in which the shovel 100 starts work during charging and the charging cable is broken or the charging cable is dragged thereby affecting the surroundings of the shovel 100 can be avoided, and the safety of the electric shovel 100 can be improved.

In this example, when the charging cable is reconnected to the charging port 72 after canceling the input for activating the pump motor 12 and terminating the state in which the charging cable is connected to the charging port 72, the controller 30A may start charging the power storage device 19.

Thus, for example, when the user turns on the key switch, the controller 30A can reconfirm the user's intention to charge the power storage device 19 by imposing on the user the turn-off operation of the key switch and the reconnection of the charging cable to the charging port 72 again. Therefore, the controller 30A can more safely restart charging of power storage device 19.

The output device 50 may notify the user of the reason why the pump motor 12 for the pump does not start in response to an input from the user to start the pump motor 12 (for example, to turn on the key switch).

As a result, the shovel 100 can cause the user to recognize that the pump motor 12 is not activated because the charging cable is connected to the charging port 72.

In this example, the controller 30A may start charging the power storage device 19 when the charging cable is connected to the charging port 72 in a state where the accessory switch is on.

Thus, the controller 30A can operate low-voltage devices (for example, an air conditioner 80, a radio, and the like to be described later) of the shovel 100 at the start of charging of the power storage device 19.

[Control Processing Related to Use of Air Conditioner During Charging of Power Storage Device]

Next, with reference to FIGS. 25 and 26, a control processing related to the use of the air conditioner during charging of the power storage device 19 will be described.

<First Example of Control Processing>

Figure 25:
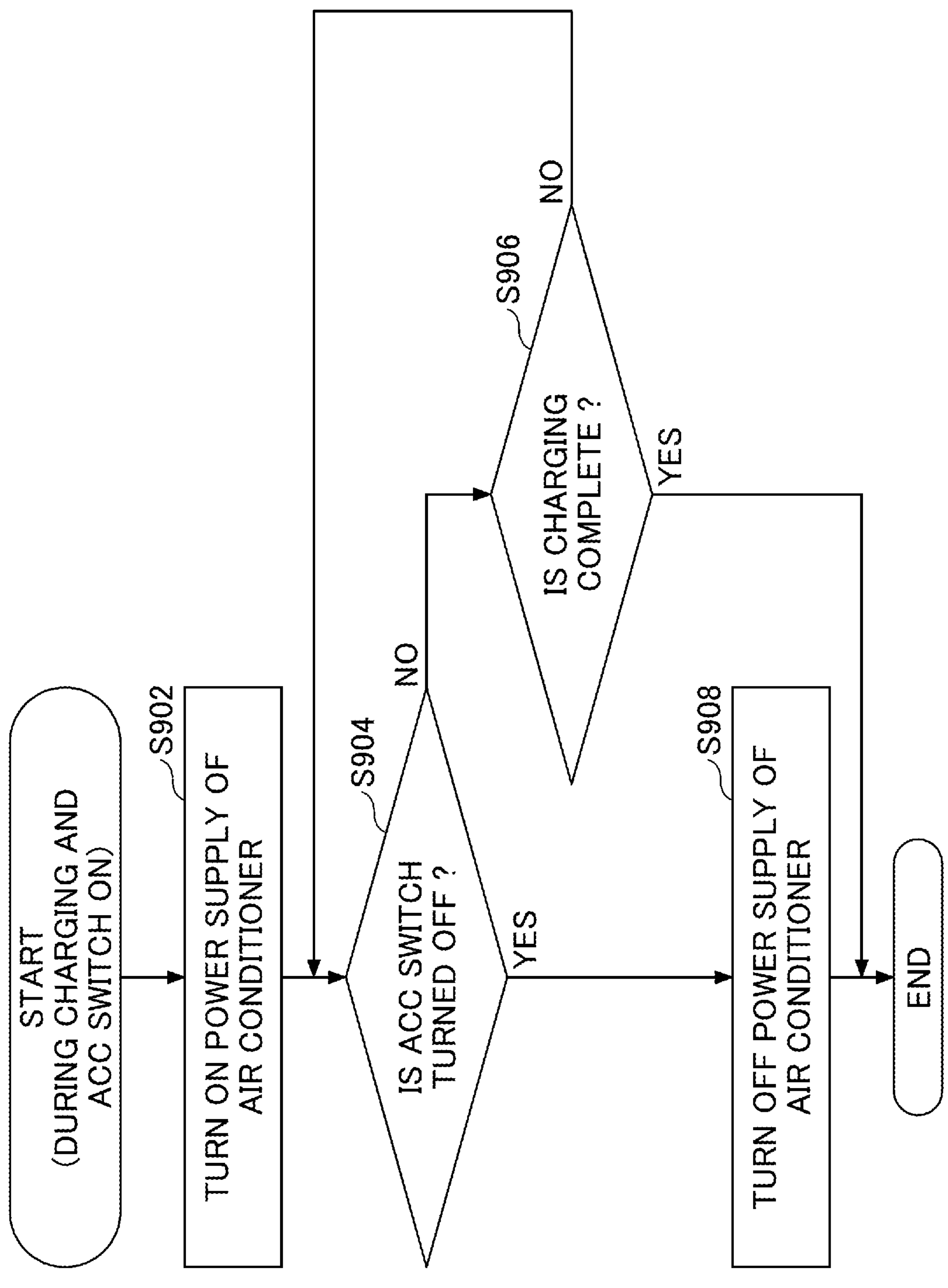
FIG. 25 is a flowchart schematically illustrating a first example of control processing relating to use of the air conditioner during charging of the power storage device.

FIG. 25 is a flowchart schematically illustrating a first example of control processing related to the use of the air conditioner 80 during charging of the power storage device 19.

This flowchart is executed when the power storage device 19 is being charged and the accessory switch is turned on. The accessory switch may be turned on from a state before the power storage device 19 is being charged or may be turned on after the power storage device 19 is being charged. The same applies to the flowchart of FIG. 26 described below.

As illustrated in FIG. 25, in step S902, the controller 30A turns on the power supply of the air conditioner 80. Thus, the air conditioner 80 can operate in response to an input from a user (operator) of the cabin 10.

When the process of step S902 is completed, the controller 30A proceeds to step S904.

In step S904, the controller 30A determines whether or not the accessory switch has been turned off. The controller 30A proceeds to step S906 when the accessory switch is not turned off, and proceeds to step S908 when the accessory switch is turned off.

In step S906, the controller 30A determines whether or not charging of the power storage device 19 is completed. When the charging of the power storage device 19 is completed, the controller 30A ends the process of the current flowchart. When the charging is not completed, the controller 30A proceeds to step S904.

On the other hand, in step S908, the controller 30A turns off the power supply of the air conditioner 80.

When the process of step S908 is completed, the controller 30A ends the current flowchart.

As described above, in the present example, when the charging cable is connected to the charging port, the controller 30A operates the air conditioner 80 in accordance with an input from the user. To be more specific, when the accessory switch is on and a predetermined cable is connected to the charging port, the controller 30A may operate the air conditioner in response to an input from the user.

Accordingly, the comfort and convenience of the user who works in the cabin 10 during charging of the power storage device 19 can be improved.

<Second Example of Control Processing>

Figure 26:
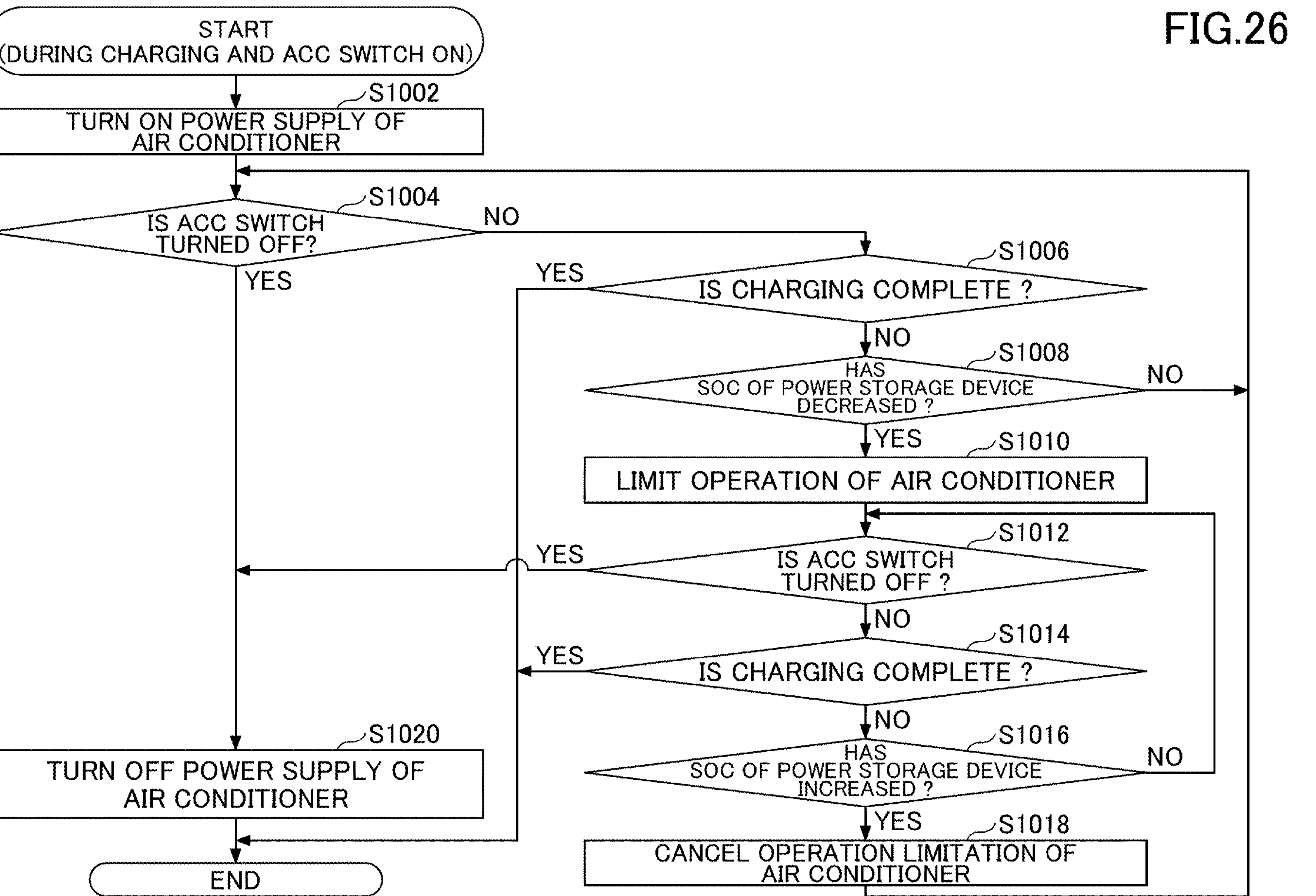
FIG. 26 is a flowchart schematically illustrating a second example of control processing relating to use of the air conditioner during charging of the power storage device.

FIG. 26 is a flowchart schematically illustrating a second example of the control processing related to the use of the air conditioner 80 during charging of the power storage device 19.

As illustrated in FIG. 26, the processes of steps S1002, S1004, and S1006 are the same as the processes of steps S902, S904, and S906 of FIG. 25, and thus description thereof will be omitted.

In step S1004, the controller 30A proceeds to step S1006 when the accessory switch is not in the OFF state, and proceeds to step S1020 when the accessory switch is in the OFF state.

In step S1006, when the charging of the power storage device 19 is not completed, the controller 30A proceeds to step S1008, and when the charging is completed, the controller 30A ends the process of the current flowchart.

In step S1008, the controller 30A determines whether or not the state of charge (SOC) of the power storage device 19 is decreasing. For example, the controller 30A sequentially receives the state of charge (SOC) calculated from the measurement result of the voltage of the power storage device 19 through the controller 30D, and thereby grasps the change in the charged amount of the power storage device 19. The controller 30A proceeds to step S1010 when the charged amount of the power storage device 19 is decreasing, and returns to step S1004 when the charged amount is not decreasing.

In step S1010, the controller 30A limits the operation of the air conditioner 80. As a result, the electric power supplied from the power storage device 19 to the air conditioner 80 through the DC-DC converter 44 can be reduced.

When the process of step S1010 is completed, the controller 30A proceeds to step S1012.

In step S1012, the controller 30A determines whether or not the accessory switch is in the OFF state. When the accessory switch is not in the OFF state, the controller 30A proceeds to step S1014, and when the accessory switch is in the OFF state, the controller 30A proceeds to step S1020.

In step S1014, the controller 30A determines whether or not charging of the power storage device 19 has been completed. When the charging of the power storage device 19 is not completed, the controller 30A proceeds to step S1016, and when the charging is completed, the controller 30A ends the process of the current flowchart.

In step S1016, the controller 30A determines whether or not the state of charge (SOC) of the power storage device 19 is increasing at a rate exceeding a predetermined reference. The controller 30A proceeds to step S1018 when the charged amount of the power storage device 19 is increasing at a rate exceeding the predetermined reference, and otherwise returns to step S1012.

In step S1018, the controller 30A cancels the operation limitation of the air conditioner 80.

The controller 30A returns to step S1004 after step S1018 is completed.

On the other hand, since step S1020 is the same as the process of step S908 in FIG. 25, description thereof will be omitted.

As described above, in this example, the controller 30A limits the operation of the air conditioner 80 when the charging amount of the power storage device 19 decreases in a state where the air conditioner 80 is operating while the power storage device 19 is being charged.

Thus, the controller 30A can shift the charging amount of the power storage device 19 from a decrease to an increase by limiting the operation of the air conditioner 80 in a situation in which the consumption current of the air conditioner 80 is relatively large and the charging amount of the power storage device 19 decreases even during charging. Therefore, the controller 30A can more appropriately realize both the charging of the power storage device 19 and the use of the air conditioner 80 during the charging of the power storage device 19.

Although the embodiment has been described in detail above, the present disclosure is not limited to the specific embodiment, and various modifications and changes can be made within the scope of the gist described in the claims.

What is claimed is:

1. A shovel comprising:

a lower traveling body;

an upper turning body turnably mounted on the lower traveling body;

a hydraulic actuator configured to drive a driven part including the lower traveling body and the upper turning body;

a first hydraulic pump configured to supply hydraulic oil to the hydraulic actuator;

an electric motor configured to drive the first hydraulic pump;

a power storage device configured to supply electric power to the electric motor;

a charging port configured to connect to a predetermined cable and charge the power storage device with electric power from an external power supply; and a hardware processor configured to determine whether a key switch is turned on, determine whether the predetermined cable is connected to the charging port in response to determining that the key switch is turned on, and shift the hydraulic actuator is shifted to an inoperable state in response to determining that the predetermined cable is connected to the charging port while the shovel is in operation.

2. The shovel according to claim 1, wherein the hardware processor is further configured to stop the electric motor in operation in response to determining that the predetermined cable is connected to the charging port while the shovel is in operation.

3. The shovel according to claim 1, further comprising:

a hydraulic control valve configured to drive the hydraulic actuator using hydraulic oil supplied from the first hydraulic pump; and a second hydraulic pump configured to be driven by the electric motor and supply the hydraulic oil for operating the hydraulic control valve, wherein the hardware processor is further configured to block the supply of hydraulic oil from the second hydraulic pump to the hydraulic control valve in response to determining that the predetermined cable is connected to the charging port while the shovel is in operation.

4. The shovel according to claim 1, further comprising a notification device configured to notify a user that the predetermined cable is connected to the charging port as a reason why the hydraulic actuator is shifted to the inoperable state.

5. The shovel according to claim 1, further comprising:

a battery having an output voltage lower than an output voltage the power storage device; and an electric load configured to operate with electric power of the battery;

a DC-DC converter configured to step down electric power of the power storage device and supply the stepped-down electric power to the battery and the electric load, wherein the hardware processor is further configured to limit operation of the electric load to reduce power consumption when the stepped-down electric power supplied from the DC-DC converter to the battery is limited.

6. The shovel according to claim 5, wherein a case where the stepped-down electric power supplied from the DC-DC converter to the battery is limited includes a case where an abnormality occurs in the DC-DC converter.

7. The shovel according to claim 5, wherein the DC-DC converter includes a plurality of DC-DC converters, and wherein a case where the stepped-down electric power supplied from the DC-DC converter to the battery is limited includes a case where power supplied from at least one of the plurality of DC-DC converters to the battery is stopped.

8. The shovel according to claim 5, wherein the electric load includes at least one of a refrigerant pump configured to circulate a refrigerant in a circulation circuit by causing the refrigerant to pass through targets to be cooled including the power storage device and the DC-DC converter; a cooling fan configured to blow air to a radiator configured to cool the refrigerant in the circulation circuit; or an air conditioner mounted on the upper turning body and configured to adjust a state of air inside a cabin in which a user is seated.

9. The shovel according to claim 1, wherein the hardware processor is further configured to stop charging the power storage device in response to determining that the predetermined cable is connected to the charging port.

10. A shovel comprising:

a lower traveling body;

an upper turning body turnably mounted on the lower traveling body;

a hydraulic actuator configured to drive a driven part including the lower traveling body and the upper turning body;

a hydraulic pump configured to supply hydraulic oil to the hydraulic actuator;

an electric motor configured to drive the hydraulic pump;

a power storage device configured to supply electric power to the electric motor;

a charging port configured to connect to a predetermined cable and charge the power storage device with electric power from an external power supply; and a hardware processor configured not to activate the electric motor in response to an input to activate the electric motor received from a user while detecting that the predetermined cable is connected to the charging port.

11. The shovel according to claim 10, wherein the hardware processor is further configured to stop charging the power storage device upon receiving the input to activate the electric motor from the user while detecting that the predetermined cable is connected to the charging port and restart charging the power storage device upon cancellation of the input to activate the electric motor and reconnection of the predetermined cable to the charging port after disconnection of the predetermined cable from the charging port, and the hardware processor is further configured to perform a start-up process of an operation mode in which to operate the hydraulic actuator in accordance with an operator's operation or an operation command corresponding to an automatic operation function, upon receiving the input to activate the electric motor from the user while not detecting that the predetermined cable is connected to the charging port.

12. The shovel according to claim 10, further comprising a notification device configured to notify the user that the predetermined cable is connected to the charging port as a reason why the electric motor is not activated in response to the input to activate the electric motor received from the user.

13. The shovel according to claim 10, further comprising:

a battery having an output voltage lower than an output voltage of the power storage device;

an electric power converter configured to supply electric power of the power storage device to the battery;

a cabin mounted on the upper turning body and in which the user is seated; and an air conditioner configured to adjust a condition of air inside the cabin, wherein the hardware processor is further configured to operate the air conditioner in response to an input from the user while detecting that the predetermined cable is connected to the charging port.

14. The shovel according to claim 13, further comprising:

electric equipment configured to operate with electric power of the battery, the electric equipment including the air conditioner; and an accessory switch configured to open and close a power supply path to the electric equipment, wherein the hardware processor is further configured to operate the air conditioner in response to an input from the user while detecting that the predetermined cable is connected to the charging port with the accessory switch being turned on.

15. The shovel according to claim 14, wherein the hardware processor is further configured limit operation of the air conditioner when a charge amount of the power storage device decreases while the air conditioner is operating during charging of the power storage device.

16. The shovel according to claim 10, further comprising:

a battery having an output voltage lower than an output voltage the power storage device;

an electric power converter configured to supply electric power of the power storage device to the battery;

electric equipment configured to operate with electric power of the battery; and an accessory switch configured to open and close a power supply path to the electric equipment, wherein the hardware processor is further configured to start charging the power storage device upon detecting that the predetermined cable is connected to the charging port with the accessory switch being turned on.

17. The shovel according to claim 10, further comprising:

a battery having an output voltage lower than an output voltage the power storage device; and a DC-DC converter configured to step down electric power of the power storage device and supply the stepped-down electric power to the battery, wherein the hardware processor is further configured to stop charging the power storage device and the battery upon receiving the input to activate the electric motor from the user while detecting that the predetermined cable is connected to the charging port.

* * * * *